(12) United States Patent
Lee et al.

(10) Patent No.: US 10,068,373 B2
(45) Date of Patent: Sep. 4, 2018

(54) ELECTRONIC DEVICE FOR PROVIDING MAP INFORMATION

(71) Applicant: Samsung Electronics Co., Ltd., Suwon-si, Gyeonggi-do (KR)

(72) Inventors: Shin-Jun Lee, Yongin-si (KR); Kyung-Tae Kim, Suwon-si (KR); Eun-Seon Noh, Suwon-si (KR); Sun-Kee Lee, Seongnam-si (KR); Cheol-Ho Cheong, Seoul (KR); Jin-Ik Kim, Seoul (KR); Hyung-Suk Kim, Seongnam-si (KR); Bu-Seop Jung, Suwon-si (KR); Sung-Dae Cho, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 172 days.

(21) Appl. No.: 14/755,811

(22) Filed: Jun. 30, 2015

(65) Prior Publication Data
US 2016/0005229 A1    Jan. 7, 2016

Related U.S. Application Data

(60) Provisional application No. 62/019,558, filed on Jul. 1, 2014.

(30) Foreign Application Priority Data

Jun. 12, 2015    (KR) ........................ 10-2015-0083532

(51) Int. Cl.
*G06T 19/00* (2011.01)
*G06F 3/0484* (2013.01)
*G06T 11/60* (2006.01)
*G06F 3/0488* (2013.01)
*G06F 3/0481* (2013.01)

(52) U.S. Cl.
CPC .......... *G06T 19/003* (2013.01); *G06F 3/0488* (2013.01); *G06F 3/04815* (2013.01); *G06F 3/04845* (2013.01); *G06T 11/60* (2013.01)

(58) Field of Classification Search
USPC ......................................................... 345/419
See application file for complete search history.

(56) References Cited

U.S. PATENT DOCUMENTS

| 6,912,293 | B1 * | 6/2005 | Korobkin | G06T 17/10 345/420 |
| 7,777,648 | B2 * | 8/2010 | Smith | G06Q 30/02 340/995.1 |

(Continued)

*Primary Examiner* — Kimbinh T Nguyen
(74) *Attorney, Agent, or Firm* — Jefferson IP Law, LLP

(57) ABSTRACT

An electronic device for providing map information associated with a space of interest is provided. The electronic device includes a display and a processor configured to display, on the display, at least a portion of a map including at least one node associated with at least one image photographed at a corresponding position of the space of interest and additional information on the at least one image, change, in response to an input or an event, a first image associated with a first node among the at least one node or first additional information on the first image, and display, on the map through the display, at least a portion of the changed first image or at least a portion of the changed first additional information.

20 Claims, 45 Drawing Sheets
(4 of 45 Drawing Sheet(s) Filed in Color)

(56) References Cited

U.S. PATENT DOCUMENTS

| | | | |
|---|---|---|---|
| 7,830,962 B1 * | 11/2010 | Fernandez | G08B 13/19608 375/240.16 |
| 8,369,610 B1 * | 2/2013 | Korobkin | G06T 17/10 382/154 |
| 9,122,927 B2 * | 9/2015 | Gallup | G06K 9/00624 |
| 2012/0050525 A1 * | 3/2012 | Rinner | G06T 7/0028 348/117 |
| 2012/0099804 A1 * | 4/2012 | Aguilera | G06F 17/30873 382/285 |
| 2013/0254666 A1 * | 9/2013 | Snavely | G06F 17/30274 715/731 |
| 2014/0078150 A1 | 3/2014 | Li et al. | |
| 2015/0138190 A1 * | 5/2015 | Holzer | G06F 3/04842 345/419 |

* cited by examiner

ELECTRONIC DEVICE FOR PROVIDING MAP INFORMATION

CROSS-REFERENCE TO RELATED APPLICATION(S)

This application claims the benefit under 35 U.S.C. § 119(e) of a U.S. provisional patent application filed on Jul. 1, 2014 in the U.S. Patent and Trademark Office and assigned Ser. No. 62/019,558, and under 35 U.S.C. § 119(a) of a Korean patent application filed on Jun. 12, 2015 in the Korean Intellectual Property Office and assigned Serial number 10-2015-0083532, the entire disclosure of each of which is hereby incorporated by reference.

TECHNICAL FIELD

The present disclosure relates to an electronic device. More particularly, the present disclosure relates to an electronic device including a controller capable of image processing.

BACKGROUND

Recent various electronic devices may acquire an image using a camera. Further, the electronic device may obtain various types of information at the time of image acquisition using a variety of sensors. For example, the electronic device may obtain various information, such as when, where, at which position, and in which direction the image is obtained, and whether it is moved or not when the image is obtained. The electronic device may perform various processes with respect to images by utilizing the image and various types of information associated with the images.

An electronic device capable of providing various services using a three-dimensional (3D)/two-dimensional (2D) spatial map is required.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method for generating a 2D/3D spatial map based on an image and a communication method, and a device for providing various services based on the generated spatial map.

In accordance with an aspect of the present disclosure, an electronic device for providing map information associated with a space of interest is provided. The electronic device includes a display and a processor configured to display, on the display, at least a portion of a map including at least one node associated with at least one image photographed at a corresponding position of the space of interest and additional information on the at least one image, change, in response to an input or an event, a first image associated with a first node among the at least one node or first additional information on the first image, and display, on the map through the display, at least a portion of the changed first image or at least a portion of the changed first additional information.

In accordance with another aspect of the present disclosure, an electronic device for providing map information associated with a space of interest is provided. The electronic device includes a camera configured to acquire at least one image, and a controller, functionally connected to the camera, configured to determine at least one of a distance or direction between a first node and a second node among a plurality of nodes, each of the plurality of nodes includes at least one image and three-dimensional information associated with at least some of the at least one image, and generate a spatial map that connects the first node and the second node based on at least one of the distance or direction.

Various embodiments of the present disclosure are to provide an electronic device that can provide various services by using a 3D/2D spatial map.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
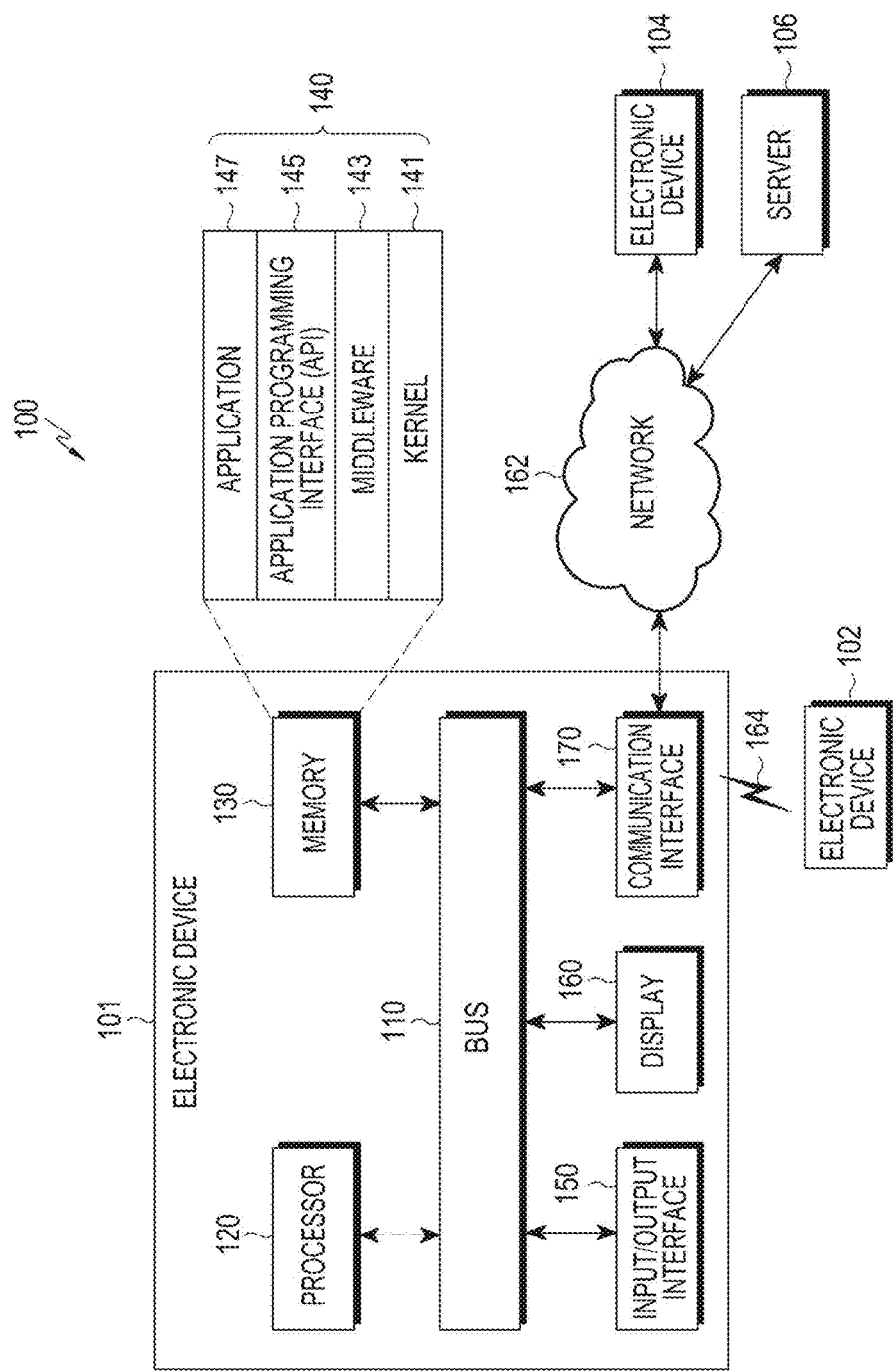
FIG. 1 illustrates a network environment including an electronic device according to various embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to at least one of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

As used herein, the expression "have", "may have", "include", or "may include" refers to the existence of a corresponding feature (e.g., numeral, function, operation, or constituent element, such as component), and does not exclude at least one additional features.

As used herein, the expression "A or B", "at least one of A and/or B", or "at least one of A and/or B" may include any or all possible combinations of items enumerated together. For example, the expression "A or B", "at least one of A and B", or "at least one of A or B" may include (1) at least one A, (2) at least one B, or (3) both at least one A and at least one B.

The expression "a first", "a second", "the first", or "the second" used in various embodiments of the present disclosure may modify various components regardless of the order and/or the importance but does not limit the corresponding components. The above expressions are used merely for the purpose of distinguishing an element from the other elements. For example, a first user device and a second user device indicate different user devices although both of them are user devices. For example, a first element may be termed a second element, and similarly, a second element may be termed a first element without departing from the scope of the present disclosure.

It should be understood that when an element (e.g., first element) is referred to as being (operatively or communicatively) "connected," or "coupled," to another element (e.g., second element), it may be directly connected or coupled directly to the other element or any other element (e.g., third element) may be interposer between them. In contrast, it may be understood that when an element (e.g., first element) is referred to as being "directly connected," or "directly coupled" to another element (second element), there are no element (e.g., third element) interposed between them.

The expression "configured to" used in the present disclosure may be exchanged with, for example, "suitable for", "having the capacity to", "designed to", "adapted to", "made to", or "capable of" according to the situation. The term "configured to" may not necessarily imply "specifically designed to" in hardware. Alternatively, in some situations, the expression "device configured to" may mean that the device, together with other devices or components, "is able to". For example, the phrase "processor adapted (or configured) to perform A, B, and C" may mean a dedicated processor (e.g., an embedded processor) only for performing the corresponding operations or a generic-purpose processor (e.g., central processing unit (CPU) or application processor (AP)) that can perform the corresponding operations by executing at least one software programs stored in a memory device.

The terms used herein are merely for the purpose of describing particular embodiments and are not intended to limit the scope of other embodiments. As used herein, singular forms may include plural forms as well unless the context clearly indicates otherwise. Unless defined otherwise, all terms used herein, including technical and scientific terms, have the same meaning as those commonly understood by a person skilled in the art to which the present disclosure pertains. Such terms as those defined in a generally used dictionary are to be interpreted to have the meanings equal to the contextual meanings in the relevant field of the art, and are not to be interpreted to have ideal or excessively formal meanings unless clearly defined in the present disclosure. In some cases, even the term defined in the present disclosure should not be interpreted to exclude embodiments of the present disclosure.

For example, the electronic device may include at least one of a smartphone, a tablet personal computer (PC), a mobile phone, a video phone, an electronic book (e-book) reader, a desktop PC, a laptop PC, a netbook computer, a personal digital assistant (PDA), a portable multimedia player (PMP), a moving picture experts group (MPEG-1 or MPEG-2) audio layer III (MP3) player, a mobile medical appliance, a camera, and a wearable device (e.g., a head-mounted-device (HMD), such as electronic glasses, electronic clothes, an electronic bracelet, an electronic necklace, an electronic appcessory, electronic tattoos, or a smart watch).

According to various embodiments of the present disclosure, the electronic device may be a smart home appliance. The home appliance may include at least one of, for example, a television (TV), a digital versatile disc (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

According to an embodiment of the present disclosure, the electronic device may include at least one of various medical devices (e.g., various portable medical measuring devices (a blood glucose monitoring device, a heart rate monitoring device, a blood pressure measuring device, a body temperature measuring device, and/or the like), a magnetic resonance angiography (MRA), a magnetic resonance imaging (MRI), a computed tomography (CT) machine, and an ultrasonic machine), a navigation device, a global positioning system (GPS) receiver, an event data recorder (EDR), a flight data recorder (FDR), a vehicle infotainment devices, an electronic devices for a ship (e.g., a navigation device for a ship, and a gyro-compass), avionics, security devices, an automotive head unit, a robot for home or industry, an automatic teller's machine (ATM) in banks, point of sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, and/or the like).

According to various embodiments of the present disclosure, the electronic device may include at least one of a part of furniture or a building/structure, an electronic board, an electronic signature receiving device, a projector, and various kinds of measuring instruments (e.g., a water meter, an electric meter, a gas meter, and a radio wave meter). The electronic device according to various embodiments of the present disclosure may be a combination of at least one of the aforementioned various devices. The electronic device according to various embodiments of the present disclosure may be a flexible device. Further, the electronic device according to an embodiment of the present disclosure is not limited to the aforementioned devices, and may include a new electronic device according to the development of technology.

Hereinafter, an electronic device according to various embodiments of the present disclosure will be described with reference to the accompanying drawings. As used herein, the term "user" may indicate a person who uses an electronic device or a device (e.g., an artificial intelligence electronic device) that uses an electronic device.

FIG. 1 illustrates a network environment including an electronic device according to various embodiments of the present disclosure.

Referring to FIG. 1, an electronic device 101 within a network environment 100 according to various embodiments of the present disclosure is described. The electronic device 101 may include a bus 110, a processor 120, a memory 130, an input/output interface 150, a display 160, and a communication interface 170. In any embodiment of the present disclosure, the electronic device 101 may omit at least some of the components or further include other components.

The bus 110 may include, for example, a circuit for connecting the elements 110 to 170 to each other and transferring communication (for example, a control message and/or data) between the elements.

The processor 120 may include at least one of a CPU, an AP, and a communication processor (CP). The processor 120 may control, for example, at least one other components of the electronic device 101 and/or process a calculation or data related to communication.

The memory 130 may include a volatile memory and/or a non-volatile memory. The memory 130 may store, for example, commands or data related to at least one other component of the electronic device 101. According to an embodiment of the present disclosure, the memory 130 may store software and/or a program 140. The program 140 may include a kernel 141, middleware 143, an application programming interface (API) 145, and/or an application program (or "application") 147. At least some of the kernel 141, the middleware 143, and the API 145 may be referred to as an operating system (OS).

The kernel 141 may control or manage system resources (for example, the bus 110, the processor 120, or the memory 130) used for executing an operation or function implemented by other programs (for example, the middleware 143, the API 145, or the application 147). Furthermore, the kernel 141 may provide an interface through which the middleware 143, the API 145, or the application program 147 may access individual components of the electronic device 101 to control or manage system resources.

The middleware 143 may serve as, for example, an intermediary such that the API 145 or the application program 147 communicate with the kernel 141 to transmit/ receive data. Furthermore, in regard to task requests received from the application program 147, the middleware 143 may perform a control (for example, scheduling or load balancing) for the task requests using, for example, a method of assigning a priority for using the system resources (for example, the bus 110, the processor 120, or the memory 130) of the electronic device 101 to at least one application.

The API 145 is, for example, an interface through which the applications 147 may control functions provided by the kernel 141 or the middleware 143, and may include, for example, at least one interface or function (e.g., instruction) for a file control, a window control, an image processing, or a text control.

The input/output interface 150 may serve as an interface which can transmit commands or data input from the user or another external device to other component(s) of the electronic device 101. Further, the input/output interface 150 may output commands or data received from another component(s) of the electronic device 101 to the user or another external device.

The display 160 may include, for example, a liquid crystal display (LCD), a light emitting diode (LED) display, an organic LED (OLED) display, a micro electro mechanical system (MEMS) display, or an electronic paper display. The display 160 may display various types of contents (for example, text, images, videos, icons, or symbols) for users. The display 160 may include a touch screen, and may receive, for example, a touch, gesture, proximity, or hovering input using an electronic pen or a user's body part.

The communication interface 170 may configure communication between, for example, the electronic device and an external device (for example, a first external electronic device 102, a second external electronic device 104, or a server 106). For example, the communication interface 170 may be connected to a network 162 through wireless or wired communication in order to communicate with the external device (for example, the second external electronic device 104 or the server 106). For example, the communication interface 170 may perform direct communication 164 with the external device (for example, the first external electronic device 102) through wireless or wired communication.

The wireless communication may include, for example, at least one of long term evolution (LTE), LTE-advanced (LTE-A), code division multiple access (CDMA), wideband CDMA (WCDMA), universal mobile telecommunications system (UMTS), wireless broadband (WiBro), and global system for mobile communications (GSM) as a cellular communication protocol. The wired communication may include at least one of, for example, a universal serial bus (USB), a high definition multimedia interface (HDMI), recommended standard 232 (RS-232), and a plain old telephone service (POTS). The network 162 may include at least one of communication networks, such as a computer network (for example, a local area network (LAN) or a wide area network (WAN)), the Internet, and a telephone network.

Each of the first and second external electronic devices 102 and 104, respectively, may be a device which is the same as or different from the electronic device 101. According to an embodiment of the present disclosure, the server 106 may include a group of at least one servers. According to various embodiments of the present disclosure, all or some of the operations performed by the electronic device 101 may be performed by another electronic device or a plurality of electronic devices (for example, the first external electronic device 102 or the second external electronic device 104 or the server 106). According to an embodiment of the present disclosure, when the electronic device 101 should perform some functions or services automatically or by request, the electronic device 101 may make a request for performing at least some of the functions related to the functions or services to another device (for example, the first external electronic device 102 or the second external electronic device 104 or the server 106) instead of performing the functions or services by itself. The other electronic device (for example, the first external electronic device 102 or the second external electronic device 104 or the server 106) may carry out the requested function or the additional function and transfer the result, obtained by carrying out the function, to the electronic device 101. The electronic device 101 may provide the requested functions or services based on the received result or after additionally processing the received result. To this end, for example, cloud computing, distributed computing, or client-server computing technology may be used.

Figure 2:
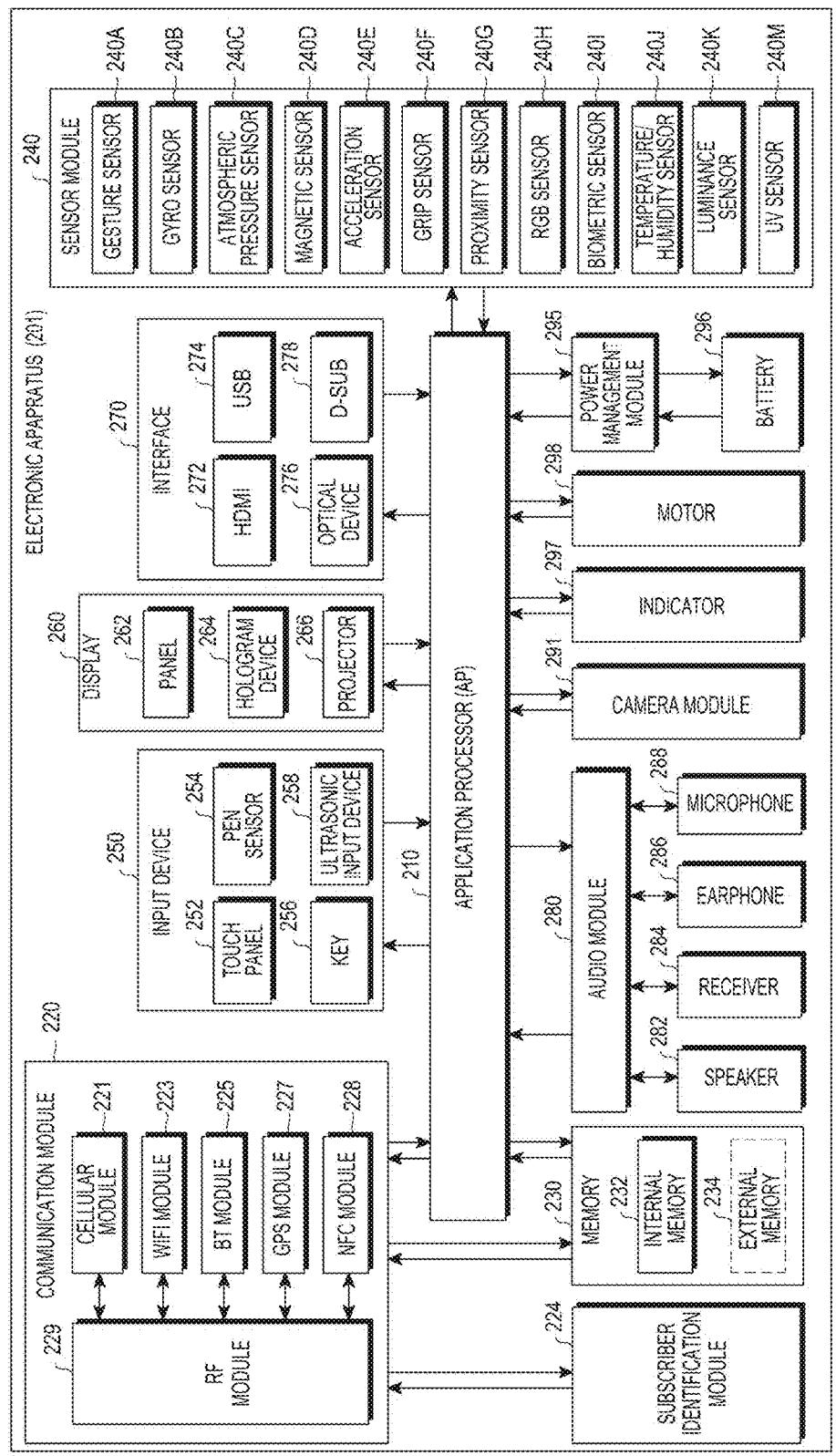
FIG. 2 is a block diagram of an electronic device according to various embodiments of the present disclosure.

FIG. 2 is a block diagram of an electronic device according to various embodiments of the present disclosure.

Referring to FIG. 2, an electronic device 201 may include, for example, all or some of the electronic device 101 illustrated in FIG. 1. The electronic device 201 may include at least one AP 210, a communication module 220, a subscriber identification module (SIM) card 224, a memory 230, a sensor module 240, an input device 250, a display 260, an interface 270, an audio module 280, a camera module 291, a power management module 295, a battery 296, an indicator 297, and a motor 298.

The AP 210 may control, for example, a plurality of hardware or software components connected thereto by driving an operating system or an application program, and may perform a variety of data processing and calculations. The AP 210 may be embodied as, for example, a system on chip (SoC). According to an embodiment of the present disclosure, the AP 210 may further include a graphics processing unit (GPU) and/or an image signal processor. The AP 210 may include at least some of the components (for example, a cellular module 221) illustrated in FIG. 2. The AP 210 may load instructions or data, received from at least one other element (for example, a non-volatile memory), in a volatile memory to process the loaded instructions or data and may store various types of data in a non-volatile memory.

The communication module 220 may have a component equal or similar to the communication interface 170 of FIG. 1. The communication module 220 may include, for example, the cellular module 221, a Wi-Fi module 223, a Bluetooth (BT) module 225, a GPS module 227, a near field communication (NFC) module 228, and a radio frequency (RF) module 229.

The cellular module 221 may provide a voice call, image call, short message service (SMS), or Internet service through, for example, a communication network. According to an embodiment of the present disclosure, the cellular module 221 may distinguish between and authenticate electronic devices 201 within a communication network using a subscriber identification module (for example, the SIM card 224). According to an embodiment of the present disclosure, the cellular module 221 may perform at least some of the functions that the AP 210 may provide. According to an embodiment of the present disclosure, the cellular module 221 may include a CP.

The Wi-Fi module 223, the BT module 225, the GPS module 227, and the NFC module 228 may include, for example, a processor for processing data transmitted/received through the corresponding module. According to any embodiment of the present disclosure, at least some (two or more) of the cellular module 221, the Wi-Fi module 223, the BT module 225, the GPS module 227, and the NFC module 228 may be included in one integrated circuit (IC) or IC package.

The RF module 229 may transmit/receive, for example, a communication signal (for example, an RF signal). The RF module 229 may include, for example, a transceiver, a power amp module (PAM), a frequency filter, a low noise amplifier (LNA) or an antenna, and/or the like. According to an embodiment of the present disclosure, at least one of the cellular module 221, the Wi-Fi module 223, the BT module 225, the GPS module 227, and the NFC module 228 may transmit/receive an RF signal through a separate RF module.

The SIM card 224 may include, for example, a card including a SIM and/or an embedded SIM, and may further include unique identification information (for example, an IC card identifier (ICCID)) or subscriber information (for example, international mobile subscriber identity (IMSI)).

The memory 230 may include, for example, an internal memory 232 or an external memory 234. The internal memory 232 may include at least one of a volatile memory (for example, a dynamic random access memory (DRAM), a static RAM (SRAM), a synchronous DRAM (SDRAM), and/or the like) and a non-volatile memory (for example, a one time programmable read only memory (OTPROM), a PROM, an erasable and programmable ROM (EPROM), an electrically erasable and programmable ROM (EEPROM), a mask ROM, a flash ROM, a flash memory (for example, a NAND flash memory or a NOR flash memory), a hard disk drive, a solid state drive (SSD), and/or the like).

The external memory 234 may further include a flash drive, for example, a compact flash (CF), a secure digital (SD), a micro-SD, a mini-SD, an extreme digital (xD), a memory stick, and/or the like. The external memory 234 may be functionally and/or physically connected to the electronic device 201 through various interfaces.

The sensor module 240 may measure a physical quantity or detect an operation state of the electronic device 201, and may convert the measured or detected information to an electrical signal. The sensor module 240 may include, for example, at least one of a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (for example, a red, green, blue (RGB) sensor), a biometric sensor 240I, a temperature/humidity sensor 240J, a light sensor 240K, and an ultraviolet (UV) sensor 240M. Additionally or alternatively, the sensor module 240 may include, for example, an E-nose sensor, an electromyography (EMG) sensor, an electroencephalogram (EEG) sensor, an electrocardiogram (ECG) sensor, an infrared (IR) sensor, an iris scanner, and/or a fingerprint sensor. The sensor module 240 may further include a control circuit for controlling at least one sensor included therein. In any embodiment of the present disclosure, the electronic device 201 may further include a processor configured to control the sensor module 240 as a part of or separately from the AP 210, and may control the sensor module 240 while the AP 210 is in a sleep state.

The input device 250 may include, for example, a touch panel 252, a (digital) pen sensor 254, a key 256, or an ultrasonic input device 258. The touch panel 252 may use at least one of, for example, a capacitive type, a resistive type, an infrared type, and an ultrasonic type. The touch panel 252 may further include a control circuit. The touch panel 252 may further include a tactile layer and provide a tactile reaction to the user.

The (digital) pen sensor 254 may include, for example, a recognition sheet which is a part of the touch panel or a separate recognition sheet. The key 256 may include, for example, a physical button, an optical key or a keypad. The ultrasonic input unit 258 may identify data by detecting an acoustic wave with a microphone (for example, microphone 288) of the electronic device 201 through an input unit for generating an ultrasonic signal.

The display 260 (for example, the display 160) may include a panel 262, a hologram device 264, or a projector 266. The panel 262 may include a component equal or similar to the display 160 of FIG. 1. The panel 262 may be implemented to be, for example, flexible, transparent, or wearable. The panel 262 may also be integrated with the touch panel 252 as a single module. The hologram device 264 may show a stereoscopic image in the air by using interference of light. The projector 266 may project light onto a screen to display an image. For example, the screen may be located inside or outside the electronic device 201. According to an embodiment of the present disclosure, the display 260 may further include a control circuit for controlling the panel 262, the hologram device 264, or the projector 266.

The interface 270 may include, for example, an HDMI 272, a USB 274, an optical interface 276, or a D-subminiature (D-sub) 278. The interface 270 may be included in, for example, the communication interface 170 illustrated in FIG. 1. Additionally or alternatively, the interface 270 may include, for example, a mobile high-definition link (MHL) interface, an SD card/multi-media Card (MMC) interface, or an infrared data association (IrDA) standard interface.

The audio module 280 may bilaterally convert, for example, a sound and an electrical signal. At least some components of the audio module 280 may be included in, for example, the input/output interface 150 illustrated in FIG. 1. The audio module 280 may process sound information, which is input or output through, for example, a speaker 282, a receiver 284, earphones 286, the microphone 288, and/or the like.

The camera module 291 is a device which may photograph a still image and a dynamic image. According to an embodiment of the present disclosure, the camera module 291 may include at least one image sensors (for example, a front sensor or a back sensor), a lens, an image signal processor (ISP) or a flash (for example, LED or xenon lamp).

The power management module 295 may manage, for example, the power of the electronic device 201. According to an embodiment of the present disclosure, the power management module 295 may include a power management IC (PMIC), a charger IC, or a battery or fuel gauge. The PMIC may have a wired and/or wireless charging scheme. A magnetic resonance scheme, a magnetic induction scheme, or an electromagnetic scheme may be exemplified as the wireless charging method, and an additional circuit for wireless charging, such as a coil loop circuit, a resonance circuit, a rectifier circuit, and/or the like may be added. The battery gauge may measure, for example, the remaining amount of battery, a charging voltage, current, or temperature. The battery 296 may include, for example, a rechargeable battery and/or a solar battery.

The indicator 297 may indicate the particular status of the electronic device 201 or a part thereof (for example, the AP 210), for example, a booting status, a message status, a charging status, and/or the like. The motor 298 may convert an electrical signal into mechanical vibrations, and may generate a vibration or haptic effect. Although not illustrated, the electronic device 201 may include a processing device (for example, a GPU) for supporting mobile TV. The processing device for supporting mobile TV may process media data according to a standard of digital multimedia broadcasting (DMB), digital video broadcasting (DVB), media flow, and/or the like.

Each of the components of the electronic device according to the present disclosure may be implemented by at least one component and the name of the corresponding component may vary depending on a type of the electronic device. In various embodiments of the present disclosure, the electronic device may include at least one of the above-described elements. Some of the above-described elements may be omitted from the electronic device, or the electronic device may further include additional elements. Further, some of the components of the electronic device according to the various embodiments of the present disclosure may be combined to form a single entity, and thus, may equivalently execute functions of the corresponding elements prior to the combination.

Figure 3:
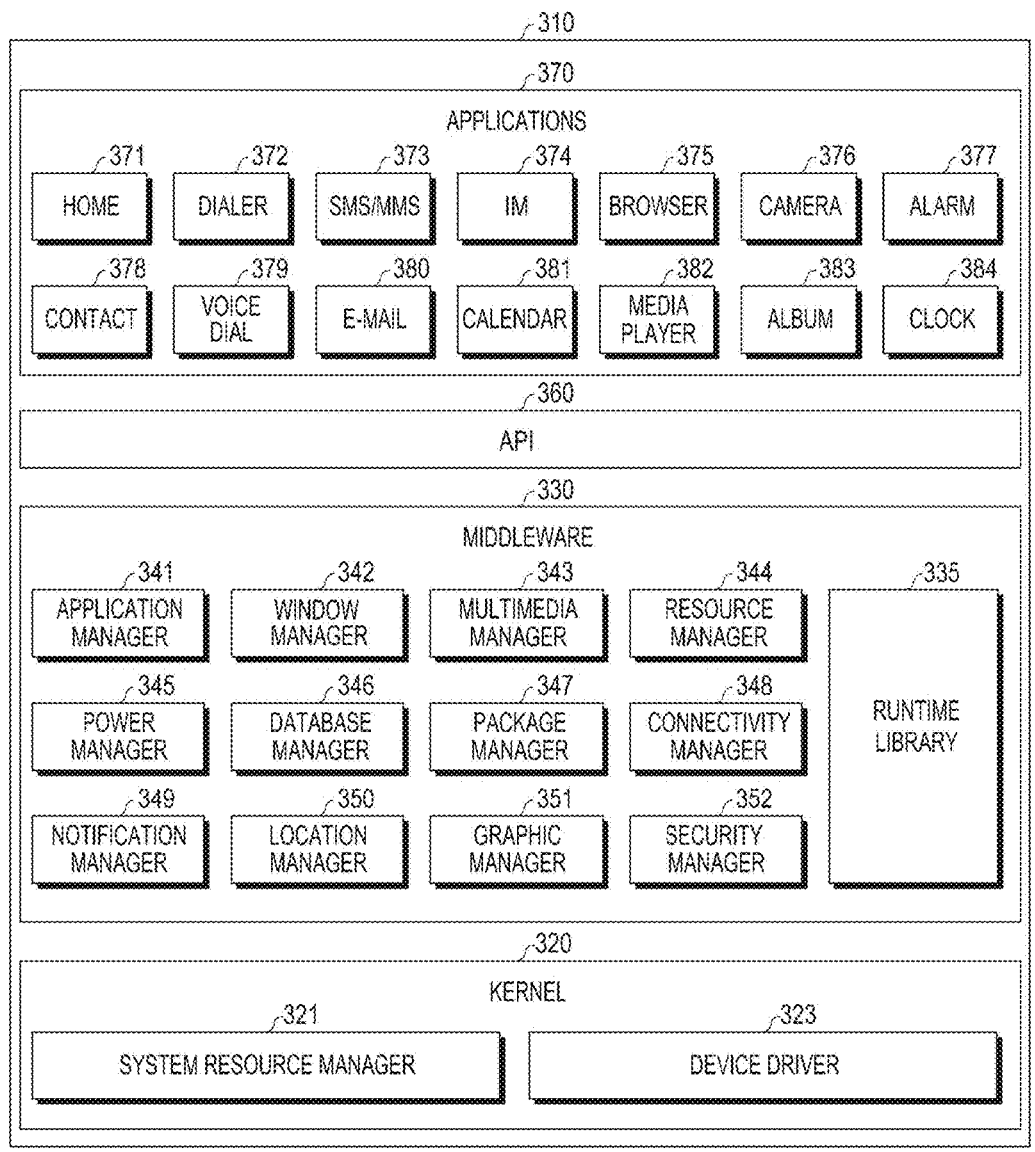
FIG. 3 is a block diagram of a program module according to various embodiments of the present disclosure.

FIG. 3 is a block diagram of a program module according to various embodiments of the present disclosure.

Referring to FIG. 3, according to an embodiment of the present disclosure, a program module 310 (for example, the program 140) may include an OS for controlling resources related to the electronic device (for example, the electronic device 101) and/or various applications (for example, the application programs 147) executed in the operating system. The operating system may be, for example, Android, iOS, Windows, Symbian, Tizen, Bada, and/or the like.

The programming module 310 may include a kernel 320, middleware 330, an API 360, and/or an application 370. At least some of the program module 310 may be preloaded in the electronic device or downloaded in the server (for example, the server 106).

The kernel 320 (for example, the kernel 141 of FIG. 1) may include, for example, a system resource manager 321 or a device driver 323. The system resource manager 321 may control, allocate, or collect the system resources. According to an embodiment of the present disclosure, the system resource manager 321 may include a process manager, a memory manager, or a file system manager. The device driver 323 may include, for example, a display driver, a camera driver, a BT driver, a shared-memory driver, a USB driver, a keypad driver, a Wi-Fi driver, an audio driver, or an inter-process communication (IPC) driver.

The middleware 330 may provide a function required by the applications 370 in common or provide various functions to the applications 370 through the API 360 so that the applications 370 can efficiently use limited system resources inside the electronic device. According to an embodiment of the present disclosure, the middleware 330 (for example, the middleware 143) may include, for example, at least one of a runtime library 335, an application manager 341, a window manager 342, a multimedia manager 343, a resource manager 344, a power manager 345, a database manager 346, a package manager 347, a connectivity manager 348, a notification manager 349, a position manager 350, a graphic manager 351, and a security manager 352.

The run time library 335 may include, for example, a library module that a compiler uses in order to add new functions through a programming language while the applications 370 are executed. The run time library 335 may perform input/output management, memory management, or a function for an arithmetic function.

The application manager 341 may manage, for example, a life cycle of at least one application among the applications 370. The window manager 342 may manage a graphical user interface (GUI) resource which is used in a screen. The multimedia manager 343 may detect a format required for reproducing various media files and encode or decode a media file using a coder/decoder (codec) appropriate for the corresponding format. The resource manager 344 may manage resources, such as a source code, a memory or a storage space of at least one application among the applications 370.

The power manager 345 may operate together with a basic input/output system (BIOS) to manage a battery or power and may provide power information required for the operation of the electronic device. The database manager 346 may generate, search for, or change a database to be used by at least one of the applications 370. The package manager 347 may manage the installation or the updating of applications distributed in the form of package file.

The connectivity manager 348 may manage a wireless connection, for example, Wi-Fi or BT, and/or the like. The notification manager 349 may display or notify an event, such as a received message, an appointment, and a proximity notification to a user without disturbance. The position manager 350 may manage position information of the electronic device. The graphic manager 351 may manage graphic effects to be provided to a user and user interfaces related to the graphic effects. The security manager 352 may provide various security functions required for system security or user authentication. According to an embodiment of the present disclosure, when the electronic device (for example, electronic device 101) has a call function, the middleware 330 may further include a telephony manager for managing a voice call function or a video call function of the electronic device.

The middleware 330 may include a middleware module for forming a combination of various functions of the aforementioned elements. The middleware 330 may provide modules specialized according to types of operating systems in order to provide differentiated functions. In addition, a few exiting component elements may be dynamically removed from the middleware 330, or new component elements may be added to the middleware 330.

The API 360 (for example, the API 145), which is a set of API programming functions, may be provided with different configurations according to operating systems. For example, with respect to each platform, one API set may be provided in a case of Android or iOS, and two or more API sets may be provided in a case of Tizen.

The applications 370 (for example, the application programs 147) may include different applications which can provide functions, such as a home 371, a dialer 372, an SMS/multimedia message service (MMS) 373, an instant message (IM) 374, a browser 375, a camera 376, an alarm 377, contacts 378, a voice dialer 379, an email 380, a calendar 381, a media player 382, an album 383, a clock 384, health care (for example, measure exercise quantity or blood sugar), or environment information (for example, atmospheric pressure, humidity, or temperature information).

According to an embodiment of the present disclosure, the applications 370 may include an application (hereinafter, referred to as an "information exchange application" for convenience of the description) supporting information exchange between the electronic device (for example, the electronic device 101) and an external electronic device (for example, the first external electronic device 102 or the second external electronic device 104). The information exchange application may include, for example, a notification relay application for transmitting specific information to the external electronic device, or a device management application for managing the external electronic device.

For example, the notification relay application may include a function of transferring, to the external electronic device (for example, the first external electronic device 102 or the second external electronic device 104), notification information generated from other applications of the electronic device (for example, an SMS/MMS application, an e-mail application, a health management application, or an environmental information application). Further, the notification relay application may receive notification information from, for example, the external electronic device and provide the received notification information to the user. For example, the device management application may manage (for example, install, delete, or update) at least one function of the external electronic device (for example, the second external electronic device 104) communicating with the electronic device (for example, a function of turning on/off the external electronic device itself (or some components) or a function of adjusting the luminance (or the resolution) of the display), applications operating in the external electronic device, or services provided by the external electronic device (e.g., a call service and a message service).

According to an embodiment of the present disclosure, the applications 370 may include an application (for example, health management application) designated according to attributes (for example, attributes of the electronic device, such as the type of electronic device which corresponds to a mobile medical device) of the external electronic device (for example, the first external electronic device 102 or the second external electronic device 104). According to an embodiment of the present disclosure, the applications 370 may include an application received from the external electronic device (for example, the server 106, or the first external electronic device 102 or the second external electronic device 104). According to an embodiment of the present disclosure, the applications 370 may include a preloaded application or a third party application which can be downloaded from the server. Names of the components of the program module 310 according to the above described embodiments of the present disclosure may vary depending on the type of operating system.

According to various embodiments of the present disclosure, at least some of the programming module 310 may be implemented in software, firmware, hardware, or a combination of two or more thereof. At least some of the programming module 310 may be implemented (for example, executed) by, for example, the processor (for example, the AP 210). At least some of the programming module 310 may include, for example, a module, program, routine, sets of instructions, or process for performing at least one functions.

Figure 4:
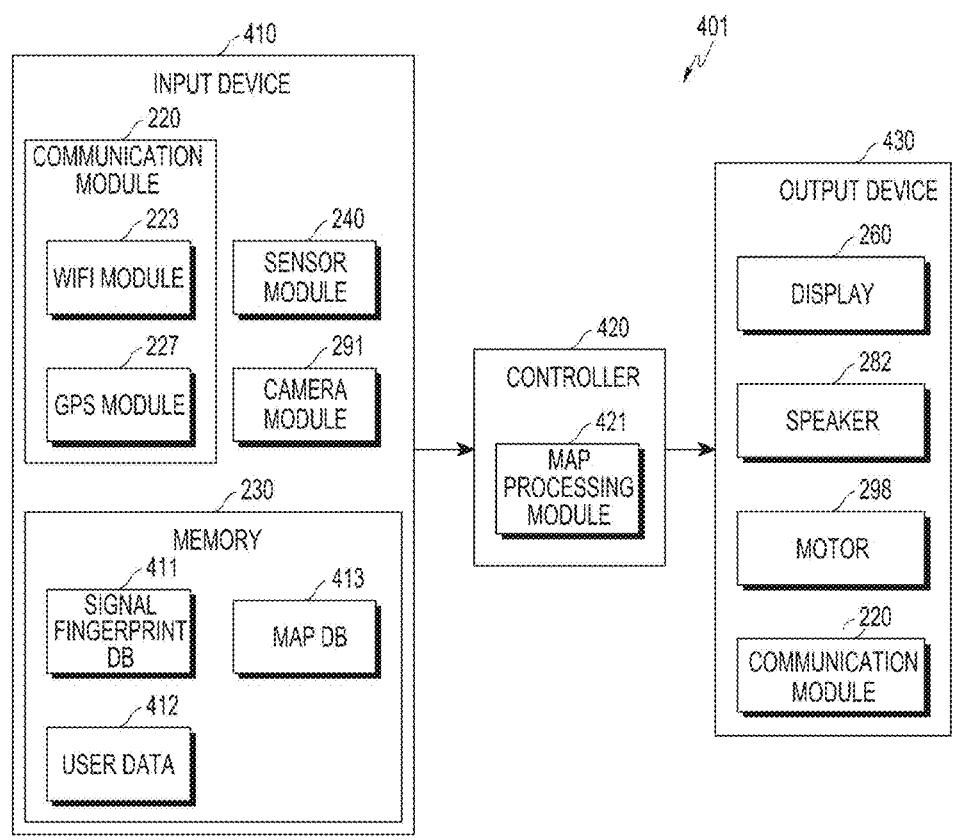
FIG. 4 is a block diagram illustrating a configuration of an electronic device according to various embodiments of the present disclosure.

FIG. 4 is a block diagram illustrating a configuration of an electronic device according to various embodiments of the present disclosure.

Referring to FIG. 4, an electronic device 401 (e.g., the electronic device 101, 201) may include an input device 410, a controller 420 (e.g., a processor 120, 210), and an output device 430.

For example, the input device 410 can correspond to any component(s) that inputs a signal, data, or information to the processor 120, in a configuration illustrated in FIG. 1. For example, the input device 410 can correspond to any component(s) that inputs a signal, data, or information to the processor 210, in a configuration illustrated in FIG. 2.

The input device 410 may be functionally connected to the controller 420 and may input a signal, data, or information to the controller 420. For example, the input device 410 may include at least one among a communication module 220 (for example, a communication interface 170) including a Wi-Fi module 223, a GPS module 227, and/or the like, a sensor module 240, a camera module 291, a memory 230 (e.g., a memory 130), and/or the like.

For example, the camera module 291 can input an image to the controller 420.

For example, the sensor module 240, a memory 230 and/or the communication module 220 may input, to the controller 420, context information associated with the electronic device 401 (e.g., at least one among position information of the electronic device 401 through the GPS module 227, motion information of the electronic device 401 through the acceleration sensor 240E, access information of a surrounding object through a proximity sensor 240G, ambient temperature/humidity information through the temperature/humidity sensor 240J, pose/posture information of the electronic device 401 through the gyro sensor 240B, and/or user data 412 stored in the memory 230).

For example, the communication module 220, the camera module 291 and/or the memory 230 may input, to the controller 420, position information of the electronic device 401 (for example, at least one among Wi-Fi signal information through a Wi-Fi module 223, the position information through the GPS module 227, a peripheral image through the camera module 291, a signal map stored in a signal fingerprint (for example, Wi-Fi fingerprint) database (DB) 411 of the memory 230, and/or the like).

The controller 420 may include a map processing module 421 for generating/processing a map. The map processing module 421 may be integrated into the controller 420. The map processing module 421 may perform an operation of generating a node/graphic element (or a virtual object)/a map image (i.e., an image included in the map) by using at least one image (for example, the image received from the communication module 220, the camera module 291 and/or the memory 230) or map information stored on the map DB 413 of the memory 230, and an operation of processing (for example, at least one of a process for displaying a map, a process for changing at least a portion (for example, a graphic element (or a virtual object) information, node information, path information between nodes) of map information stored on a map DB 413 of the memory 230, and/or the like). The map may include a two-dimensional (2D) map, a three-dimensional (3D) map, a node, a graphical element (or virtual object), and/or the like.

For example, the output device 430 can correspond to any component(s) that outputs a signal, data, or information processed by the processor 120, in a configuration illustrated in FIG. 1. For example, the output device 430 can correspond to any component(s) that outputs a signal, data, or information processed by the processor 210, in a configuration illustrated in FIG. 2.

The output device 430 may be functionally connected to the controller 420 and may output to the outside a signal, data, or information input from the controller 420. For example, the output device 430 may include at least one among a display 260 (e.g., the display 160), a speaker 282, a motor 298, and a communication module 220, and/or the like.

For example, the display 260 can display signals, data, or information input from the controller 420 on the screen.

For example, the speaker 282 can output signals, data, or information input from the controller 420 through a sound.

For example, the motor 298 can output signals, data, or information input from the controller 420 through a vibration or haptic feedback. In the vibration or the haptic feedback, a vibration waveform can be different according to the signal, the data, or information.

For example, the communication module 220 may transmit the signal, data, or information input from the controller 420 to the external device (for example, the first external electronic device 102, the second external electronic device 104, or the server 106). For example, the signal, data, or information may be transmitted to the external device through at least one of the Wi-Fi module 223, the BT module 225, BT low energy (BLE) module, an infrared module, and/or the like.

Figure 5A:
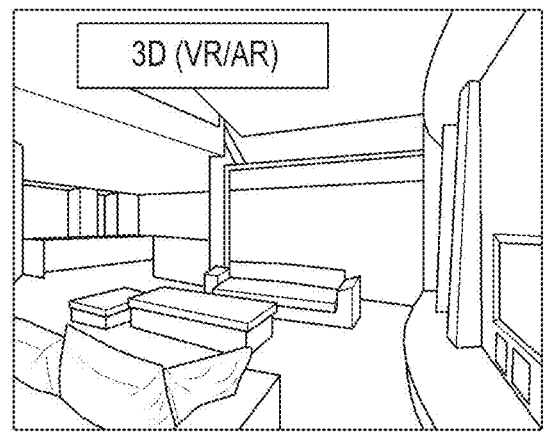
FIGS. 5A and 5B illustrate maps according to various embodiments of the present disclosure.
Figure 5B:
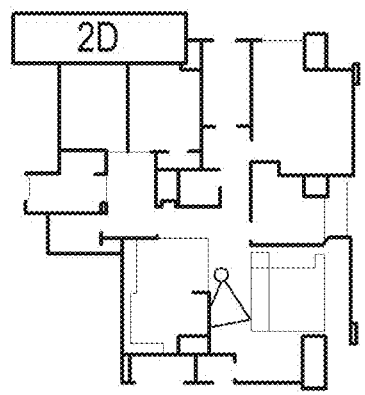

FIGS. 5A and 5B illustrate maps according to various embodiments of the present disclosure.

Referring to FIG. 5A, a map of a space of interest (e.g., an indoor space inside the building or an outdoor space, such as parking lots, botanical gardens, and/or the like) may be provided in the form of 3D. For example, the map can be implemented by virtual reality (VR), augmented reality (AR), or mixed reality (MR).

Referring to FIG. 5B, a map of a space of interest can be provided in a 2D form. For example, the map may be provided in a plan view.

In an embodiment of the present disclosure, a current position and oriented direction of the electronic devices (e.g., the electronic devices 101, 201, 401) can be displayed along with the 2D map, or on the 2D map.

Figure 6:
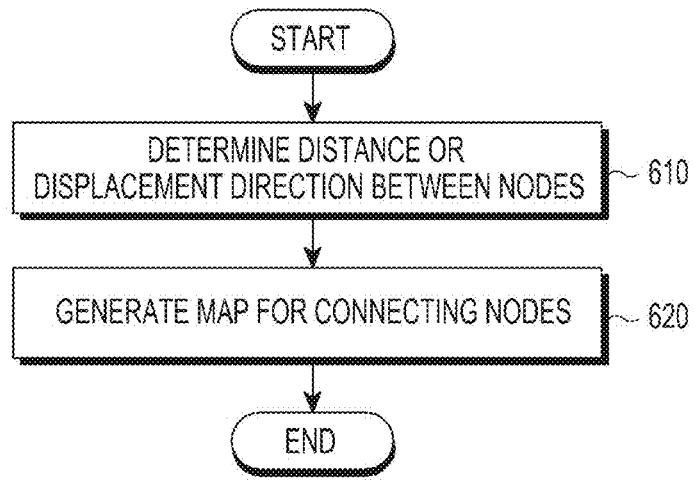
FIG. 6 is a flowchart illustrating a method for operating an electronic device according to various embodiments of the present disclosure.

FIG. 6 is a flowchart illustrating a method for operating an electronic device according to an embodiment of the present disclosure.

Referring to FIG. 6, a method for operating the electronic device may include operations 610 to 620. The method for operating the electronic device can be performed by the electronic device (for example, electronic devices 101, 201, 401), a processor (for example, processors 120, 210) of the electronic device or a controller (for example, the controller 420, the map processing module 421, and/or the like).

In operation 610, the electronic device can determine the distance or displacement direction between the nodes. For example, the electronic device may determine at least one of a distance or displacement direction between a first node and a second node among a plurality of nodes, in which each of the plurality of nodes includes at least one image and additional information (for example, 3D information including at least one among a photographing position, image direction of the node, depth/degree of depth of the image) associated with at least a portion of the at least one image.

In operation 620, the electronic device may generate a map that connects the nodes. For example, the electronic device may generate a spatial map that connects the first node and the second node based on at least one of the distance or displacement direction between the first and second nodes.

In an embodiment of the present disclosure, at least one of a plurality of images can be disposed in a space (or position) of the first node or the second node, the space corresponding to at least one photographing position and/or photographing direction.

In an embodiment of the present disclosure, the 3D information may include 3D information determined by comparing at least some area of the first image and at least some area of the second image with respect to the first image and the second image among the plurality of images.

In an embodiment of the present disclosure, the electronic device may acquire the plurality of images through a camera (e.g., the camera module 291) functionally connected to the electronic device. Hereinafter, the camera can also be referred to as a photographing device.

In an embodiment of the present disclosure, the electronic device may identify a photographing position of the camera or a photographing direction of the camera for the plurality of images. The electronic device, based on at least one of the photographing position or the photographing direction, may display a photographing guide on a screen of the display (e.g., the displays 160 and 260) functionally connected to the electronic device.

In an embodiment of the present disclosure, the electronic device may acquire one of the plurality of images, in response to the photographing position or the photographing direction corresponding to a critical area of the photographing guide.

In an embodiment of the present disclosure, the photographing guide may include a photographing area guide configured in relation to one focus (or a center point) information, based on the photographing position or the photographing direction.

In an embodiment of the present disclosure, the electronic device may acquire another image. When there is no node among the plurality of nodes which correspond to said another image, the electronic device may generate a node corresponding to said another image. The electronic device may dispose said another image in the space of the generated node.

In an embodiment of the present disclosure, the electronic device may switch, in response to a user input with respect to the electronic device or in response to the position or direction of the electronic device, at least some among a plurality of images corresponding to the first node into at least some among a plurality of images corresponding to the second node and then display the switched images.

In an embodiment of the present disclosure, the electronic device may display visual information corresponding to at least one of the first node or the second node, in response to the user input with respect to the electronic device or in response to the position or direction of the electronic device.

In an embodiment of the present disclosure, the first node or the second node may include two or more images among the plurality of images allocated to a particular point of a space of the first node or the second node, and the first image among the two or more images may be disposed on the point as a representative.

In an embodiment of the present disclosure, the electronic device may configure a condition associated with the second image among the two or more images to the first node or the second node, respond to an event satisfying the condition, and then dispose the second image on the point as a representative.

In an embodiment of the present disclosure, when the first node and the second node belong to different spatial maps respectively, the electronic device may generate the spatial map by synthesizing (or binding) a first spatial map to which the first node belongs and a second spatial map to which the second node belongs.

In an embodiment of the present disclosure, the electronic device may determine the ground or an obstacle associated with the first node and the second node, based on the additional information (or 3D information including at least one among photographing position, direction of the image of the node, depth/degree of depth of the image). The electronic device may generate a planar map that connects the first node and the second node, based on the ground or the obstacle.

In an embodiment of the present disclosure, the spatial map may include information on an emergency route, based on the determination of whether a path that connects the first node and the second node corresponds to the emergency route.

In an embodiment of the present disclosure, the electronic device may identify the object displayed on at least a portion of the plurality of images. The electronic device may obtain attribute information of the object.

In an embodiment of the present disclosure, the electronic device may request attribute information from the external device (for example, a first external electronic device 102, a second external electronic device 104, or a server 106) associated with the object. The electronic device may receive the attribute information from the external device in response to the request.

In an embodiment of the present disclosure, the attribute information may include control information for controlling the functionality of the object.

In an embodiment of the present disclosure, the electronic device may transmit a control signal for the object, by using the control information.

In an embodiment of the present disclosure, the attribute information may include a 3D model of the object.

In an embodiment of the present disclosure, the electronic device may dispose or move the 3D model on the spatial map according to a user input, based on the additional information (or 3D information including at least one among photographing position, direction of the image of the node, depth/degree of depth of the image).

Figure 7:
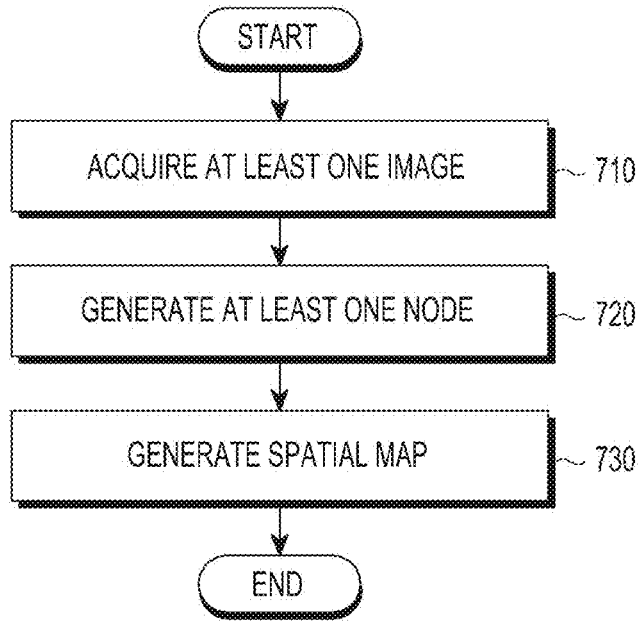
FIG. 7 is a flowchart illustrating a method for operating an electronic device according to various embodiments of the present disclosure.

FIG. 7 is a flowchart illustrating a method for operating an electronic device according to an embodiment of the present disclosure.

Referring to FIG. 7, a method for operating the electronic device may include operations 710 to 730. The method for operating the electronic device can be performed by the electronic device (for example, electronic devices 101, 201, 401), a processor (for example, processors 120, 210) of the electronic device or a controller (for example, the controller 420, the map processing module 421, and/or the like).

In operation 710, the electronic device may acquire at least one image. The electronic device may acquire at least one image photographed by at least one position within a space of interest (e.g., an indoor space inside the building or an outdoor space, such as parking lots, botanical gardens, and/or the like).

In an embodiment of the present disclosure, the electronic device may acquire multiple images by taking one point within the space of interest at multiple angles or multiple points (for example, a plurality of nodes), in order to express, in 3D, the objects (e.g., a wall, electronic products, furniture, and/or the like) of the space of interest included in the 3D map.

In an embodiment of the present disclosure, the electronic device may acquire at least one panoramic images by taking pictures while rotating at one point of the space of interest or by taking pictures of the one point at multiple angles or multiple points (for example, a plurality of nodes).

In an embodiment of the present disclosure, the electronic device may generate a panoramic image by acquiring multiple (two or more) video frame images (for example, at least one among I-frame, P-frame) from a video file or a video stream (or bit stream) obtained by the video imaging. For example, when an object photograph is taken by a video, if the frames photographed from different angles of the object are included, the plurality of frame images are extracted from the video file or the bit stream, and the panoramic image or the 3D image may be generated by using the plurality of frame images.

In an embodiment of the present disclosure, since a technique for estimating the side or the back of the image via a single photograph can be used depending on the object, the plurality of images are not necessarily required when generating the 3D image or a panoramic image. For example, for the face, a technique may be used that estimates, through race, sex, and/or the like, the rate or position of statistical facial components and in the case of symmetrical objects, such as a round table, side or rear images can be estimated to be the same as a front image.

In an embodiment of the present disclosure, the electronic device may acquire an image through a camera (e.g., a camera module 291) functionally connected to the electronic device, receive an image from the first external device (for example, the first external electronic device 102, or the second external electronic device 104) which has photographed an image, or receive an image from the second external device (for example, the first external electronic device 102, the second external electronic device 104 or the server 106) that stores the image.

For example, an image photographing can be performed using a camera or an infrared camera. For example, the image photographing can be performed by using at least one among a smart phone, a user wearable device, a camera incorporated into or attached to a robot or drone, or a closed circuit TV (CCTV).

For example, the type of photographed images may be at least one among a photo, a panoramic image, a video, or an infrared image, or may be a composite image including at least some thereof. Examples of the composite image can include an animated graphic interchange format (GIF) capable of displaying at least one image frames, and Joint Photographic Experts Group (JPEG) images in which a virtual tour video of Samsung Galaxy 3 is supported.

In an embodiment of the present disclosure, the electronic device can obtain the additional information associated with the at least one image. For example, the electronic device may acquire 3D information including at least one among the photographing position, the direction of the image of the node, and the depth/degree of depth of the image while photographing the at least one image through the camera. For example, the electronic device may perform photographing of the at least one image through the camera, and acquire the depth information on the at least one object (or an image of the object) displayed on the at least one image through the depth sensor at the same or a different time point with the photographing. For example, the electronic device may acquire 3D map-based depth map through a photograph taken separately with the photographing of at least one image.

In an embodiment of the present disclosure, the electronic device can photograph different images due to the position change along with the movement of the electronic device, or changes in a direction, a height, a pose, a direction angle or a tilt angle of a camera. Each of the at least one image may be a color image, and a depth map image formed by measuring the depth information.

In an embodiment of the present disclosure, the electronic device may acquire, as the additional information associated with the at least one image, at least one among the position along with the movement of the electronic device, or a direction, a height, a pose, a direction angle or a tilt angle of a camera. Such information can also be an absolute value relative to the direction of magnetic north and/or gravity, and also be a relative change amount based on the additional information acquired during the previous node and previous image photographing.

In operation 720, the electronic device may generate at least one node associated with the at least one image (and additional information). For example, the operation 710 and the operation 720 can be repeated to generate each node.

In operation 730, the electronic device may generate a spatial map (or 3D map) including a plurality of nodes and the path (or connection) between the plurality of nodes.

In an embodiment of the present disclosure, the electronic device may form a node by photographing an image, collect images for a map through each node, and generate at least a partial spatial map (or 3D map) based on the node.

In an embodiment of the present disclosure, the electronic device may photograph a plurality of images, generate a plurality of nodes associated with the plurality of images, and generate the spatial map (or 3D map) based on the plurality of nodes.

In an embodiment of the present disclosure, the electronic device may form path information through the movement information between nodes, determine nodes adjacent to each other or overlapping via a plurality of paths, and change spatial map (or 3D map) by using the multiple images of the determined nodes (for example, adding or deleting of the node, merging of the nodes, or changing of node information). For example, the node information may include at least one image corresponding to the one position of the space of interest, and the information associated with the at least one image.

In an embodiment of the present disclosure, the electronic device may generate at least one node, based on the position information (e.g., 2D coordinate information, 3D coordinate information) when an image is photographed.

In an embodiment of the present disclosure, the electronic device may photograph images sequentially while moving, and generate a plurality of nodes that are arranged along at least one path. The electronic device may store the information (hereinafter, also referred to as node information) associated with each node and information (hereinafter, also referred to as path information) on the path, as map information. For example, when the electronic device photographs a peripheral image at one point of a corridor, and photographs another single image after the user has advanced a few steps, two nodes and a path (or a link) connecting between the two nodes can be generated according to the order of time. The electronic device may store information on the nodes and the path information between the nodes.

In an embodiment of the present disclosure, the electronic device may generate at least one node without generating link information. One path may include at least one node. When a map includes a plurality of nodes, the relevant path can be associated with a plurality of images having a temporal continuity and a spatial continuity. The case of having a temporal continuity and a spatial continuity may include at least one among a case where the difference of the photographing (or generating) time between images is within a certain critical time (for example, 20 seconds), a case where at least some of the image of a node is similar to at least some of the image of a previous node, and a case where the difference of distance between the photographing position of one image and the position of the previous node is within a certain critical distance (e.g., 20 m).

In an embodiment of the present disclosure, the electronic device my update information associated with a pre-generated node based on information on a new image, when the pre-generated node exists which is located within a certain critical distance (e.g., 1 m) from the position in which the new image is photographed.

In an embodiment of the present disclosure, even though 2D coordinates of a point photographing a new image are present within a certain critical distance from the position of the pre-generated node, when the difference between the height of the position where the new image is photographed and the height of the node is higher than the certain critical height (for example, the position and the node are present on different floors of the same building), the electronic device may generate another node. For example, the electronic device may acquire height information through a height measurement sensor (e.g., an atmospheric pressure sensor 240C, a GPS module 227).

In an embodiment of the present disclosure, the electronic device may generate (or store) a node or update the node, based on pose information (e.g., a pitch indicating the rotation of the vertical axis or tilt, a yaw indicating the lateral axis rotation or pan, a roll indicating the axial rotation in a clockwise or counterclockwise direction (roll)) of the camera.

In an embodiment of the present disclosure, in order not to generate an unnecessary node, the electronic device may not generate a new node when information on the new image (for example, photographing position information, photographing area information, and/or the like) does not satisfy a certain condition (for example, a condition in which the photographing position of the new image is greater than the critical distance from the position of the nodes generated in advance, a condition in which nodes less than a certain number are present within a certain radius from the photographing position of the new image, a condition in which the photographing area of a new image does not overlap with the image photographing area of the pre-generated node, or a condition in which the photographing area of new image and the photographing area of the pre-generated node are overlapped in less than a critical ratio).

In an embodiment of the present disclosure, the electronic device may not generate a new node, or update an existing node, when comparing the new image and the image of the existing node and the difference between the images is less than the critical value (or the difference between the images is small). Technologies, such as simultaneous localization and mapping (SLAM), parallel tracking and mapping (PTAM), parallel tracking and multiple mapping (PTAMM) can be utilized to compare the images.

In an embodiment of the present disclosure, information associated with a node (i.e., node information) may include at least one image corresponding to the position of the space of interest, and additional information associated with the at least one image (or an object displayed on the at least one image). For example, the additional information may include at least one among, metadata (or meta information) additionally describing the at least one image or the photographing status of the at least one image, information inputted by the user or external electronic device (for example, a first external electronic device 102, the second external electronic device 104 or a server 106) for the at least one image (or an object displayed on the at least one image), or context information associated with the user/electronic device. For example, the at least one image may include at least one among at least one still images, panoramic images including at least one partial images, an image or 3D model obtained by measuring the distance to an object using a depth measurement technique (e.g., at least one among time-of-flight (TOF), Kinect™, an IR depth camera, a stereo camera, a laser range finding sensor, an ultrasonic sensor, or a light detection and ranging (LIDAR) sensor), or a video including at least one image.

For example, the metadata may include at least one among depth information associated with the at least one image included in the relevant node information, the photographing position, photographing time, photographing direction (azimuth), photographing angle (tilt, rotation), a camera pose, camera motion, the moving path of the camera, or the photographing area.

For example, the electronic device may detect at least one among a position, a pose (for example, pitch and/or yaw, roll), movement, moving distance, direction (azimuth), and height (or altitude) of the camera (or photographing device) in the space of interest, by using at least one among a wireless sensor that detects a radio signal (for example, Wi-Fi signals, BT signals, RF-ID signals, iBeacon signals, visible light communications (VLC) signals, light fidelity (Li-Fi) signals or cell signals), a pedometer, an accelerometer (or an acceleration sensor), an NFC module, a gyroscope (or a gyro sensor), a geomagnetic sensor (or a magnetic sensor), a depth sensor, an external camera (for example, the camera itself using camera focus information, Internet service provider (ISP), a binocular camera, laser range finder, Kinect™, an IR camera, an IR sensor, an ultrasonic sensor, and/or the like), a barometer, or a marker (for example, bar code, quick response (QR) code, watermark, and/or the like).

For example, the electronic device may obtain the photographing position (or position-related information of node) by utilizing at least one techniques among a Wi-Fi fingerprint technology, and a positioning technology by an NFC/RF-ID, a positioning technology by a marker or LPPe2.0.

For example, the requirements included in the LPPe2.0 to improve the indoor positioning performance, include a radio characteristic information transfer method, an image recognition based (IRB), a pedestrian dead reckoning (PDR), the provision of user equipment (UE)-assisted motion sub-state, the provision of map based attributes, the support of crowd sourcing with respect to position and measurement information of the terminal itself, the provision of indoor and outdoor transition area information, the provision of radio map data, the provision of UE-based IRB positioning, or the provision of improved wireless LAN (WLAN) positioning information.

In an embodiment of the present disclosure, the electronic device may obtain information on photographing position (or the position relevant information of the node) by using an NFC device (for example, an NFC module 228). For example, when the NFC device (e.g., an NFC reader or a sensor) is mounted to a certain interval of the space of interest or a certain position (for example, a position of a door, a corner position of each room, a light position, a center of a wall, a floor or ceiling, and/or the like) of the space of interest, the electronic device may identify the position of the camera (or the electronic device) by receiving the NFC signal, or by receiving the position-related information from the NFC reader received the NFC signal of the electronic device. For example, the accuracy can be further improved depending on the arrangement interval of the NFC device, and the electronic device may predict the coordinates of the camera (or the electronic device) by identifying the moving distance and direction after NFC signal detection.

In an embodiment of the present disclosure, the electronic device may also determine position information of the object photographed or position information of the camera by utilizing the technique of the marker. A marker technique is a technology that identifies the position of the marker by decrypting a particular marker included in the image, and identifies the relative position between the relevant marker and the camera. The marker can be at least one among a bar code, 2D code, QR code, portable data file (PDF)-417, data matrix, ColorCode™, and watermarks. The electronic device may identify the coordinates, direction information, and/or the like, by decoding the marker. Since the shape of the marker is deformed according to the direction photographed by the camera, position information of the camera can be predicted through the pose or direction information of the camera photographing the marker, size information, or the position of the marker on the image, and/or the like. The electronic device may determine a more precise position of the camera by utilizing depth information along with a marker technology.

In an embodiment of the present disclosure, the electronic device may obtain information (or position-related information of the node) on the photographing position by utilizing a robot technology, a proximity sensor, a depth sensor technology, and/or the like.

For example, the electronic device may acquire the 2D map via a robot, and may determine the coordinate position of a particular point in the interest area by linking the relevant map with another positioning technology. For example, a cleaning robot may determine whether a wall or an object is present while moving itself and using a collision sensor, a proximity sensor, an ultra sound sensor, a camera, a depth sensor (for example, TOF, an IR camera, a multi-view camera, and/or the like). In addition, the cleaning robot may determine the distance traveled by using the number of revolutions of a wheel. The cleaning robot may determine the position of the wall and the position of the object in the space of interest, by collecting paths traveled using at least one of a direction sensor, an acceleration sensor, and a gyro sensor, and generate a 2D map (or map information). In addition, the electronic device may determine particular position coordinates in the map, based on information on each position in the 2D map and information obtained through Wi-Fi fingerprints, markers of floors, or NFC sensors of the ceiling, and/or the like. The electronic device may determine a photographing position (or position-related information of the node) by utilizing the map information and the position information obtained through the signal/markers/sensor even during image photographing.

In an embodiment of the present disclosure, a map generating technology using a proximity sensor or a depth sensor can be utilized in a wearable device, CCTV, smart phones, and/or the like, as well as robots.

In an embodiment of the present disclosure, the electronic device may predict altitude information by a height measurement sensor (e.g., an atmospheric pressure sensor 240C, a pressure gauge, and/or the like), and may use the altitude information to constitute a map on each floor in the space of interest, such as a building.

In an embodiment of the present disclosure, the electronic device may record at least one of a variety of context information along with an image photographed at each node. The electronic device may determine an area on which the image photographed by the camera is arranged on a virtual 2D or 3D space through context information.

In an embodiment of the present disclosure, the position information stored along with the image can also be a relative position or path information according to the relationship with another image. For example, the electronic device may identify a relative position relationship (for example, at least one among the arrangement and correlation relationship on the 3D space) between two images, based on the same/similar feature point information of the two images. For example, the feature point in the image can be at least one among an edge, a corner, an image pattern, and a contour. For example, when first and second images are photographed while advancing the electronic device, the first and second images have the same object images (i.e., images with different viewpoints of the same object), and the image of the same object that is present in the second image is larger than the image of the same object present in the first image. Images for the same object in the photographed image may have a difference in size. The electronic device may determine respective position information of the images, by measuring the distance between two nodes using a depth sensor, an acceleration sensor, PDR, or a distance sensor, such as a laser sensor.

In an embodiment of the present disclosure, the electronic device may determine the moving distance between the nodes, by using the position information of the two images, a PDR, a pedometer, or the depth information measured by using the camera at the time of photographing the image. For example, the electronic device may predict the movement distance up to a photographing position of the next image after one image is photographed, by using the motion sensor, and then calculate the movement of the position between the nodes using the movement distance.

In an embodiment of the present disclosure, the electronic device may identify the relative position (e.g., distance and direction) on the 2D space or the 3D space for the node, by using the distance information according to the moving distance, the direction information or the pose information of the camera, and may estimate the coordinates of each node. For example, the electronic device may use the direction information and the pose information of the camera, when moving in another direction as well as a linear movement. For example, the electronic device may configure a virtual 3D map (e.g., a drawing based-virtual 3D model) based on the 2D map information. The electronic device may determine the position and direction of the node or may correct coordinates of the node via matching (or mapping) of the object or feature points in the image, based on an object in the 2D map (i.e., a wall, a corner, an edge, a corridor, a window, and/or the like), or the position of the object (for example, the wall position, the corner position, the edge position, the corridor position, the connection part of the ceiling and the wall, the window position, and/or the like).

In an embodiment of the present disclosure, the electronic device may also use different map information. For example, the electronic device may configure the position (e.g., a position of a doorway) of the current node or a particular node in a 2D drawing of the space of interest (e.g., a building) prepared in advance as the origin through a user input or default settings and then may calculate the relative position of the node by using the movement information or the distance information. For example, the electronic device may correct the position information of the node, using, along with the relative position information, information on matching (or mapping) of an object or the position of the object on the 2D drawing, and an object or a feature point in the image (hereinafter, also referred to as the image of the node) associated with the current node. For example, the electronic device may determine the distance by measuring the distance to an object in an image by using a camera with a built-in depth sensor or a stereoscopic camera (or a binocular camera), or by using the correlation between the position for each pixel in the photographed image and the distance from the camera.

In an embodiment of the present disclosure, when photographing a plurality of images, the electronic device may acquire the moving path of the camera and photographing area-related information in the 3D space or the 2D space, by utilizing at least one among information on a position the respective images are photographed, the direction information and the movement information (for example, rotation, tilt, movement distance) of the camera, or pose information. For example, when the electronic device photographs an image while moving indoors, the path is configured depending on the place where each photograph is taken and the photographing area of the image can be predicted by detecting at least one among the pose, the motion, the direction angle, the tilt angle, the rotation angle, or the horizontal angle of the camera.

Figure 8:
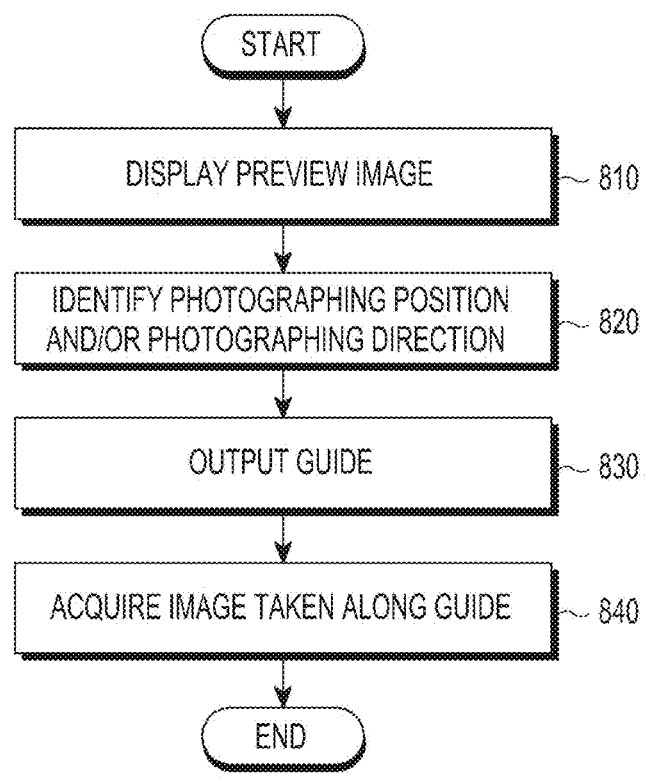
FIG. 8 is a flowchart illustrating a method for operating an electronic device according to various embodiments of the present disclosure.

FIG. 8 is a flowchart illustrating a method for operating an electronic device according to an embodiment of the present disclosure.

Referring to FIG. 8, a method for operating the electronic device may include operations 810 to 840. The method for operating the electronic device can be performed by the electronic device (for example, electronic devices 101, 201, 401), a processor (for example, processors 120, 210) of the electronic device or a controller (for example, the controller 420, the map processing module 421).

In operation 810, the electronic device may display a preview image photographed by a camera (for example, the camera module 291) on a display (for example, the display 160 and 260).

In operation 820, the electronic device may identify the photographing position and/or photographing direction. The electronic device may obtain information on the photographing position and/or the photographing direction of the camera.

In operation 830, the electronic device may output a guide for photographing an image that configures node information. For example, the guide may include at least one among a graphic element (or visual information) (for example, an image, an icon, a text, an item, and/or the like), an auditory element (for example, voice guidance, voice output, and/or the like) or a tactile element (e.g., a vibration).

In an embodiment of the present disclosure, the electronic device may display a guide or an indicator for photographing images constituting the node information. For example, the guide or the indicator can be displayed along with the preview image (or so as not to overlap with the preview image), or can be displayed on the preview image.

In an embodiment of the present disclosure, the position of the guide or the indicator may be determined based on the position and/or direction of the camera.

In an embodiment of the present disclosure, the position of the guide or the indicator may be determined based on the photographing positions or the photographing directions of the images associated with a plurality of nodes.

In an embodiment of the present disclosure, the electronic device may display, on the preview image, a first indicator indicating the position and/or the direction in which an image is to be photographed, and a second indicator indicating the current position or direction.

In operation 840, the electronic device may acquire images photographed along the guide.

In an embodiment of the present disclosure, the electronic device may start photographing of the images constituting the node information based on a user input, or may start the automatic photographing of the images constituting the node information.

In an embodiment of the present disclosure, the electronic device may associate images photographed in accordance with the instructions of the indicator with a new node corresponding to the current position or a node generated in advance.

Figure 9:
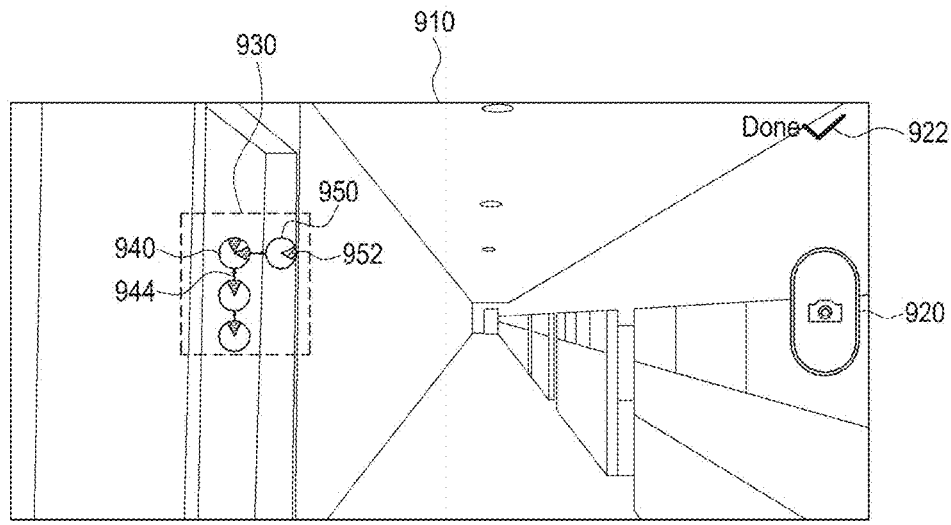
FIG. 9 illustrates a user interface of an electronic device according to various embodiments of the present disclosure.

FIG. 9 illustrates a user interface of an electronic device according to various embodiments of the present disclosure. The user interface can be displayed on a display (for example, the displays 160 and 260) by an electronic device (for example, the electronic devices 101, 201, and 401).

Referring to FIG. 9, the user interface may include a preview image 910 photographed through a camera (for example, a camera module 291), a guide 930 in a mini-map form, for photographing the images constituting the node information, a button 920 for photographing the images constituting the node information, and graphic elements 922 indicating whether photographing of the image which constitutes the node information ends or not, or whether the current photographing position/direction is matched with the position/direction in which an image is to be photographed.

The guide 930 may include a first indicator 950 indicating the current node (or the position of the current node, or the current photographing position) or the position in which an image is to be photographed, and a second indicator 952 indicating the current photographing direction or the direction in which an image is to be photographed.

The guide 930 may include a third indicator 940 indicating a previous node generated in advance (or the position of the previous node, or a previous photographing position), a fourth indicator 942 indicating a photographing direction at the previous node, and a fifth indicator 944 indicating the displacement direction or path between the nodes.

The guide 930 can be displayed on the preview image 910, or can be displayed so as not to overlap with the preview image 910.

In an embodiment of the present disclosure, the position and/or direction of the first indicator 950 can be determined based on the position of the camera.

In an embodiment of the present disclosure, the position and/or direction of the first indicator 950 can be determined based on the position of the node.

In an embodiment of the present disclosure, the position and/or direction of the second indicator 952 can be determined based on the position and/or direction of the camera or the node.

In an embodiment of the present disclosure, the position and/or direction of the first indicator 950 can be determined based on the photographing direction of the at least one previous node.

In an embodiment of the present disclosure, the position and/or direction of the first indicator 952 can be determined based on the photographing position of the at least one previous node.

The electronic device can be a smartphone or a wearable device (for example, Google Glass).

For example, when the electronic device photographs an image while moving in the forward/backward direction (or left/right) from the previous node, the electronic device may generate a new node to be displayed on the display, and store additional information associated with the new node (hereinafter, also referred to as additional information of the node).

For example, when the electronic device photographs images while rotating without moving, the electronic device may not generate a new node, and may add the new image and new information (e.g., a rotation angle) on the previous node that corresponds to the current position.

In an embodiment of the present disclosure, the electronic device may display a pre-stored map according to the execution of a pre-configured application or a function. For example, the electronic device may generate and display a map in response to the execution of the application or the function, and based on pre-stored map information. The electronic device may generate a map using the map information (or node information) updated every time each of the image is photographed.

For example, the electronic device may display a third indicator 940 indicating a previous node generated in advance (or the position of the previous node, or a previous photographing position) in a circle of yellow, and may display a fourth indicator 942 indicating the photographing direction at the previous node in a sector of red.

For example, the electronic device may display a first indicator 950 indicating a current node (or the position of the current node, or current photographing position) in a circle of yellow, and may display a second display 952 indicating the current photographing direction in a sector of green.

For example, in a third node along the illustrated path, it can be seen that the images were taken in two directions (or angles), and the direction (or angles) that is not photographed between the two directions or an area of the relevant direction exists.

In an embodiment of the present disclosure, the electronic device may store, in addition to the horizontal directions illustrated, information on the vertical direction (or angle), directions, such as the ceiling, floor, or areas in the map information, and may display the stored information or status to the user.

For example, the electronic device may overlay or overview in the preview image, a sphere mini-map, a mini-map due to a map projection, and/or the like, as a user interface, may display the map in an on screen display (OSD) format, and may display the map in AR or VR. For example, the map projection may include at least one among an orthographic projection, a stereographic projection, a gnomonic projection, an azimuthal equidistant projection, an azimuthal equal area projection, a cylindrical projection, a Mercator projection, a central cylindrical projection), a Miller cylindrical projection, a Galls cylindrical projection, an equirectangular projection, a cylindrical static projection, a transverse Mercator projection, a pseudo cylindrical projection, a Mollweide projection or homolographic projection, a homolosine projection, an Eckert IV projection, a conic projection, a perspective conic projection, a Lambert conformal conic projection, a Bonne projection, a compromise projection, a Robinson projection, or a Winkel tripel projection.

In an embodiment of the present disclosure, the electronic device may create a new node when the difference between the previous node and the current photographing position is equal to or greater than a preset critical distance.

In an embodiment of the present disclosure, when the distance between two adjacent nodes on a path is more than a certain critical distance, the electronic device may provide a guide to a user so as to photograph at least one image at a position between the two nodes, and when the camera is operated, the electronic device may automatically perform photographing.

In an embodiment of the present disclosure, only when a similarity is less than a certain threshold value (e.g., 70% proportion of the matching (or mapping)) by comparing the photographed new image and the image of the previous node, the electronic device may create a new node or update the previous node. For example, when the image of the previous node adjacent to the current photographing position and the current photographed image include images (i.e., object images (or object image areas)) for the same object, or image areas (i.e., object areas) corresponding to the object, the electronic device may create a new node, only when the difference in size and area of the object images is greater than a certain threshold value.

The electronic device may generate a new node, suppress generating new nodes, and provide the interface, when too many nodes are created in a small area, in order to prevent a case where unnecessary node information is generated, or to supplement a portion where information on the map is insufficient.

In an embodiment of the present disclosure, when the node generation conditions are not satisfied, the electronic device may perform an update operation of adding a newly photographed image and additional information (for example, position information) related to the new image to the information on the previous node. For example, the electronic device may synthesize an image of the previous node and a new image.

In an embodiment of the present disclosure, the electronic device can guide the user so as to photograph an image of an area that is not photographed at the previous node, through additional information (e.g., metadata) of the previous node. For example, the electronic device may determine, in response to an execution of the pre-configured application or function, whether there is an area requiring photographing in the previous node, and guide the user so as to photograph a new image in the direction (and/or angle) corresponding to the determined area, or automatically photograph a new image, based on the photographing direction of the previous nodes adjacent to the current position and information on the position and direction information of the current camera.

For example, the electronic device may capture an area which has not been photographed at a position of the previous node or a position adjacent thereto, and update the information of the previous node by using the photographed new image and additional information associated with the new image (for example, metadata). For example, the electronic device may deform the new image and add the deformed image and additional information associated with the deformed image to information on the previous node, based on additional information of the previous node (e.g., photographing position, photographing angle) and additional information (e.g., photographing position, photographing angle) of the new image that is currently photographed, or based on the relative angle and/or the relative distance, and/or the like, to the object resulting from changing a photographing viewpoint at the new image to a photographing viewpoint at the previous node.

In an embodiment of the present disclosure, the electronic device, when adjacent to the previous node, may provide feedback (e.g., at least one among visual feedback, tactile (or haptic) feedback, or auditory (or audio) feedback) to the user to move to the position of the previous node, and then may guide the user to a direction or position to capture an image of an area that is not photographed at the previous node. The guide may display an area that is not photographed on a preview image (display a rectangular area to be photographed, display a center point area for photographing, or display an indicator indicating the direction), or classify an already photographed area and a non-photographed area (e.g., display a color, transparency, and/or the like, in the preview image), or display through a mini-map.

Figure 10:
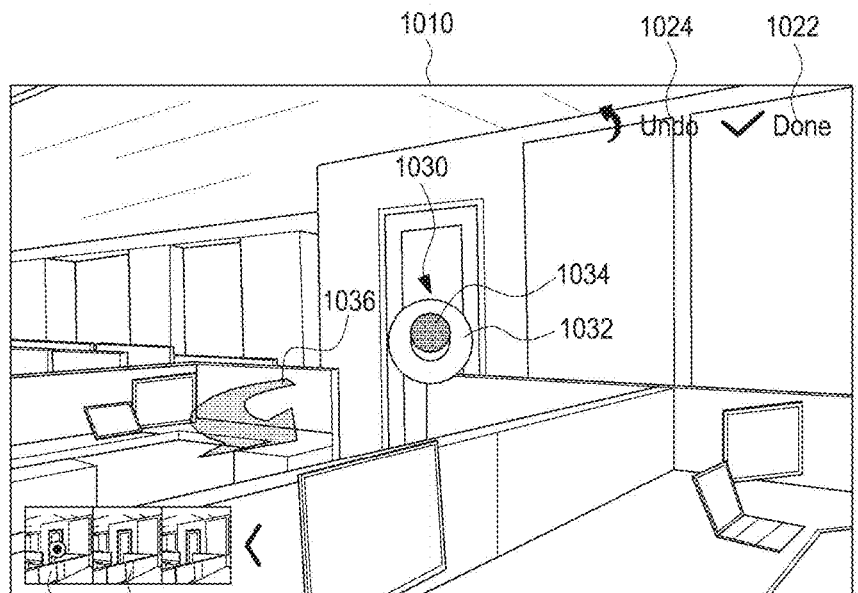
FIG. 10 illustrates a user interface of an electronic device according to various embodiments of the present disclosure.

FIG. 10 illustrates a user interface of an electronic device according to various embodiments of the present disclosure. The user interface can be displayed on a display (for example, the displays 160 and 260) by an electronic device (for example, the electronic devices 101, 201, and 401).

Referring to FIG. 10, the user interface may include a preview image 1010 photographed through a camera (for example, a camera module 291), a first graphic element 1022 which can be selected to capture an image or indicates whether to photograph an image to configure the node information has been completed, or whether the current photographing position/direction matches with the position/direction in which an image is to be photographed, a second graphic element 1024 for cancelling the previous operation, a guide 1030 for photographing the images to configure the node information, and previous images 1040 and 1042.

The guide 1030 may include a first indicator 1032 indicating the direction in which an image is to be photographed, a second indicator 1034 indicating the current photographing direction (e.g., at least one among a camera pointing direction, a center position of the preview image, or a focusing position of the camera), and a third indicator 1036 indicating the direction in which an image is to be photographed after completing the current image photographing. For example, the third indicator 1036 may indicate a counterclockwise rotation after completing the photographing of the current image.

For example, as illustrated in FIG. 10, when the second indicator 1034 is located in the area of the first indicator area 1032, the electronic device may display that image photographing can be possible through the first graphic element 1022. Thereafter, the position of the first indicator 1032 can be changed to display the direction in which an image is to be photographed next, and the second indicator 1034 may display the current photographing direction. In this case, since the first indicator 1032 and the second indicator 1034 display directions different from each other, the first graphic element 1022 can be displayed in a deactivated state (for example, a gray display or no display), or made to be unselected. When the first indicator 1032 and the second indicator 1034 display directions which are the same, a third indicator 1036 may indicate information which guides in advance the direction in which the first indicator 1032 is to be displayed after photographing the current image. When the first indicator 1032 and the second indicator 1034 display the positions which are different from each other and the third indicator 1036 may display information which guides the position of the first indicator 1032 in reference to the position of the second indicator 1034.

The user interface may include a first image 1040 that was associated with the node in advance prior to the execution of the pre-configured application or function, and a second image 1042 that is associated with the node, after execution of the application or the function.

In an embodiment of the present disclosure, the position and/or direction of the first indicator 1032 can be determined based on the photographing position/direction of the first image 1040, which has been associated with the node.

In an embodiment of the present disclosure, the position and/or direction of the third indicator 1036 can be determined based on the photographing position/direction of the first image 1040 and the second image 1042, which have been associated with the node.

For example, the electronic device may display, through the first indicator 1032, a center point (or focus) of a space or direction that is not photographed. For example, the first indicator 1032 may have a form of limiting a critical area (e.g., a blank portion of a center in a closed circular ring shape) (e.g., a shape of displaying a closed ring, the corners of the critical area). The electronic device may guide the user to make the second indicator 1034 indicating the current photographing position belongs to the critical area, or when the second indicator 1034 belongs to the critical area, the electronic device may automatically photograph an image.

In an embodiment of the present disclosure, the electronic device may control the external device (or devices controlled by the external device) to perform the image photographing, by transmitting information on images that have not been photographed to the other external devices (for example, the first external electronic device 102, the second external electronic device 104 or the server 106). For example, the electronic device may make an order that allows a robot cleaner to automatically move for photographing, by delivering the corresponding position/direction information (for example, coordinates, directions, angles, and/or the like) to the robot cleaner having a built-in camera. The control signal can be transmitted through Wi-Fi, VLC, IR, and/or the like, and a command signal can be transmitted from the electronic device or a separate server (such as, a smart home server capable of controlling the home appliances).

In an embodiment of the present disclosure, the electronic device may guide the user so as to photograph an image at one node or at a position adjacent to the node, or may automatically photograph an image according to pre-configured conditions.

In an embodiment of the present disclosure, when the difference between the photographing time included in the additional information (e.g., metadata of the photographed image) of one node and the current time is greater than the certain time, the electronic device may provide a guide to the electronic device or the external device (or a camera system), or transmit an automatic update-related signal so as to update the image of the corresponding direction of the node. For example, when the electronic device is adjacent to the node, the electronic device may provide a guide to the user, or transmit commands to the robot to move to the corresponding position and then to photograph an image.

In an embodiment of the present disclosure, the electronic device may transfer an image update request for the position or direction where the relevant event has occurred to the user and the robot, when a pre-configured event (e.g., sound detection, gas detection) has occurred. For example, the electronic device may detect the position and/or direction where the event has occurred, by using the components of the electronic device or the environment sensor (e.g., a smart home system or a gas detecting sensor which is connected to the electronic device, an audio sensor, and/or the like). For example, a smart home system may store information on the installation position of the individual sensors and devices which are included in the smart home system, and transfer at least part of the position information to the electronic device. The position information can be detected by the individual devices via their own position sensors, and the position information may also be registered in association with the map information (e.g., node). The user may register, by the user interface, the installation position of the sensor or the device to the map information. The electronic device may register the position information by determining the corresponding sensor or device through the image recognition from the images photographed during the creation of the nodes, and storing the determined sensor or device in connection with the node.

In an embodiment of the present disclosure, the image and/or the additional information included in the node information (or metadata) may be stored in a device (for example, one of the electronic device, smartphone, wearable device, or a robot) that has photographed an image and the image and/or additional information stored in the device may be transmitted to at least one servers. The type of server can vary depending on the photographed position and service. For example, images and/or additional information (or metadata) photographed by a family and a robot cleaner at home can be stored in a smart home server after going through a verification.

In an embodiment of the present disclosure, when a plurality of users share the map information with each other by using social networking services (SNSs) resulting from an operation of the SNS application, the image and/or additional information (or metadata) may be transmitted to and stored in the SNS server.

In an embodiment of the present disclosure, in the case of a disaster situation, images and/or additional information of the relevant areas and buildings which are exposed via the Internet are searched and stored in a server of a disaster management center. For example, images and/or additional information may be transmitted to the disaster center by pre-configured conditions (for example, the user's permission) from, such as a home server, an SNS server, and/or the like.

Figure 11:
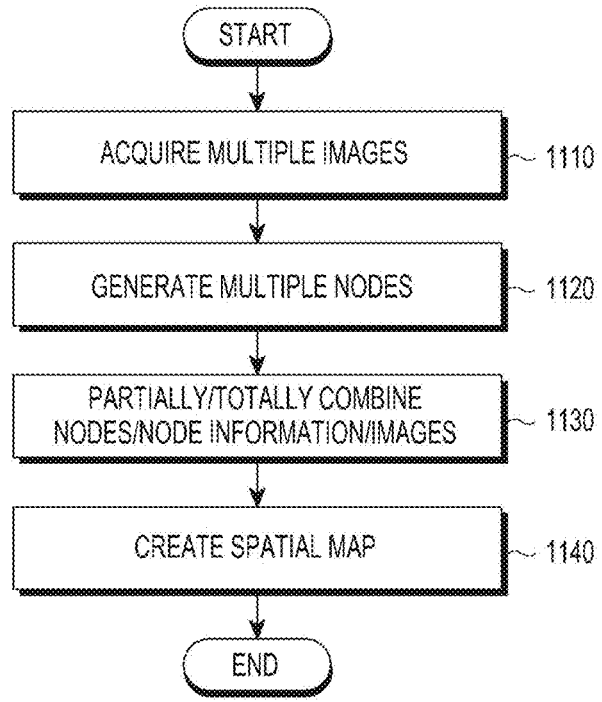
FIG. 11 is a flowchart illustrating a method for operating an electronic device according to various embodiments of the present disclosure.

FIG. 11 is a flowchart illustrating a method for operating an electronic device according to an embodiment of the present disclosure.

Referring to FIG. 11, a method for operating the electronic device may include operations 1110 to 1140. The method for operating the electronic device can be performed by the electronic device (for example, electronic devices 101, 201, 401), a processor (for example, processors 120, 210) of the electronic device or a controller (for example, the controller 420, the map processing module 421).

In operation 1110, the electronic device may acquire a plurality of images photographed at a plurality of positions within the space of interest (e.g., an indoor space of a building, or an outdoor space, such as parking lots, botanical gardens, and/or the like).

In an embodiment of the present disclosure, the electronic device may acquire the additional information associated with each of the image.

In operation 1120, the electronic device may generate a plurality of nodes associated with the plurality of images (and the plurality of additional information).

In operation 1130, the electronic device may partially/totally combine (or synthesize) information regarding at least some of the nodes (or at least some images), or information on at least some of the nodes among the plurality of nodes (or of the plurality of images).

In an embodiment of the present disclosure, the electronic device may combine nodes (or images) within a pre-configured critical distance among the plurality of nodes, as one node (or one image).

In an embodiment of the present disclosure, the electronic device may share at least some of information on at least one node between two nodes, with respect to two nodes (or images) within a pre-configured critical distance among the plurality of nodes. For example, the electronic device may add at least a part of the first image of the first node to the second node information (that is, information on the second node). For example, the electronic device may add at least a part of the second image of the second node to the first node information (that is, information on the first node). For example, when the first image of the first node shares a part of the second image of the second node, at least some of the first image may be added to the second node information.

In an embodiment of the present disclosure, the electronic device may partially/totally combine images obtained by photographing the same object among the plurality of images, images having areas matching (or mapping) (e.g., the feature point matching) each other, and images having a continuity of each other. For example, the electronic device may combine at least a part of the first image of the first node to the second image of the second node. For example, the electronic device may combine at least a part of the second image of the second node to the first image of the first node.

In operation 1140, the electronic device may create a spatial map (or 3D map) including a plurality of nodes and the path (or connection) between the pluralities of nodes.

Figure 12:
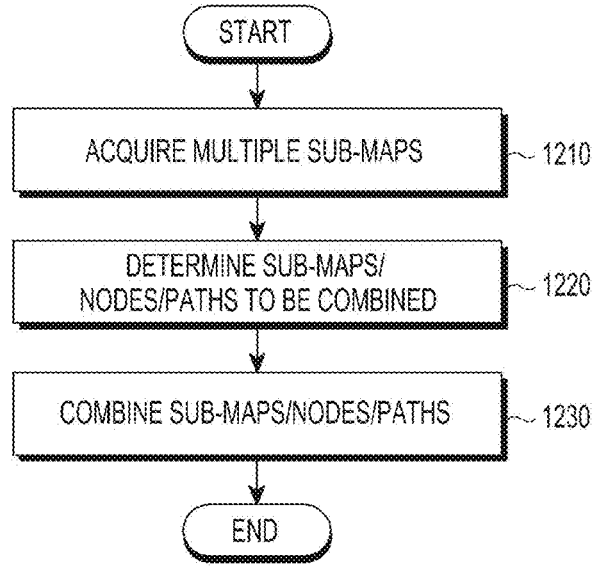
FIG. 12 is a flowchart illustrating a method for operating an electronic device according to various embodiments of the present disclosure.

FIG. 12 is a flowchart illustrating a method for operating an electronic device according to an embodiment of the present disclosure.

Referring to FIG. 12, a method for operating the electronic device may include operations 1210 to 1230. The method for operating the electronic device can be performed by the electronic device (for example, electronic devices 101, 201, 401), a processor (for example, processors 120, 210) of the electronic device or a controller (for example, the controller 420, the map processing module 421).

In operation 1210, the electronic device may acquire a plurality of sub-maps corresponding to a plurality of paths within the space of interest (e.g., an indoor space of a building, or an outdoor space, such as parking lots, botanical gardens, and/or the like).

For example, respective sub-maps may include the plurality of nodes and paths connecting the plurality of nodes. For example, each node (or node information which is information on each node) may include at least one image and additional information associated with the at least one image.

In an embodiment of the present disclosure, images photographed at each node can be synthesized in a form of a panoramic image for each node. The form of the panoramic image can be any one of cylindrical type, cube type and sphere type.

In an embodiment of the present disclosure, a 3D image (i.e., the photographed image taken of at least a part of the space of interest, or a virtual model indicating at least a portion of the space of interest) which is checked or searched on one node can be formed by photographing one panoramic image at the node.

In an embodiment of the present disclosure, the electronic device can be taken at a plurality of angles at one node, or can analyze the feature points of a plurality of images photographed at adjacent nodes, and generate a 3D image by using images in which feature points are matched (or mapped) with each other.

For example, the panoramic image may also be formed by utilizing the depth information. For example, when the plurality of objects exist in the photographing area, or pillars or windows of the room exist in the photographing area, the panoramic image for the photographing area have depth information to each object according to the direction, angle, and/or the like, because the distance between the camera (or the photographing device) and each object is different. In addition, the panoramic image may have various changes depending on the position of photographing.

In operation 1220, the electronic device can determine sub-maps to be combined, or nodes/paths of sub-maps to be combined.

In an embodiment of the present disclosure, an image photographed at one position of the indoor space can be matched to the virtual 3D space, by using the additional information (or metadata) associated with the image. For example, the matching of the image on the 3D space may also be performed for each node. For example, the matching of the image on the 3D space may also be generated in an area between the nodes. The 3D space may be a virtual space having a horizontal area and height, and may be a spherical, circle, cylindrical, or polyhedral space which are limited to a certain size.

In an embodiment of the present disclosure, the electronic device may determine that two different paths are to be combined, when the two different paths overlap each other or the two different paths are adjacent within a pre-configured critical distance.

In an embodiment of the present disclosure, the electronic device may determine that two different paths and/or two adjacent nodes of the two different paths are to be combined, when the distance between the two adjacent nodes is within a pre-configured critical distance.

In an embodiment of the present disclosure, the electronic device may determine that two different paths and/or two nodes of the two different paths are to be combined, when the images of the two nodes include images for the same object. For example, the electronic device may analyze the feature points of the images of the two nodes, and determine combining (or synthesizing) images in which the feature points are matched (mapped) with each other.

In operation 1230, the electronic device may combine sub-maps or nodes/paths of the sub-maps.

In an embodiment of the present disclosure, the electronic device may generate one node to replace two adjacent nodes, or may integrate one node of the two adjacent nodes into the remaining node.

In an embodiment of the present disclosure, when the paths of the two sub-maps are overlapped with each other, the electronic device may analyze feature points of images of nodes located or adjacent in the overlapped points or areas, and generate new image (for example, 3D images) by using images in which the feature points are matched (or mapped) with each other.

In an embodiment of the present disclosure, the electronic device may generate a new image (for example, a 3D image such as, a panoramic image, and a 3D modeling image) by combining (or synthesizing) images of the adjacent nodes based on a photographing direction, a photographing angle, resolution, and/or the like. For example, the electronic device may determine a similarity of the images, or may generate a single image by combining (synthesizing) two or more images, by using at least one among scale invariant feature transform (SIFT), histogram of oriented gradient (HOG), Haar-like feature, Ferns, local binary pattern (LBP), and modified census transform (MCT).

In an embodiment of the present disclosure, the electronic device may change (for example, integrate some/all, connect, rotate, move, and change/add of a connection node) paths connected to the nodes in response to combining the nodes.

In an embodiment of the present disclosure, the electronic device may change (e.g., change a node position, a photographing direction, a photographing angle, and/or the like) an image and/or the additional information of at least one other node on the path according to the combining of the nodes and/or changing of the paths.

Figure 13:
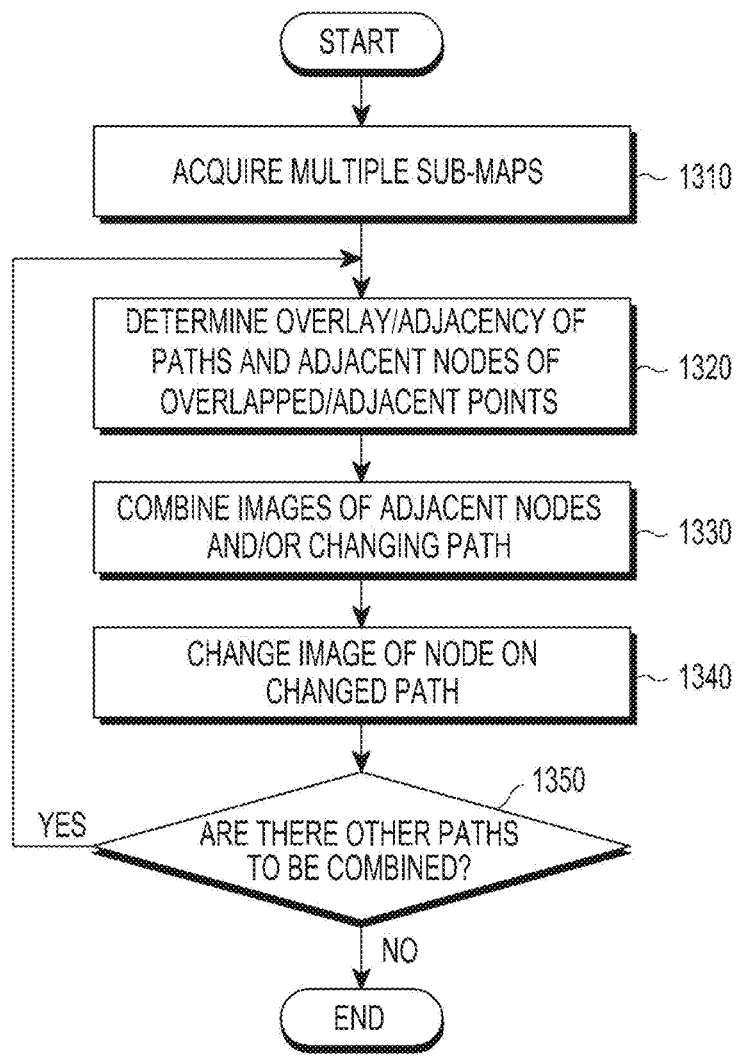
FIG. 13 is a flowchart illustrating a method for operating an electronic device according to various embodiments of the present disclosure.

FIG. 13 is a flowchart illustrating a method for operating an electronic device according to an embodiment of the present disclosure.

Referring to FIG. 13, a method for operating the electronic device may include operations 1310 to 1350. The method for operating the electronic device can be performed by the electronic device (for example, electronic devices 101, 201, 401), a processor (for example, processors 120, 210) of the electronic device or a controller (for example, the controller 420, the map processing module 421).

In operation 1310, the electronic device may acquire a plurality of sub-maps corresponding to a plurality of paths within the space of interest (e.g., an indoor space of a building, or an outdoor space, such as parking lots, botanical gardens, and/or the like).

For example, respective sub-maps may include the plurality of nodes and paths connecting the plurality of nodes. For example, each node (or node information which is information on each node) may include at least one image and additional information associated with the at least one image.

In operation 1320, the electronic device may determine overlay/adjacency of the paths and adjacent nodes of the overlapped/adjacent points.

The electronic device may determine whether the two different paths are overlapped, or whether the two different paths are adjacent to each other within a pre-configured critical distance. The electronic device may determine the adjacent nodes which located in the overlapped/adjacent points (or area) of the two paths.

In operation 1330, the electronic device can perform combining the images of the adjacent nodes and/or changing a path.

In an embodiment of the present disclosure, the electronic device may generate one node to replace two adjacent nodes, or may integrate one node of two adjacent nodes into the remaining node.

The electronic device may analyze the feature points of the images of adjacent nodes located in the overlapped/adjacent points (or area), and combine (or synthesize) the images in which feature points are matched (or mapped) with each other. The electronic device may change (for example, integrate some/all, connect, rotate, move, and change/add of a connection node) paths connected to the nodes in response to combining the nodes (or combining the images).

In operation 1340, the electronic device may change the image of the node on the changed path.

In an embodiment of the present disclosure, the electronic device may change (e.g., change a node position, a photographing direction, a photographing angle, and/or the like) an image and/or the additional information of at least one other node on the path according to the combining of the adjacent nodes and/or changing of the paths.

In operation 1350, the electronic device may determine whether there are other paths to be combined. When it is determined in operation 1350 that the other paths to be combined exist, the electronic device may repeat the operation 1320, and when it is determined in operation 1350 that the other paths to be combined are not exist, the electronic device may terminate the present method.

Figure 14:
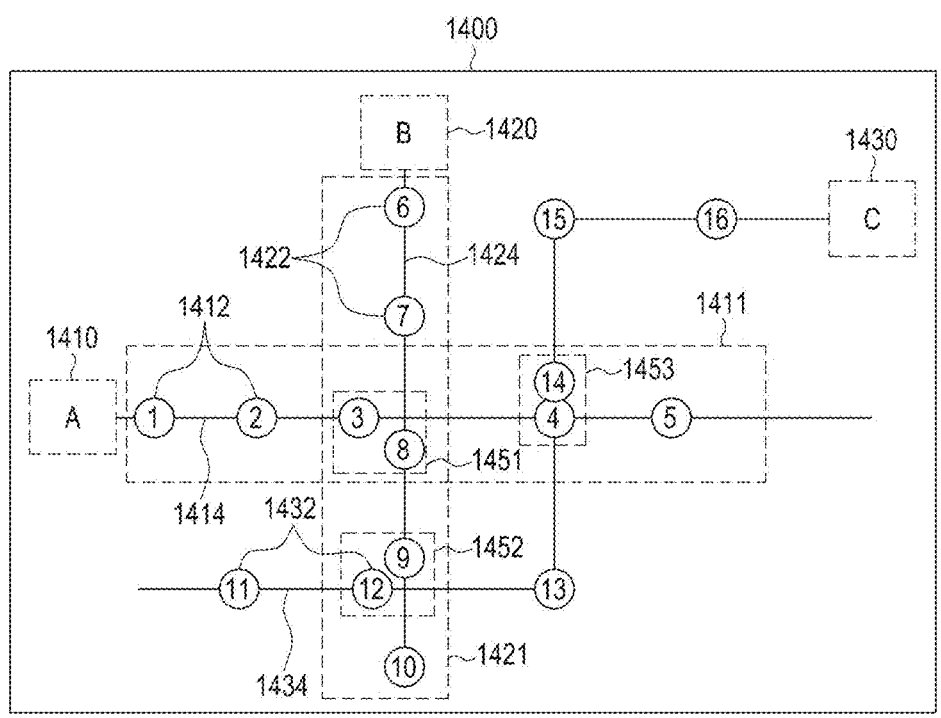
FIG. 14 is a diagram illustrating a spatial map for a space of interest according to various embodiments of the present disclosure.

FIG. 14 is a diagram illustrating a spatial map for a space of interest according to an embodiment of the present disclosure.

Referring to FIG. 14, for example, a spatial map for a space of interest 1400 may include first to third sub-maps 1410, 1420, and 1430. Each of the sub-maps 1410, 1420, and 1430 may include a plurality of nodes 1412, 1422, and 1432, and include paths 1414, 1424, and 1434 for connecting the plurality of nodes. For example, respective nodes 1412, 1422, and 1432 (or node information which is information on respective nodes 1412, 1422, and 1432) may include at least one image and additional information associated with the at least one image.

For example, the first sub-map 1410 may include a first to fifth nodes 1412, and a first path 1414 connecting the first to fifth nodes 1412. A second sub-map 1420 may include a sixth to tenth nodes 1422, and a second path 1424 connecting the sixth to tenth nodes 1422. A third sub-map 1430 may include an eleventh to sixteenth nodes 1432, and a third path 1434 connecting the eleventh to sixteenth nodes 1432.

The electronic device (for example, the electronic devices 101, 201, 401), or the processor of the electronic device (for example, processors 120, 210), or the controller (for example, the controller 420, the map processing module 421) may configure a bounding box for the respective sub-maps 1410, 1420, and 1430 (or respective nodes). For example, the bounding box can be defined by coordinates (e.g., {x1, y1, x2, y2}) with respect to an origin (for example, a corner and a center of the space 1400) of the space 1400. For example, the electronic device may configure the first bounding box 1411 for the first sub-map 1410, and the electronic device may configure a second bounding box 1421 for the second sub-map 1420.

The electronic device may determine the overlay/adjacency of the paths 1414, 1424, and 1434 and adjacent nodes of the overlapped/adjacent points.

In one embodiment of the present disclosure, the electronic device may determine (or identify) whether the paths 1414, 1424, and 1434 are overlapped, based on the bounding boxes of the first to third sub-maps 1410, 1420, and 1430. The electronic device may determine (or identify) nodes which belong to or adjacent to overlapped points (or area) 1451, 1452, and 1453. For example, the electronic device may identify the overlap of a first bounding box 1411 and a second bounding box 1421. The electronic device may identify the third node 1412 and the eighth node 1422 which belong to the overlapped point 1451 (or area).

FIG. 14 illustrates a 2D spatial map for a space of interest 1400 and is represented when each of the path and node is placed on a plane, however, according to another example, which may be represented by disposing the path and node in a 3D space. Accordingly, since the bounding boxes may be also placed in the 3D space, a reference to determine the adjacent node can be different. For example, although the bounding boxes have similar 2D coordinates (x, y), in a case where the layer of the building in which the relevant nodes are arranged are different, the height (z) are different from each other and the bounding boxes do not overlap physically, thus it cannot be determined as the adjacent nodes. In one embodiment of the present disclosure, the size and shape of the bounding boxes may be determined by using at least one among a position of an object, a range of the image photographed at the node, depth information, and a distance from the node. For example, the bounding box can be configured by limiting the range of the nodes and paths to a certain distance or height. For example, the bounding box can be limited by the distance of up to things, such as a wall or objects. For example, the electronic device may configure the bounding box with a reference to a certain distance or a certain height from the node or the path, and if objects are present in the distance, may limit the bounding box to the distance up to the relevant things.

According to an embodiment of the present disclosure, the bounding box may have a pipe shape, a sphere shape for each node, shape of connecting nodes, and an amorphous shape.

Figure 15:
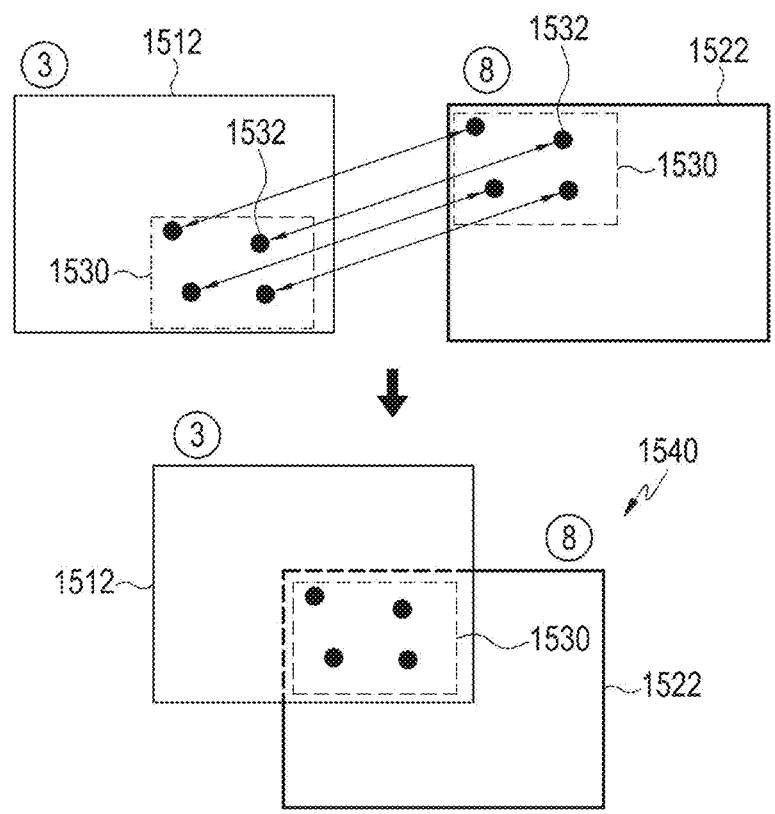
FIG. 15 is a diagram illustrating a combination of images according to various embodiments of the present disclosure.

FIG. 15 is a diagram illustrating a combination of images according to an embodiment of the present disclosure.

Referring to FIGS. 1, 4, and 14, the electronic device (for example, the electronic devices 101, 201, 401), or the processor of the electronic device (for example, processors 120, 210), or the controller (for example, the controller 420, the map processing module 421) may combine images based on a common part of the images of adjacent nodes (e.g., the third node 1412 and the eighth node 1422).

Referring to FIG. 15, for example, the electronic device may identify a common part 1530 of a third image 1512 of the third node 1412 and an eighth image 1522 of the eighth node 1422, through a matching (or mapping) of feature points 1532 (for example, an edge, a corner, an image pattern, an outline). The electronic device may determine the common part 1530 taking into account the deformation that occurs according to conditions, such as a photographing angle, a distance, and/or the like, of the camera. For example, the electronic device may determine the photographed areas as a common part when the similarity by the feature points 1532 among the photographed areas is not less than a certain coincidence (for example, 80%).

The electronic device may generate an integrated image 1540, based on the common part 1530, by combining the third image 1512 and the eighth image 1522. For example, the electronic device may use SLAM, PTAM or PTAMM techniques, in order to generate an integrated image.

Figure 16A:
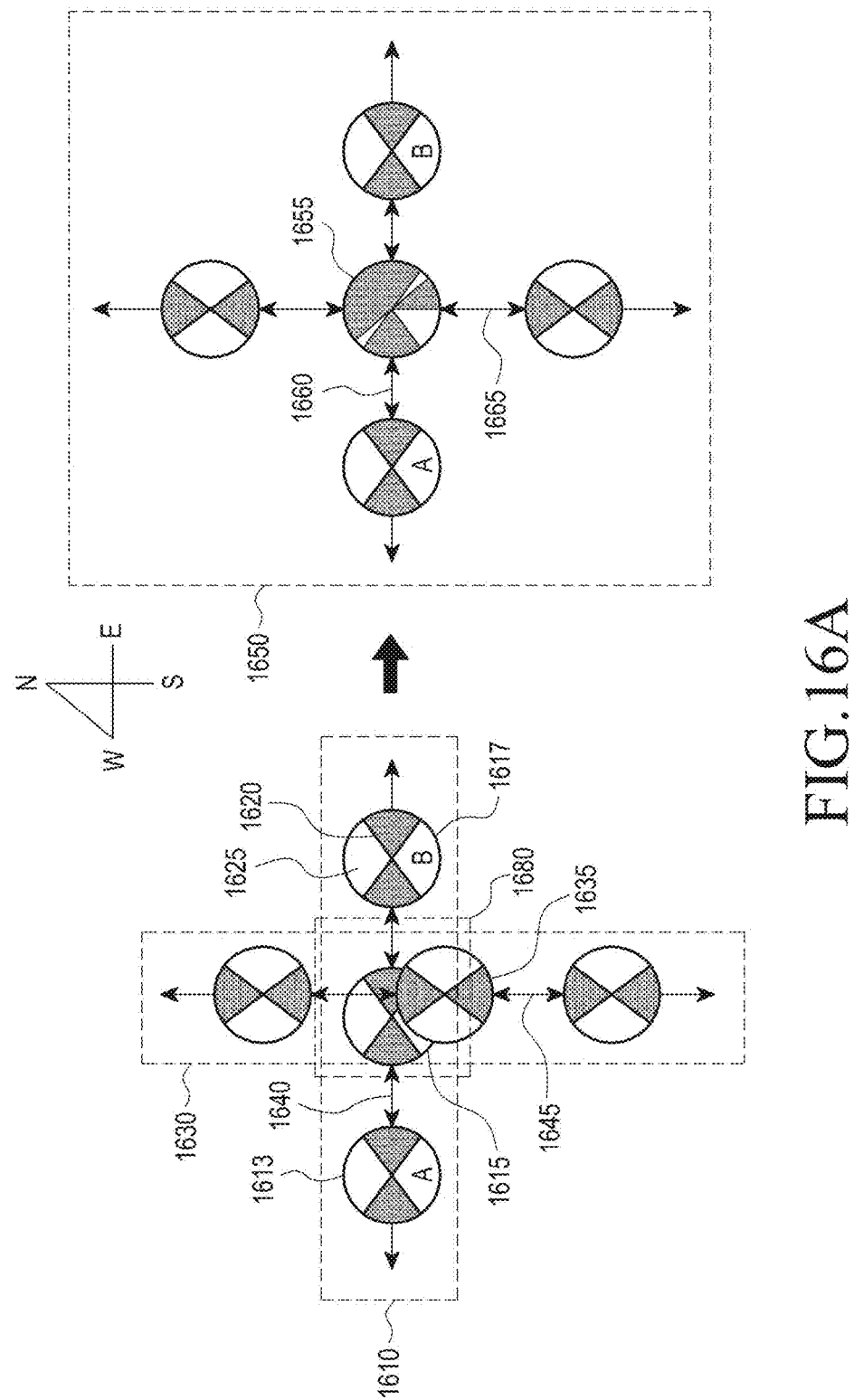
FIGS. 16A, 16B, and 16C illustrate a process of synthesizing maps by an electronic device according to various embodiments of the present disclosure.
Figure 16B:
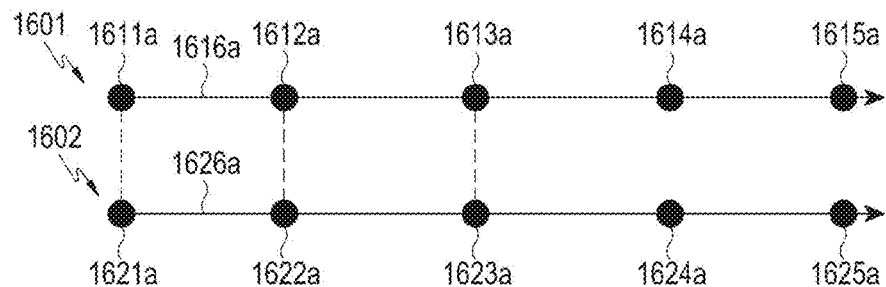
Figure 16C:
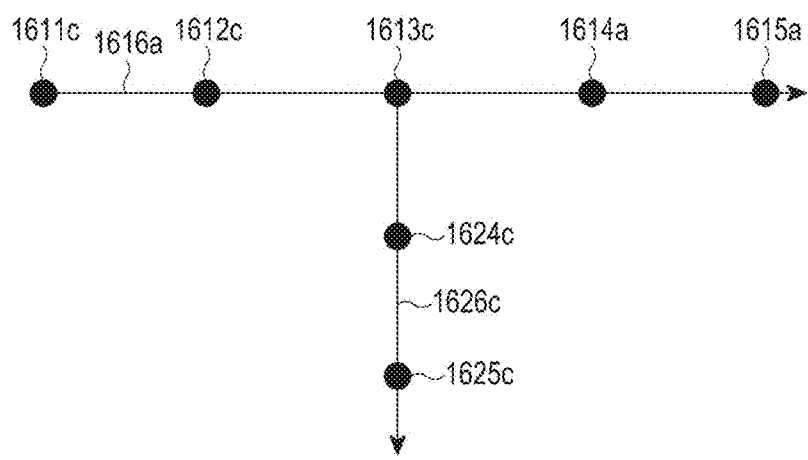

FIGS. 16A, 16B, and 16C illustrate a processes of synthesizing maps by an electronic device according to various embodiments of the present disclosure.

Referring to FIG. 16A, a first map 1610, according to various embodiments of the present disclosure, may include paths (for example, a first path 1640, and/or the like) connecting between a plurality of nodes (for example, a first node 1615, a fourth node 1613, a fifth node 1617, and/or the like). In such a same context, a second map 1630 according to various embodiments of the present disclosure may include paths (e.g., a second path 1645) for connecting a plurality of nodes (e.g., a second node 1635).

Information associated with a node in accordance with various embodiments of the present disclosure may include at least one among position information of the node, path information to other nodes, a set of images corresponding to the node or photographing direction information of the image included in the image set. For example, information associated with the fifth node 1617 may include the path information between the fifth node 1617 and the first node 1615, photographing direction information 1620 indicating the photographing direction of respective images included in the image set associated with the fifth node 1617, or non-photographed direction information 1625 on direction that has not been photographed images in relation to the fifth node 1617.

The electronic device according to various embodiments of the present disclosure may generate a new map (e.g., a third map 1650) including at least some of each of the multiple maps, by using information related to the nodes included in the multiple maps, respectively (e.g., the first map 1610 and the a second map 1630)). The electronic device may create a new node or update at least one of the existing nodes, and then utilize them in the process of creating a new map.

According to an embodiment of the present disclosure, the electronic device may generate new information from the nodes included in the maps which are prior to being synthesized, in the process of creating a new map. For example, the electronic device may generate the path information on the path 1660 and 1665 which is connected from the node of the first map, via the node (e.g., a third node 1655) at the intersection 1680 of paths, to the node included in the second map. For example, a third image obtained by synthesizing the first image related to the first node 1615 and the second image included in the second node 1635 may be included in the new map.

According to an embodiment of the present disclosure, the electronic device may synthesize intersection nodes adjacent to a position 1680 where a plurality of maps encounters as a single node. For example, the electronic device may generate a new node including at least some among information (e.g., position information, the associated image set, acquiring direction of the images included in the associated image set, and/or the like) on the intersection nodes. For example, the electronic device may generate the third node 1655 including the image set and the image acquiring direction corresponding to the first node 1615, the image set and the image acquiring direction corresponding to the second node 1635, information on the first path 1640, and information on the second path 1645.

Referring to FIG. 16B, the spatial map for the space of interest may include first and second sub-maps 1601 and 1602. The first sub-map 1601 may include the eleventh to fifteenth nodes 1611a, 1612a, 1613a, 1614a, and 1615a and the first path 1616a. The second sub-map 1602 may include the 21st to 25th nodes 1621a, 1622a, 1623a, 1624a, and 1625a and the second path 1626a.

Referring to FIGS. 16B and 16C, the 21st to 23rd nodes 1621a, 1622a, and 1623a can be combined with (or integrated into) the 11th to 13th nodes 1611a, 1612a, and 1613a, respectively. Depending on the combination of the nodes, the 11th to 13th nodes 1611a, 1612a, and 1613a can be changed to nodes 1611c, 1612c, and 1613c, respectively, including at least some of the information on the relevant node among the 21st to 23rd nodes 1621a, 1622a, and 1623a. Depending on the combination of the nodes, the second path 1626a can be changed to the path 1626c connecting the 13th node 1613c, the 24th node 1624c, and the 25th node 1625c. For example, when analyzed that the image included in the 13th node 1613a and the image included in the 24th node 1624a have a common part with each other (for example, the feature point matching), the relative position of the 13th node 1613a and the 24th node 1624a can be determined based on the common part. For example, in the case where the 24th nodes 1624a is determined to be located in a south direction of the 13th node 1613a, some of the second path 1626a connecting the 24th node 1624a and the 25th node 1625a can be rotated (for example, 90 degrees rotation in a clockwise). Depending on the change of the second path 1626a, each of the 24th node 1624a and the 25th node 1625a can be changed to the nodes 1624c and 1625c which have reflected the change of the second path 1626a.

In an embodiment of the present disclosure, the electronic device may perform the operation, such as the following (1) to (6).

For example, the spatial map (3D Map) can be configured as the sum (or total) of the plurality of sub-maps (Sub-1 to Sub-N) (example, Sub-1+Sub-2+ . . . +Sub-N). Each of the sub-maps may include the plurality of nodes, paths connecting the plurality of nodes, and bounding box information. For example, the bounding box information may include the coordinates, such as {x1, y1, x2, y2}. An associative law (e.g., Sub-1+(Sub-2+Sub-3)=(Sub-1+Sub-2)+Sub-3) can be applied between the plurality of sub-maps. For example, the first sub-map (Sub-1) may include a plurality of nodes (a-1, a-2, a-3, . . . , a-N), and the second sub-map (Sub-2) may include the plurality of nodes (b-1, b-2, b-3, . . . , b-N).

(1) The electronic device may calculate or identify the bounding box of the corresponding sub-map (for example, the first sub-map (Sub-1)), and search another sub-map (for example, a second sub-map (Sub-2)) having another bounding box overlapped with the bounding box. The bounding box can be configured for each path, or can be configured for each node.

(2) The electronic device may determine the common part of the two images, by performing feature points matching (or mapping) on the two images of the two nodes belong to or are adjacent to the overlapped point (or area) of the overlapped sub-maps.

(3) The electronic device may calculate the rotation angle for at least one among the paths of the overlapped sub-maps, by utilizing the information on the feature points matching (or mapping) between the two images.

(4) The electronic device may rotate at least one of the paths of the overlapped sub-maps according to the rotation angle.

(5) When another sub-map having another bounding box overlapped with the bounding box of the sub-map exists, the electronic device may repeat the processes (2) to (4).

(6) The electronic device may repeat the processes (1) to (5) for each sub-map.

In an embodiment of the present disclosure, the electronic device can form a virtual 2D or 3D spatial model by utilizing an existing map drawing. The electronic device may match (or map) the image of each node to the spatial model, by using at least one among relative positions between the nodes, the photographed image or positioning information. For example, the electronic device may create a virtual 3D model by mapping the image of the node to the position of the feature parts (e.g., a wall, a corner, a connection part of the ceiling and the wall, a window, and/or the like) of the 2D spatial model or 3D spatial model.

FIGS. 17A, 17B, 18A, 18B, 19A, 19B, and 20 are diagrams illustrating a method for generating a 3D panoramic image according to various embodiments of the present disclosure.

Figure 17A:
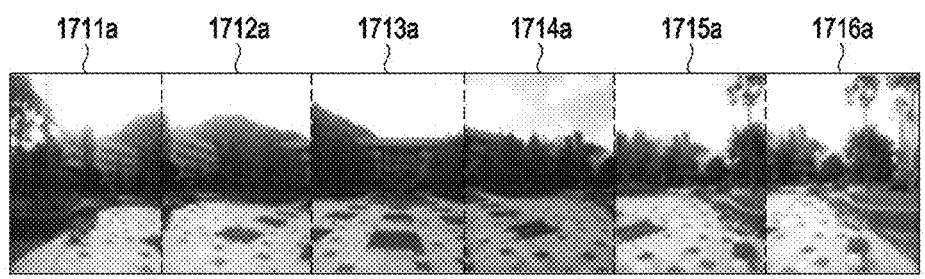
FIGS. 17A, 17B, 18A, 18B, 19A, 19B, and 20 are diagrams illustrating a method for generating a three-dimensional (3D) panoramic image according to various embodiments of the present disclosure.

Referring to FIG. 17A, the electronic device (for example, the electronic devices 101, 201, 401), or the processor of the electronic device (for example, processors 120, 210), or the controller (for example, the controller 420, the map processing module 421) may acquire the first to sixth images 1711a, 1712a, 1713a, 1714a, 1715a, and 1716 taken of the interest area at various angles.

Figure 17B:
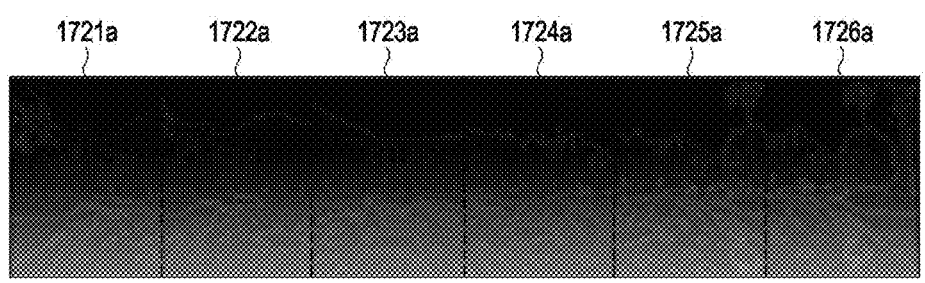

Referring to FIG. 17B, the electronic device may acquire the first to sixth depth maps 1721a, 1722a, 1723a, 1724a, 1725a, 1726a) (or depth map images) corresponding to the first to sixth images 1711a, 1712a, 1713a, 1714a, 1715a, 1716a.

The electronic device may determine the common part of the two adjacent images, by performing the feature point matching (or mapping) for the two adjacent images of the first to sixth images 1711a, 1712a, 1713a, 1714a, 1715a, and 1716a. The electronic device may combine (or synthesize, or stitch) the two adjacent images based on the common part.

Figure 18A:
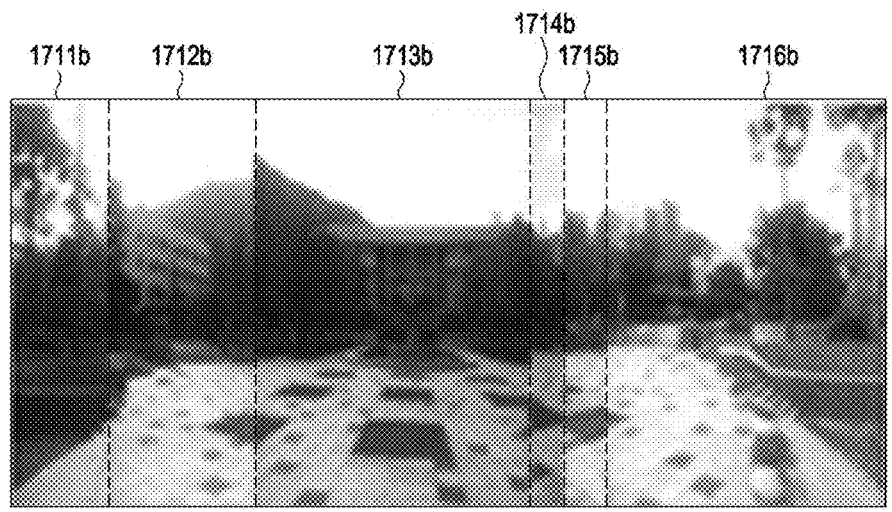

Referring to FIG. 18A, the electronic device may combine the first to sixth image portions 1711b, 1712b, 1713b, 1714b, 1715b, and 1716b.

Figure 18B:
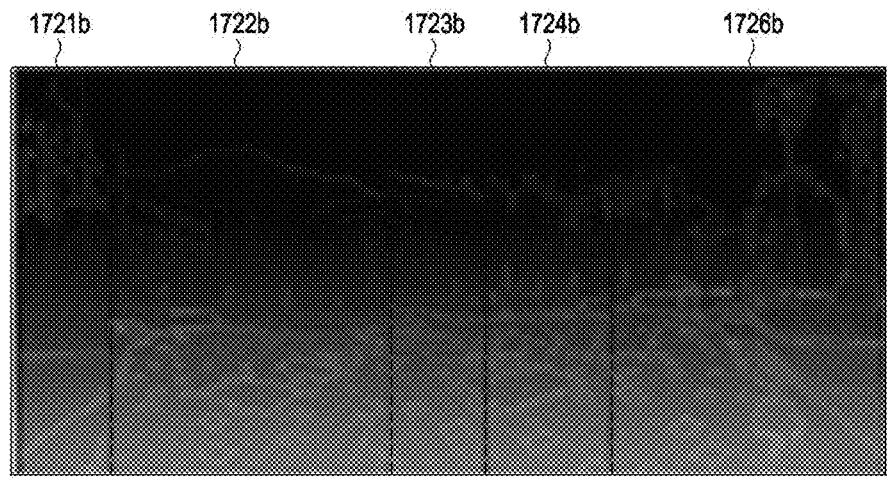

Referring to FIG. 18B, the electronic device may combine the first, second, third, fourth and sixth depth map portions 1721b, 1722b, 1723b, 1724b, and 1726b.

According to an embodiment of the present disclosure, the electronic device may determine the common part of the two adjacent depth maps, by performing the feature point matching (or mapping) for the two adjacent depth maps of the first to sixth depth maps 1721a, 1722a, 1723a, 1724a, 1725a, and 1726a. The electronic device may combine (or synthesize) the two adjacent depth maps based on the common part.

According to an embodiment of the present disclosure, the electronic device may determine the common part of the two adjacent images by performing a feature point matching (or mapping) to the two adjacent images of the first to sixth images 1711a, 1712a, 1713a, 1714a, 1715a, and 1716a, and may determine the common part of the two adjacent depth maps corresponding to the common part among the first to sixth depth maps 1721a, 1722a, 1723a, 1724a, 1725a, and 1726a.

Figure 19A:
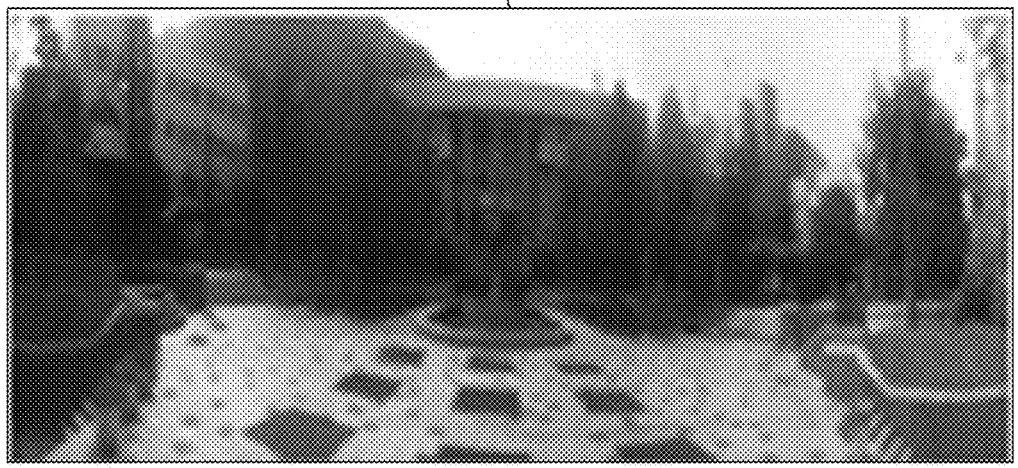

Referring to FIG. 19A, the electronic device may generate a temporary panoramic image 1710a which has not reflected depth information, by performing a correction process (e.g., an interpolation, a smoothing, a size conversion, an angle conversion, a position conversion, a sheer process) for the first to sixth image portions 1711b, 1712b, 1713b, 1714b, 1715b, and 1716b.

Figure 19B:

Referring to FIG. 19B, the electronic device may generate a panoramic depth map 1720 by performing a correction process for the first, second, third, fourth and sixth depth map portions 1721b, 1722b, 1723b, 1724b, and 1726b.

Figure 20:
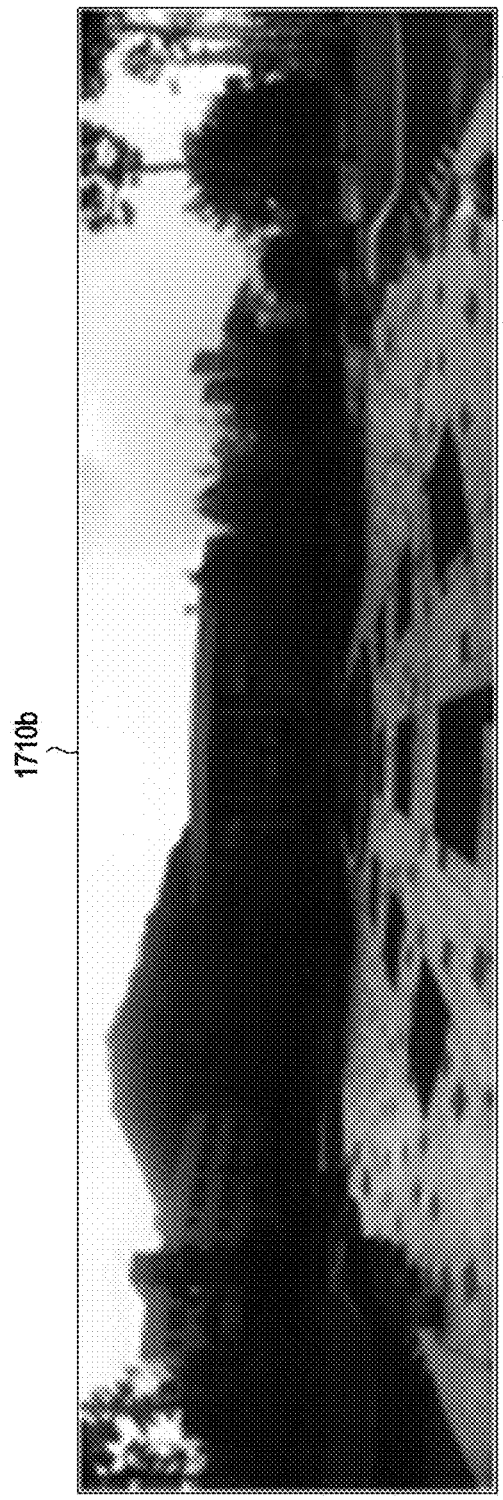

Referring to FIG. 20, the electronic device may generate a final panoramic image 1710b, which has reflected depth information by correcting the temporary panoramic image 1710a, based on the panoramic depth map at operation 1720, such that the object images included in the temporary panoramic image 1710a have a perspective.

In an embodiment of the present disclosure, the electronic devices (for example, the electronic devices 101, 201, and 401), or the processor of the electronic device (for example, the processors 120 and 210), or the controller (for example, the controller 420, the map processing modules 421)) may determine the structure of the space of interest and the position of the object through the 3D model created using a LIDAR technology, a binocular camera, a camera having a depth sensor, and/or the like. The electronic device may map the photographed image with the 3D model, by using the positioning information measured during the creation of the 3D model, or by comparing at least some similarity among images taken during the creation of the node and 3D model (or the 3D model image). For example, the electronic device may acquire the depth map (or the depth map image) by using sensors, such as Kinect™, IR cameras, which is capable of acquiring depth information, and may generate a 3D model using the depth map. The electronic device may photograph an object using a color camera, and may configure a color 3D map by mapping the image of the object to the 3D model based on the analysis of the feature point.

In an embodiment of the present disclosure, the electronic device receives data (or an image) for creating a 3D model from a first external device along with the first context information (for example, position, direction, height, and/or the like) of the first external device, associated with the data, and then add or apply the received data and the information to a 3D model (or 3D model data). The electronic device can receive the image from the first external device or a second external device, and the second context information measured at the time of photographing of the image. The electronic device can map images to the 3D model, by utilizing the first context information and the second context information altogether. The electronic device may further perform, for more accurate matching, an image analysis (e.g., image segmentation for matching with the model, feature point extraction, image segmentation, image direction alignment, and/or the like) of the 3D model and the images.

In an embodiment of the present disclosure, each node may include a depth map generated or photographed by using a depth sensor and a color image obtained by utilizing the color camera. The electronic device may form a virtual 3D spatial map (or map image) by correcting the color image based on the depth map. The electronic device may also obtain the color image and depth information associated with the color image from one camera, together.

In an embodiment of the present disclosure, the depth map and the color image may be acquired by photographing, respectively, not simultaneously, but at separate times. The electronic device may determine whether the difference between the photographing position of the depth map and the photographing position of color images is less than a certain critical distance (e.g., 50 cm), and may determine the similarity between the feature points of the depth map and the feature points of the color images. For example, the electronic device may determine, based on the position and direction information of the camera(s), whether there is a possibility of the depth map and the color image to include image areas corresponding to the common photographing areas. The electronic device may compare the feature point (s) of the depth maps and the feature point(s) of the color image, with respect to the image areas, and may match the image areas with each other when the similarity between the feature points is greater than the certain threshold.

In an embodiment of the present disclosure, the electronic device may generate transition images (2D images or 3D images) between a plurality of adjacent nodes (nodes on the same/similar space according to time and direction) and then may generate the 3D map by mapping the temporal/spatial continuous 2D or 3D images to a virtual 3D space. The transition image may be a 2D image and a 3D image (for example, a panoramic, a 3D model or a video image). For example, the electronic device may calculate the change information in two images of adjacent nodes located on one path, and generate the transition image (e.g., an animation or a video including images, or multiple frames images), by utilizing the change information. For example, the electronic device may generate the transition image by utilizing a warping technology or a morphing technology.

In an embodiment of the present disclosure, the electronic device may generate a virtual node at a position in which multiple paths are overlapped, generate a new 3D image by synthesizing the transition images for the multiple paths at the overlapped position, and generate the additional information of the virtual node by referring to additional information of the nodes adjacent to the virtual node. The electronic device may also generate path information from the virtual node to the adjacent nodes, based on the similarity between the images of the nodes.

In an embodiment of the present disclosure, the electronic device may update the image and/or additional information of each of the node adjacent, based on the information of the virtual node, and also may generate and add a transition image at the adjacent node. For example, the transition image can be stored in the map information along with the path information from each node to the adjacent node, and can be used during searching (or querying) at the node or on the path.

In an embodiment of the present disclosure, the electronic device or camera can record audio during image photographing, and/or before/after the image photographing. For example, when the user turn on the power of the camera, or a camera application in the electronic device (for example, smart phone) is executed, or the preview function of the camera application is operated, the electronic device or the camera may perform an audio recording function and then store the audio data. For example, the electronic device or the camera, when an image photographing button is selected, may store the audio during image photographing time (and time including before and/or after the photographing time (e.g., 10 seconds)) by associating with the image, or may generate as a single file. For example, the electronic device or the camera may perform the Sound & Shot function of the Galaxy (Galaxy) S4 or a similar function.

In an embodiment of the present disclosure, the end of the audio recording after the image photographing can be performed through the operation (e.g., at least one among the end of the application, the end of the camera function, another GUI operation, a button operation) of ending the audio function by the user, and the audio data and the image can be stored related with each other or stored in one file. In one embodiment of the present disclosure, the electronic device or the camera can record the audio data together with the video data during video recording.

In an embodiment of the present disclosure, the electronic device may collect information on emotion or stress by analyzing a biological signal (for example, heart rate variability (HRV), brainwave, ECG, and/or the like) collected by an external device (e.g., a wearable device in which a heart rate sensor, an ECG sensor, or an EEG sensor is built) connected to the electronic device through a wired or a wireless communication device, and may store the collected information as additional information of the relevant node.

FIGS. 21A, 21B, 21C, and 21D are diagrams illustrating a method for generating a transition image according to various embodiments of the present disclosure.

Figure 21A:
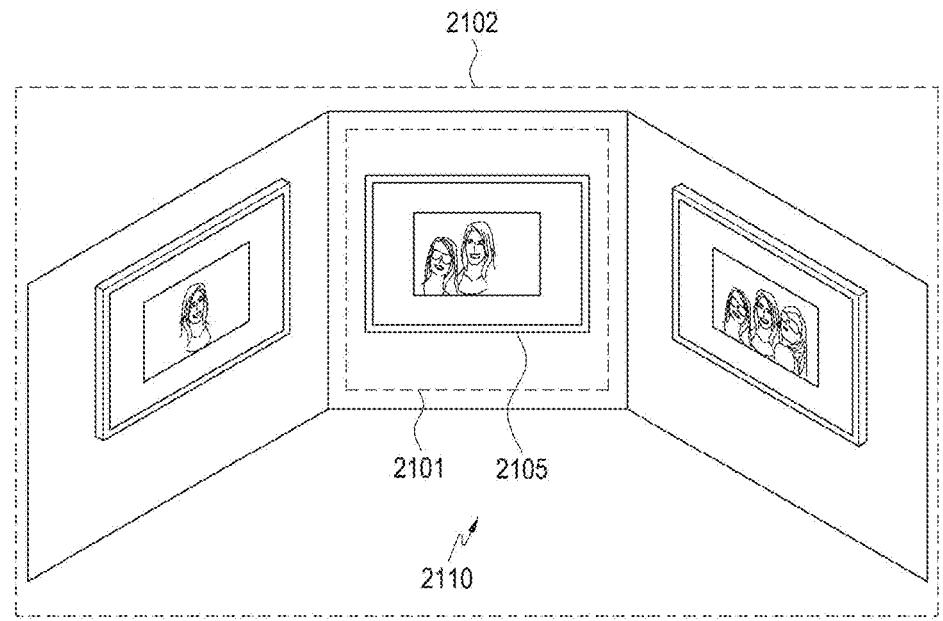
FIGS. 21A, 21B, 21C, and 21D are diagrams illustrating a method for generating a transition image according to various embodiments of the present disclosure.

Referring to FIG. 21A, the electronic devices (for example, the electronic devices 101, 201, 401), or the processors of the electronic devices (for example, processors 120, 210), or the controller (for example, the controller 420, the map processing module 421) may acquire multiple photographed images of the interest area. For example, the electronic device may acquire a first image obtained by photographing the frame 2105 at a first position close to the frame 2105 of a space of interest 2110, and a second image 2101 obtained by photographing the frame 2105 at a second position which is far away from the frame 2105.

Figure 21B:
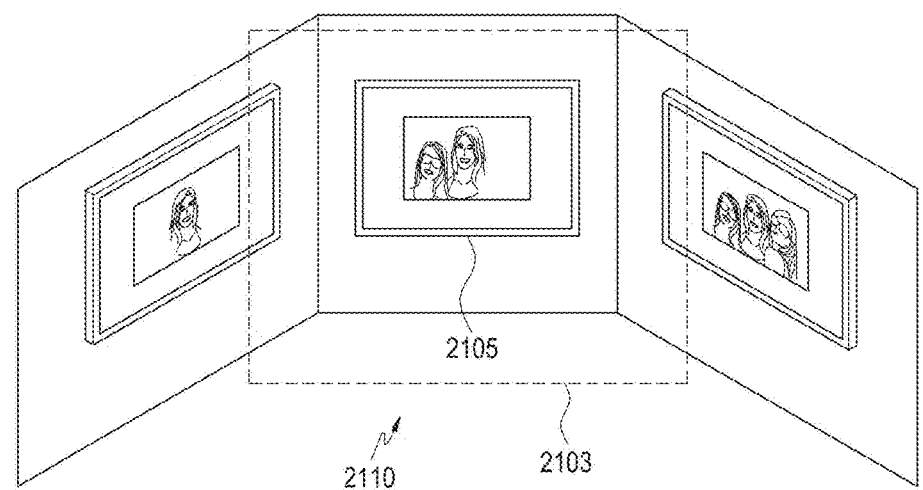

Referring to FIG. 21B, the electronic device may generate, by using the first image 2101 and the second image 2102, a transition image 2103 which is similar to the actual image of the frame 2105 taken at an intermediate position between the first position and the second position, and showing a change (for example, change in the frame 2105 image and the corridor image) occurred at a path between the first image 2101 and the second image 2102.

Figure 21C:
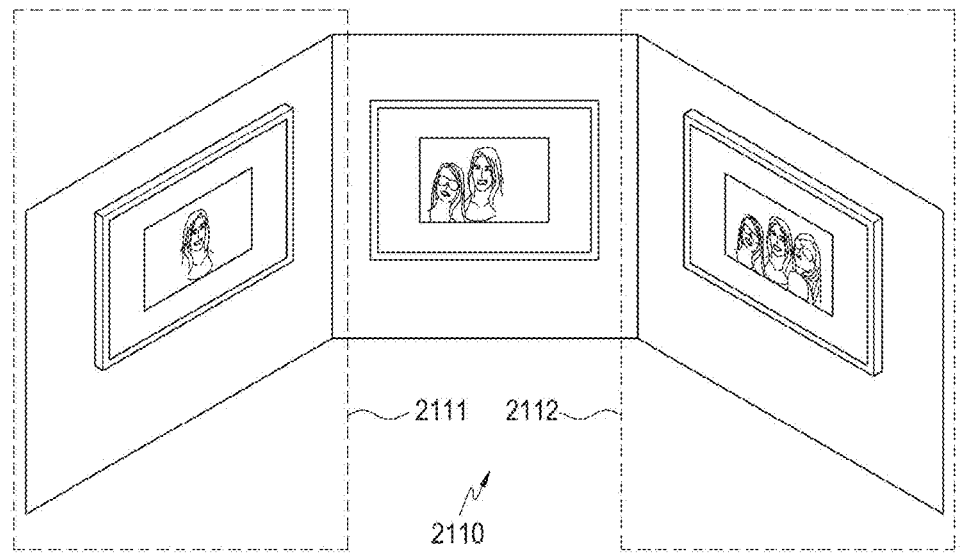

Referring to FIG. 21C, the electronic device can acquire a plurality of images obtained by photographing the space of interest 2110. For example, the electronic device may acquire a first image obtained by photographing the first region 2111 of the space of interest 2110, and a second image obtained by photographing the second region 2112 of the space of interest 2110.

Figure 21D:
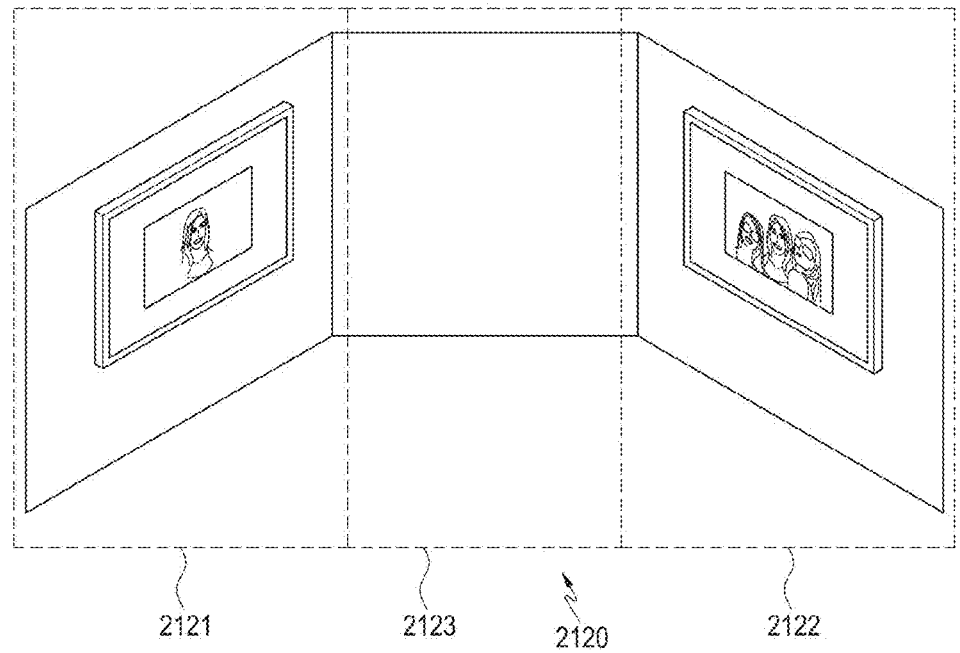

Referring to FIG. 21D, the electronic device may generate a transition image 2123 between the first image 2121 and the second image 2122, by using the first image 2121 obtained by photographing the first region 2111 of the space of interest 2110, and the second image 2122 obtained by photographing the second region 2112 of the space of interest 2110. For example, the electronic device may generate a panoramic image 2120 including the first image 2121, the transition image 2123 and, the second image 2122. For example, the electronic device may generate the transition image 2123 while extending one edge portion among an edge portion of the second region 2112 side in the first image 2121 and an edge portion of the first region 2111 side in the second image 2122 in a same form to the remaining edge portion, or by extending the one edge portion to the remaining edge portion while gradually deforming the one edge portion in the form of the remaining edge portion.

Figure 22:
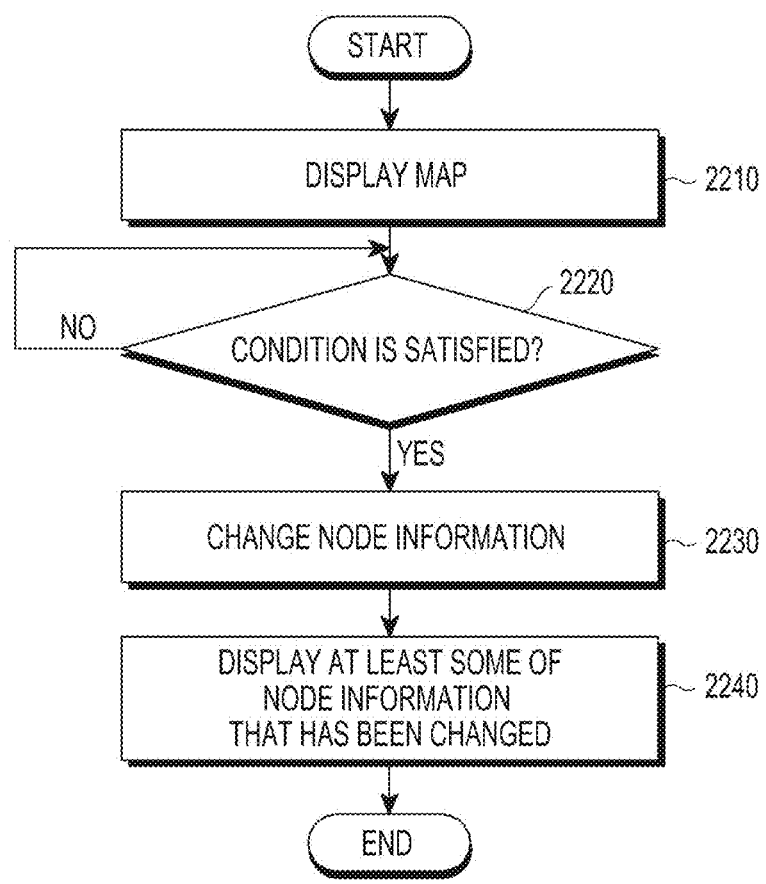
FIG. 22 is a flowchart illustrating a method for operating an electronic device according to various embodiments of the present disclosure.

FIG. 22 is a flowchart illustrating a method for operating an electronic device according to an embodiment of the present disclosure.

Referring to FIG. 22, a method for operating the electronic device may include operations 2210 to 2240. The method for operating the electronic device can be performed by the electronic device (for example, electronic devices 101, 201, 401), a processor (for example, processors 120, 210) of the electronic device or a controller (for example, the controller 420, the map processing module 421).

In operation 2210, the electronic device may display, on the display (for example, a display 160 and a display 260), a map for the space of interest (e.g., an indoor space of a building, or an outdoor space, such as parking lots, botanical gardens, and/or the like).

For example, the map may include the plurality of nodes and paths connecting the plurality of nodes. For example, each node (or node information which is information on each node) may include at least one image and additional information associated with the at least one image.

In an embodiment of the present disclosure, information of the relevant node associated with each node may include at least one image corresponding to the relevant position of the space of interest and information related to at least one image.

In an embodiment of the present disclosure, the electronic device may display, on the display, the plurality of nodes and the path connecting the plurality of nodes.

In an embodiment of the present disclosure, the electronic device may display, on the display, the first image associated with the first node, the plurality of nodes and the path connecting the plurality of nodes.

In an embodiment of the present disclosure, the electronic device may display, on the display, the first image associated with the first node, and may display, on the first image, the plurality of nodes and the path connecting the plurality of nodes.

In an embodiment of the present disclosure, the electronic device may display, on the display, the plurality of nodes and the path connecting the plurality of nodes, along with the photographing direction of each of the images that are associated with each node.

In an embodiment of the present disclosure, the electronic device may display, on the display, the plurality of nodes and the path connecting the plurality of nodes, and the path can be formed, based on at least one among the distance between adjacent nodes or the displacement direction.

In an embodiment of the present disclosure, information of the relevant node associated with each node may include at least one image corresponding to the relevant position of the space of interest and information related to the at least one image, and the information associated with the at least one image may include 3D information which is associated with at least a part of the at least one image and includes at least one among photographed position, the direction of the image of the node, the image depth/degree of depth, and/or the like.

In an embodiment of the present disclosure, information associated with the at least one image may include depth information of an object displayed on the at least one image.

In operation 2220, the electronic device may determine whether a pre-configured condition is satisfied. The electronic device may perform the operation 2230 when the condition is satisfied, and may periodically/non-periodically repeat the operation 2220, when the condition is not satisfied.

For example, the pre-configured condition may include at least one among, when detecting an input (e.g., user input, an external input) that requires a change in node information, when detecting a status associated with the electronic device which matches a certain situation (context), and an event (e.g., the reception of a message, generation of a warning message, and/or the like) requiring a change in the node information occurs, when the electronic device is positioned or arrived in a certain area/position, or the electronic device enters a particular mode, or arrived at a certain time (for example, the arrival of the alarm time, arrival of a certain schedule item), when the image of the node includes an identifiable object image (or object area), when the user's biometric information matches with the certain status (e.g., included within the critical range, above/below the critical value), when the attribute values (e.g., a remaining memory level, a signal reception strength, and/or the like) representing the current state of the electronic device is included in the pre-determined critical range or is above/below the certain critical value, or when the current state (for example, direction, position, pose, battery status, the reception status of radio signals, the state of the memory, and/or the like) of the electronic device matches with a pre-configured condition (e.g., included within the critical range, above/below the certain critical value).

In operation 2230, when it is determined in operation 2220 that the pre-configured condition is satisfied, the electronic device may change the first node information associated with the first node among the plurality of nodes.

In operation 2240, the electronic device may display at least some of the changed first node information.

In an embodiment of the present disclosure, the electronic device may display, on the display, the preview image photographed using the camera of the electronic device, display, on the display, an indicator for photographing guide on the preview image, and associate, the image photographed according to the instructions of the indicator, with the first node.

In an embodiment of the present disclosure, the electronic device may display, on the display, the preview image photographed using the camera of the electronic device, display, on the display, a first indicator indicating the position and the direction in which an image is to be photographed and a second indicator indicating the current position or direction, and associate, the image photographed according to the instructions of the first and second indicators, with the first node.

In an embodiment of the present disclosure, the electronic device may display, on the display, the preview image photographed using the camera of the electronic device, display, on the display, an indicator for photographing guide on the preview image, and change at least a part of the first image (or the first node information) associated with the first node, based on the image photographed according to the instructions of the indicator.

In an embodiment of the present disclosure, the electronic device may display, on the display, the first image associated with the first node, and display another image associated with the first node, on the display, by replacing the first image, in response to the input (e.g., user input, external input) or the change in the direction of the electronic device.

In an embodiment of the present disclosure, the first node information may include a plurality of images including a first image, and the first image among the plurality of images can be displayed in response to a selection of the first node.

In an embodiment of the present disclosure, the electronic device may display, on the display, the first image associated with the first node, detect an occurrence of an event, and display, in response to the occurrence of the event, another image associated with the first node by replacing the first image.

In an embodiment of the present disclosure, the electronic device may display, on the display, the first image associated with the first node, detect an occurrence of an event, acquire, in response to the occurrence of the event, a graphic element associated with the first node from the external device, and display the graphic element on the display.

In an embodiment of the present disclosure, the electronic device may display, on the display, a first path connected to a part of the plurality of nodes, detects an occurrence of an event, and display, in response to the occurrence of the event, a second path connected to another part of the plurality of nodes on the display.

In an embodiment of the present disclosure, the second path may be configured so as not to pass through the node associated with the event among the plurality of nodes.

In an embodiment of the present disclosure, the electronic device may detect an occurrence of an event, display, on the display, a second path connected to another part of the plurality of nodes, in response to the occurrence of the event, and display, on the display, an indicator for guiding the second path on the first image associated with the first node.

In an embodiment of the present disclosure, the electronic device may acquire, from an external device, information on the object displayed on the first image that is associated with the first node, through a communication device (e.g., a communication interface 170, a communication module 220), and display, on the display, the graphical elements representing at least some information on the object.

In an embodiment of the present disclosure, the electronic device may acquire information on external device, through the communication device, from the external device corresponding the object displayed on the first image that is associated with the first node, and display, on the display, the graphical elements representing at least some information on the external device.

In an embodiment of the present disclosure, the electronic device may transmit information on a first image associated with the first node to the external device through the communication device, acquire information on object displayed on the first image from the external apparatus through the communication device, and display, on the display, the graphic elements representing at least some information on the object.

In an embodiment of the present disclosure, the electronic device may acquire control information on the object displayed on the first image associated with the first node through the communication device, display, on the display, the graphic elements representing at least some of control information on the object, control the object, in response to an input associated with the graphic elements, through the communication device, and display a result of the control of the object on the display.

In an embodiment of the present disclosure, the electronic device may dispose and display, on the display, the plurality of images that are associated with the first node, or indicators corresponding to the plurality of images in time sequence.

In an embodiment of the present disclosure, the electronic device may store a message associated with the object displayed in the first image associated with the first node, and display, on the display, the message or the indicator of the message.

In an embodiment of the present disclosure, the electronic device may receive a message associated with the object displayed in the first image associated with the first node, and display, on the display, information associated with the reception of the message.

In an embodiment of the present disclosure, the electronic device may store tags (e.g., a position, object attributes, and object-related information, such as the user input information) associated with an object displayed in the first image associated with the first node, and display the tags or indicators of the tags on the display.

In an embodiment of the present disclosure, the electronic device transmits, to the external device, a message or a tag on an object displayed in the first image associated with the first node through the communication device, and display, on the display, the information related to the transmission or reception of the message or the tag.

In an embodiment of the present disclosure, the electronic device may detect an occurrence of an event, control, in response to the occurrence of the event, at least one device displayed in the first image associated with the first node through the communication device, and display, on the display, the control result of the at least one device.

In an embodiment of the present disclosure, the electronic device may receive a message through the communication device, transmit, in response to the reception of the message, information associated with the message, through the communication device, to the at least one device displayed on the first image associated with the first node, and display, on the display, information associated with the reception or transmission of the message.

In an embodiment of the present disclosure, the electronic device may receive, through the communication device, a message including information on the state of the device displayed on the first image that is associated with the first node, and display, in response to the reception of the message, information on the message on the display.

In an embodiment of the present disclosure, the electronic device may display, on the display, the state of the first external device displayed in the first image associated with the first node, transmit, in response to an input, a message including information on the first external device to the second external device, through the communication device, and receive, through the communication device, information associated with the control of the first external device from the second external device.

In an embodiment of the present disclosure, the electronic device may display, on the display, the state of the first external device displayed in the first image associated with the first node, transmit, in response to an input, a message including information on the first external device to the second external device, through the communication device, connect with the second external device or a third external device through the communication device, and control the first external device based on the control of the second external device or the third external device.

Figure 23A:
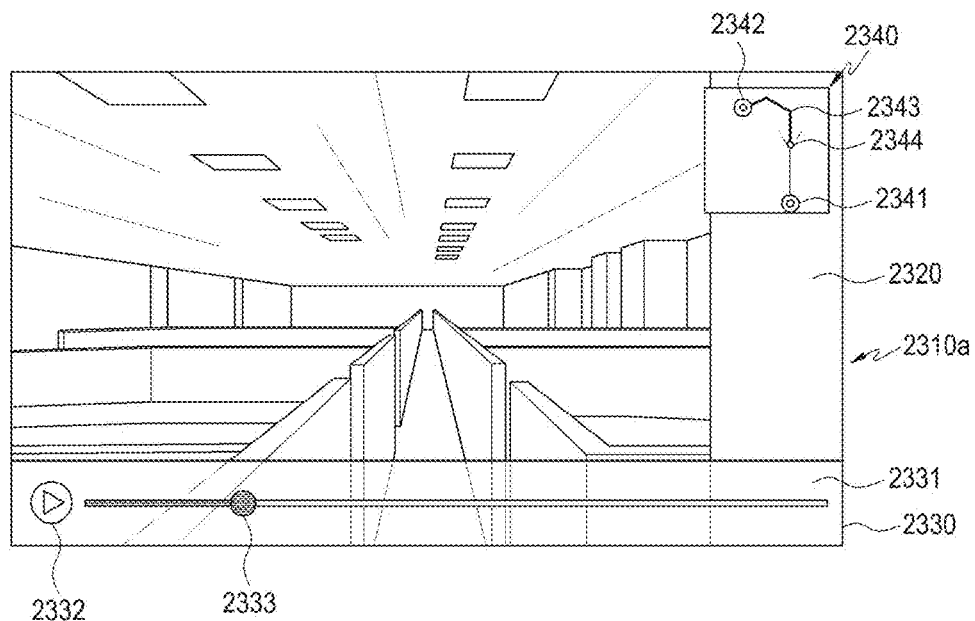
FIGS. 23A and 23B are diagrams illustrating a map interface according to various embodiments of the present disclosure.
Figure 23B:
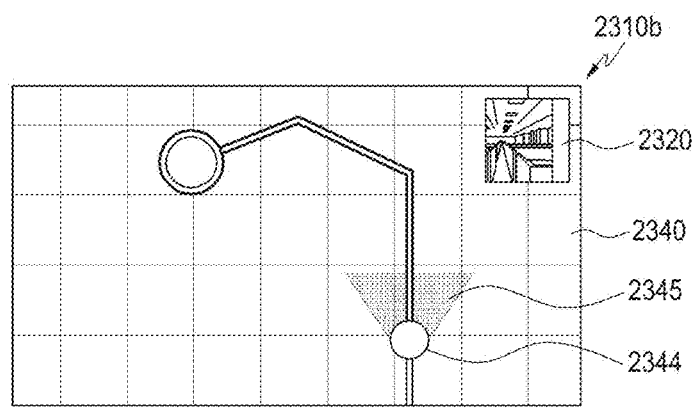

FIGS. 23A and 23B are diagrams illustrating a map interface according to various embodiments of the present disclosure.

Referring to FIG. 23A, a first map interface 2310a may include a 3D map image 2320 at the current position, a virtual tour user interface 2330, and a 2D map 2340. For example, the virtual tour user interface 2330 and the 2D map 2340 may be displayed on the 3D map image 2320. For example, the 2D map 2340 may be displayed in the form of a mini-map having a smaller size than the 3D map image 2320.

The virtual tour user interface 2330 may include at least one among a first indicator 2331 indicating a number of the node at the current position or adjacent to the current position (or a number of the image at the current position or adjacent to the current position)/the number of total nodes (or the number of total images), a navigation button 2332, or a second indicator 2333 indicating a degree of progress of the navigation.

In an embodiment of the present disclosure, when the navigation button 2332 is selected, the electronic devices (for example, the electronic devices 101, 201, 401), or the processors of the electronic devices (for example, processors 120, 210), or the controller (for example, the controller 420, the map processing module 421) may automatically and sequentially display the images of all nodes along the path.

In an embodiment of the present disclosure, when the navigation button 2332 is selected during the images of all nodes are sequentially displayed, the electronic device (for example, the electronic devices 101, 201, 401), or the processor of the electronic device (for example, processors 120, 210), or the controller (for example, the controller 420, the map processing module 421) may stop or pause the display. When the navigation button 2332 is selected during the pause, the paused images can be displayed sequentially again.

In an embodiment of the present disclosure, when the navigation button 2332 is selected, the electronic device, depending on the current position of the user or the current position of the electronic device (and/or a user's gaze direction or pointing direction of the electronic device), may automatically display an image of the node (e.g., the navigation function) corresponding to the current position.

For example, the second indicator 2333 is capable of moving, and the electronic device may display, in response to the position movement of the second indicator 2333, a 3D map image corresponding to the moved position.

The mini-map 2340 may include a start node 2341, a terminal node 2342, a path 2343 that connects between the start node 2341 and the terminal node 2342, a third indicator 2344 indicating the current position, and a current position image 2320.

In an embodiment of the present disclosure, the mini-map 2340 may display other nodes in relation to the path 2343.

In an embodiment of the present disclosure, the mini-map 2340 may further include a graphic element 2345 indicating the photographing direction of the 3D map image 2320 of the current position.

Referring to FIG. 23B, a second map interface 2310b may include a 2D map 2340, and a 3D map image of the current position 2320. For example, the 3D map image 2320 of the current position may be displayed on the 2D map 2340. For example, the 3D map 2320 may be displayed in the form of a mini-map having a smaller size than the 2D map image 2340.

In an embodiment of the present disclosure, the first map interface 2310a and the second map interface 2310b can be switched in response to user input.

For example, the electronic device may photograph an image from a position in the space of interest, and move to a different position again, to repeat the process of photographing the image. The electronic device may generate a node based on the position the image is taken, and the electronic device may generate a path that connects nodes according to the photographing order. For example, the electronic device may photograph the nine images in total while moving, and may generate a path from the start node (or position) to end node (or end position) by using images of the generated nine nodes and additional information (or metadata) of each node.

In an embodiment of the present disclosure, a 2D map that displays the path can be provided in the form of a mini-map in the right or left upper of the map interface. The 2D map may display a path which has been moved from the start position to the end position, and may display the photographing direction of the 3D map image currently displayed.

In an embodiment of the present disclosure, the electronic device may generate a transition image that is positioned between the photographed images photographed in sequence, or adjacent, based on the multiple photographed images, and may display an animation and a video, based on the multiple photographed images and transition images. For example, the animation and the video can be provided by generating, based on the change of the photographed images photographed in sequence, or adjacent, at least one intermediate image capable of displaying the change in sequence as at least one transition image, and sequentially displaying the at least one transition image between the two photographed images.

In an embodiment of the present disclosure, the map interface may include a virtual tour user interface, and the virtual tour user interface may be used to control the animation and video. For example, the virtual tour user interface may provide functions, such as a selection check of a specific position, pause, resume, fast forward, rewind, and/or the like. The electronic device may reproduce the animation or the video, in the same order as the path that the user has taken, by using the path information, provide a check function of the navigation information, and may display the 3D map in conjunction with the 2D map.

In an embodiment of the present disclosure, the electronic device may differentiate the reproduction order of the navigation in the path. For example, when the start position and end position on the path is selected, the electronic device may determine the reproduction order for navigation and the moving direction on the path. For example, referring to FIG. 23A, although the 3D images from the current position in the direction of north (N) are being checked, when reproduced by specifying the start position and end position to each other in reverse, 3D images can be checked in the opposite direction (i.e., in a south direction (S)) at the current position.

In an embodiment of the present disclosure, the positions of the 2D map and 3D map may be changed to each other.

In an embodiment of the present disclosure, either the 2D map or the 3D map can be selectively displayed, and the selective display can be performed through the user selection (e.g., a user's map selection, GUI operation, button operation).

In an embodiment of the present disclosure, the electronic device may provide a user interface so as to select the direction the user wishes to check at a position where multiple paths are overlapped. For example, the electronic device may notify the direction which a path can be provided from the branch point that four corridors are met, to the user, through the display (for example, the display 160, the display 260), sound, or a haptic, and may reproduce the animation and the video along the path or the direction selected by the user's input.

In an embodiment of the present disclosure, a 2D map and a 3D map can be checked by a user's selection not a reproduction of navigation (i.e., an animation or a video reproduction). For example, based on a user's motion information, information on position and/or time on the map can be selectively checked.

In an embodiment of the present disclosure, a 2D map can be displayed in a format that includes the object image (i.e., a wall, a furniture, and/or the like), by using the position information of the object as well as the path and the node.

In an embodiment of the present disclosure, the electronic device may display, on the 3D map, the images that the user has taken based on the specified position and direction, or may display by reconstructing the 3D map configured based on the images in a format of VR.

In an embodiment of the present disclosure, a 2D map and a 3D map are correlated with each other and then may be displayed on a single screen, and may be displayed on a plurality of the displays that are connected using a communication device. For example, when a wearable device and smartphone are connected to a Wi-Fi or BT, the 2D map may be displayed on the wearable device, the 3D map may be displayed on the smart phone, and the 2D map and the 3D map may also be switched to each other.

In an embodiment of the present disclosure, when a function for checking the map is executed, the electronic device may perform an operation to determine the position and direction of the electronic device. When the position of the electronic device is the place where the map is configured, the position and the direction can be specified to check on the map according to the position and pointing direction of the electronic device (e.g., a camera pointing direction or an upper-oriented direction of the display, and/or the like). For example, the electronic device may map and display the VR or the AR according to the pointing direction and the position of the camera. The electronic device may analyze the position of a particular object in the image by using the image which is currently received via the camera and the feature point information of the image, and may check and display, on the map on the display, a particular graphic element (or a virtual object) (for example, a wall, a furniture, or digital information that has been registered) or the map image associated with the object.

In an embodiment of the present disclosure, the electronic device may provide a general map, when the position of the electronic device is not the place where the map is configured.

FIGS. 24A, 24B, 24C, 24D, and 24E are diagrams illustrating a method for editing a three-dimensional map according to various embodiments of the present disclosure.

Figure 24A:
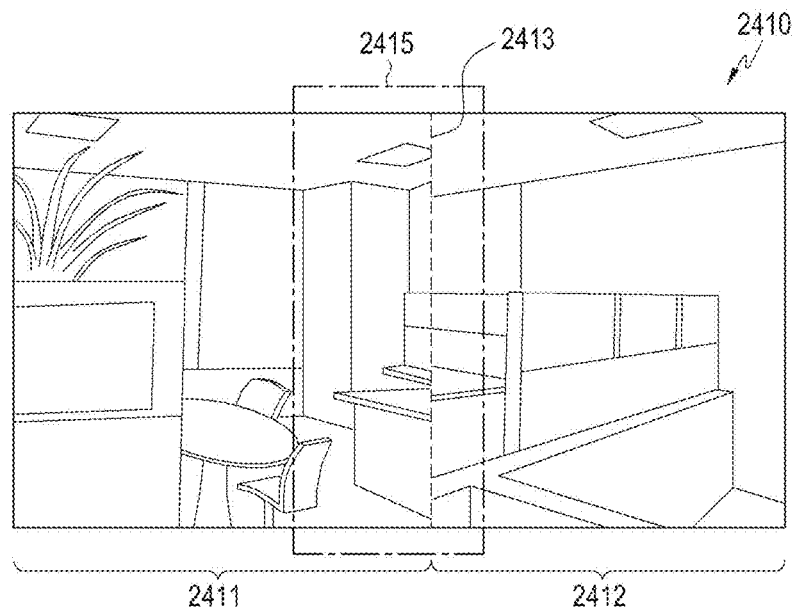
FIGS. 24A, 24B, 24C, 24D, and 24E are diagrams illustrating a method for editing a 3D map according to various embodiments of the present disclosure.

Referring to FIG. 24A, a 3D map image 2410 formed by synthesizing a first image portion 2411 and a second image portion 2412, may include some errors (for example, an image cutting or a synthetic error illustrated in a boundary line 2413). The 3D map can be configured by synthesizing (or combining) the plurality of images and a natural synthesis cannot be made in several image regions.

In an embodiment of the present disclosure, the electronic device (for example, the electronic devices 101, 201, 401, or a processor of the electronic device (for example, the processors 120 and 210), or a controller (for example, the controller 420, a map processing module 421) may determine the portion where the error occurs on the 3D map, and may determine at least one among whether edges or contours are connected, whether vertical and horizontal line segments are disrupted, and whether the color changes, based on at least one techniques, such as an edge detector, a contour follower, a color marking, and/or the like.

In an embodiment of the present disclosure, the electronic device may either specify, a region 2415 to be synthesized, according to a user input, or may automatically specify. For example, during checking the 3D map including the error, the electronic device may select, by the user input, the error included region 2410 or the error (for example, the image cutting or the synthetic error illustrated in the contour 2413). For example, during checking the 3D map including the error, the electronic device may receive a user input indicating the fact that there is an error on the screen of currently checking, and based on the user input, may analyze the screen, or, automatically analyze the checking screen (for example, a certain period, or a certain amount or more change occurs in the checking screen), and then may automatically determine the error or the region including the error.

In an embodiment of the present disclosure, the electronic device may detect a user input selecting a specific region during checking the 3D map, and the user input may include at least one among a touch, drag, and a gesture.

In an embodiment of the present disclosure, the electronic device may detect a user input that specifies, at least one of the plurality of maps, via a menu, a touch, a button, a gesture, and/or the like.

In an embodiment of the present disclosure, the electronic device can determine two or more photographed images associated with the selected 3D maps or selected regions.

Figure 24B:
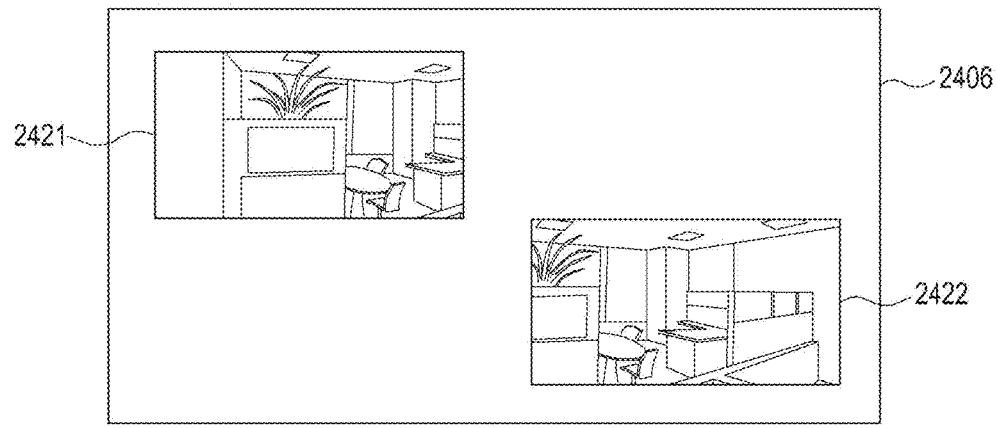

Referring to FIG. 24B, the electronic device may check images 2421 and 2422 of the node(s) which are adjacent to the position of the selected region or used in the synthesis, or transition images (not shown) and then display the images on a display 2406 (for example, the displays 160 and 260), respectively. For example, the electronic device may check the plurality of images associated with the error including region 2415 or the error and then display the checked result on the display 2406.

In an embodiment of the present disclosure, the electronic device may arrange the images 2421 and 2422 of the detected node(s), based on the photographed order or the photographing position information of the images 2421 and 2422. For example, the electronic device may arrange the image photographed first on the left side, and may arrange the image photographed later on the right. For example, the electronic device may determine the placement of the top and bottom or left and right of the images according to the photographed angles. For example, the electronic device may display the images for each node, by grouping images included in the node. For example, the electronic device may display the images by disposing the images included in the one node closer than the images included in another node, or by overlaying images for each node.

In an embodiment of the present disclosure, the electronic device may delete, edit, or modify the node selected by the user. For example, the electronic device may display the nodes on the display 2406, and then may edit (add/remove/modify) the nodes in response to the user input. For example, the electronic device may display at least one image that configures the selected node on the display 2406, and then may edit (add/remove/modify) the images in response to the user input.

In an embodiment of the present disclosure, the electronic device may determine the 3D map related to the selected node, or two or more photographed images associated with the selected area and may display the determined result on the display 2406, and then may edit the result. For example, during checking the 3D map 2410 including the error, when the user input (for example, at least one among a pinch gesture, a touch input, a drag input, a flick input, a speech input) associated with the error 2413 or the area 2415 including the error is received, two or more photographed images associated with the error 2413 or the area 2415 including the error can be determine, and the determined result can be displayed on the display 2406 and then the result can be re-synthesized by the user input.

In an embodiment of the present disclosure, the electronic device may re-synthesize images by a user input.

Figure 24C:
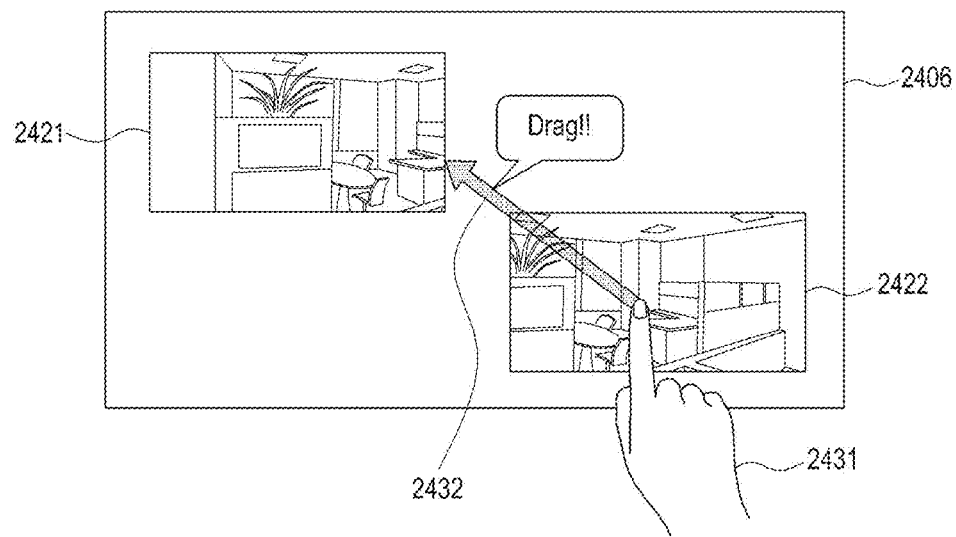

Referring to FIG. 24C, the electronic device may detect a user input 2431 which drags 2432 an image 2422 to another image 2421.

In an embodiment of the present disclosure, the electronic device may detect a user input selecting at least one image, or specifying an area to be synthesized (for example, a reference position to be synthesized or an image of the object to be referenced).

Figure 24D:
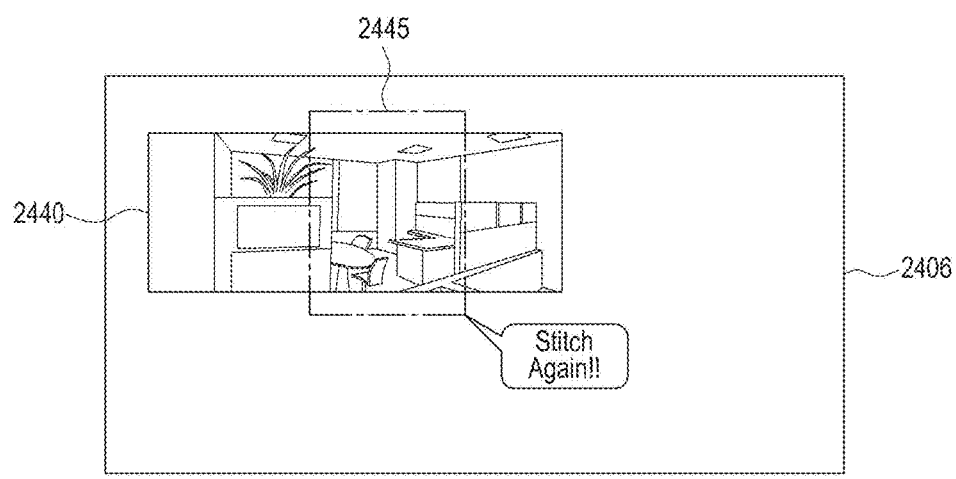

Referring to FIG. 24D, the electronic device may analyze the feature points of the two images 2421 and 2422, and then may perform re-synthesis or stitching. The electronic device may display, on the display 2406, a re-synthesized image 2440 including the synthesized area 2445. For example, two images can be combined by analyzing an area including an overlapped portion when the image 2422 selected by the user input 2431 illustrated in FIG. 24C is overlapped on another image.

Figure 24E:
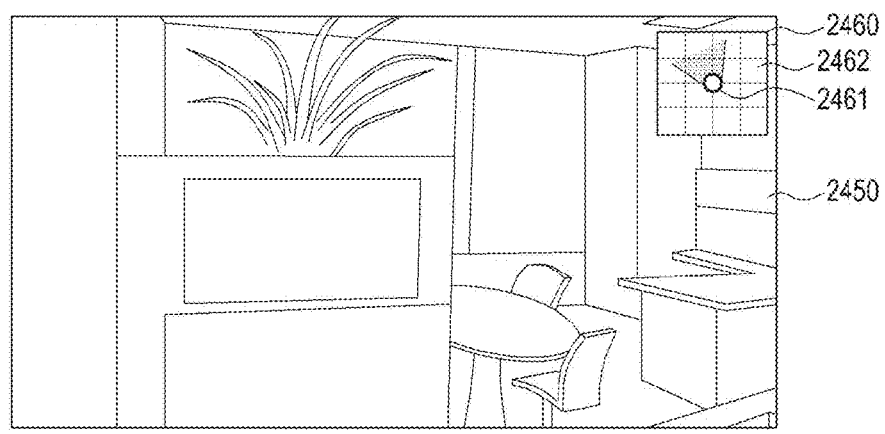

Referring to FIG. 24E, the electronic device may display the re-synthesized 3D map image 2450, and may display, on the 3D map image 2450, the 2D map 2460 including a graphical element 2462 that indicates the position and the photographing direction of the node 2461.

In an embodiment of the present disclosure, the electronic device may relocate, on the pre-configured 3D model, the images photographed according to the user input via the user interface.

Figure 25A:
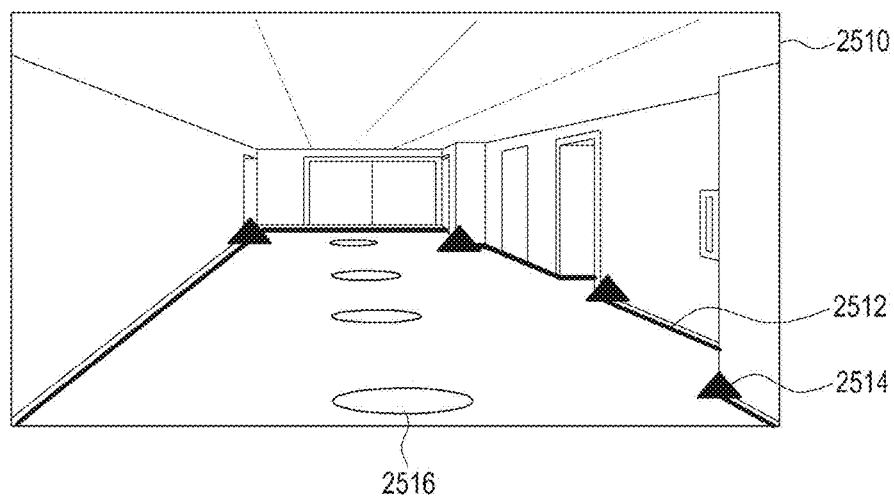
FIGS. 25A and 25B are diagrams illustrating a method for generating a two-dimensional (2D) map based on a 3D map according to various embodiments of the present disclosure.
Figure 25B:
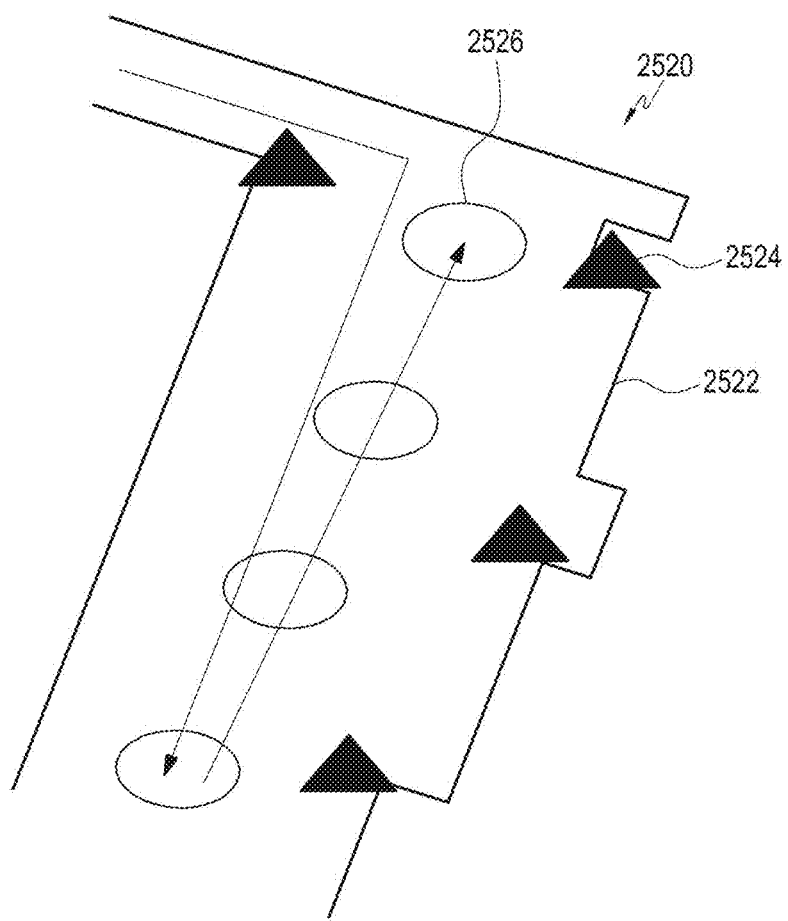

FIGS. 25A and 25B are diagrams illustrating a method for creating a 2D map based on a 3D map according to various embodiments of the present disclosure.

Referring to FIGS. 1 and 4, the electronic device (for example, the electronic devices 101, 201, 401), or the processor of the electronic device (for example, processors 120, 210), or the controller (for example, the controller 420, the map processing module 421) may configure a 3D map by using the 3D image and additional information of each node, and may create a plan view (i.e., a 2D map) from the 3D map.

In an embodiment of the present disclosure, the electronic device may create a 2D map based on image at photographed at least one node and depth information.

Referring to FIG. 25A, the electronic device may extract a feature point 2514 (or feature unit) (e.g., a corner, an edge, a door position, and/or the like) and/or the like, depending on the shape of a boundary line 2512 (or the boundary) of a wall and a floor in a 3D map image 2510. The electronic device may configure the form of the 2D map, based on the information on the photographing position and photographing direction of the 3D map image 2510, and based on the relative positions and distances for each feature point. For example, the electronic device may create a full 2D map with no blind spots by using 3D map images of the various angles and the positions taken at a plurality of nodes.

In an embodiment of the present disclosure, the electronic device may create a 3D map by using a depth sensor in order to create a more accurate map, and measure the distance between objects by using a stereoscopic image.

In an embodiment of the present disclosure, the electronic device may predict the distance between the particular image areas in the 3D image 2510 by using a marker 2516 (e.g., markers equally spaced, or a QR code on which position information is displayed) included in the 3D image 2510. Circles shown on the floor in the 3D image 2510 can be used as markers disposed at regular intervals.

Referring to FIG. 25B, the electronic device may generate a 2D image 2520 by determining a boundary line 2522, a feature point 2524, and the position of the marker 2526 on a 2D virtual space 2522, based on the boundary line 2512, the feature point 2514 and the marker 2516 of the 3D map image 2510.

In an embodiment of the present disclosure, the electronic device can acquire the following information from the virtual tour image-based map.

- Information on the number of the photographed images (for example, images of JPEG format) and images listed in order.
- Information on whether transition between the previous image and the next image according to the order is due to an advancement of the camera or a rotation of the camera.
- Information on the distance or the number of steps that indicates how much forward the camera is, when the transition is due to the forward movement of the camera.
- Information on the rotation angle that indicates how much rotated the camera is, when the transition is due to the rotation.

In an embodiment of the present disclosure, the electronic device may perform the following processing with respect to the acquired information.

- Extract path map information from each node.
- Extract feature points from the photographed images (i.e., images photographed from each node) listed in the order.
- Extract, from the feature points, the path (road or passage) information and width information of the path which connects the nodes.
- Extract two-dimensional coordinate information by projecting 3D coordinate information of the feature points onto 2D plane.
- Generate network (i.e., a pedestrian road, a passage, and/or the like) map information by reflecting the width information on the path information.

In an embodiment of the present disclosure, the network map may be the 2D map including path information, which is moveable by the user, or the 2D map which has reflected width onto the path.

Figure 26:
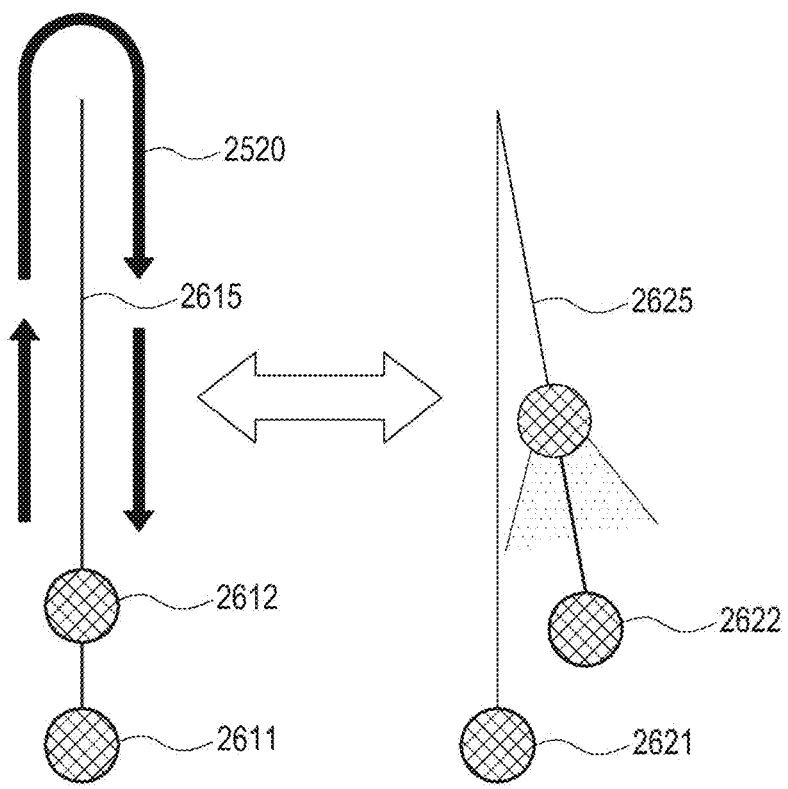
FIG. 26 is a diagram illustrating an error correction method of a map according to various embodiments of the present disclosure.

FIG. 26 is a diagram illustrating an error correction method of a map according to various embodiments of the present disclosure.

Referring to FIG. 26, the electronic device (for example, the electronic devices 101, 201, and 401, or a processor of the electronic device (for example, the processors 120 and 210), or a controller (for example, the controller 420, a map processing module 421) may obtain the path information (for example, forward, rotation) according to the movement 2520 between a first position 2611 and a second position 2612, through sensors (e.g., the sensor module 240), such as the gyro sensor, the acceleration sensor, the azimuth sensor, and/or the like.

Referring to FIG. 26, an actual path 2615 where the electronic device moves from the first position 2611 to the second position 2612 is illustrated.

The electronic device may gradually obtain incorrect path information by the error in the output information (or detecting information) of the sensor.

The electronic device may create a map based on the incorrect path information, and the map may indicate a path 2625 which is estimated from a first node 2621 corresponding to the first position 2611 to a second node 2622 corresponding to the second position 2612.

The electronic device may change the direction of the estimated path 2625, in order to correct the error between the actual path 2615 and the estimated path 2625, by applying technology, such as a PTAM or a PTAMM targeting photographed images. The electronic device may also perform the operation of correcting the output information of the sensor, by using the difference between information on the detected direction angle and information on the changed direction angle.

Figure 27:
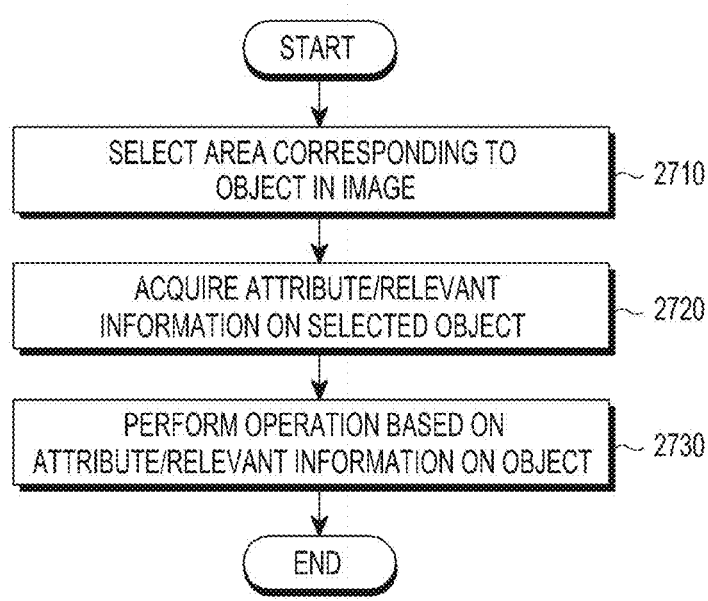
FIG. 27 is a flowchart illustrating a method for operating an electronic device according to various embodiments of the present disclosure.

FIG. 27 is a flowchart illustrating a method for operating an electronic device according to various embodiments of the present disclosure.

Referring to FIG. 27, a method for operating the electronic device may include operations 2710 to 2730. The method for operating the electronic device can be performed by the electronic device (for example, electronic devices 101, 201, 401), a processor (for example, processors 120, 210) of the electronic device or a controller (for example, the controller 420, the map processing module 421).

In operation 2710, the electronic device may select the area (i.e., an object image, or an object area) corresponding to the object in the image (for example, a map image, a 3D image, such as a preview image) according to the user input or automatically.

In an embodiment of the present disclosure, the electronic device may display images on the display (for example, the displays 160 and 260), and detect a user input selecting an object area of the image.

In an embodiment of the present disclosure, the electronic device may automatically recognize and select the object area from the image, via an image analysis.

In an embodiment of the present disclosure, the electronic device may select an object area included in the portion of the image or video that configures the 3D map.

In an embodiment of the present disclosure, the electronic device may recognize and select the object area of the image, via an image retrieval, an optical character reader or recognition (OCR), online searching (for example, image retrieval of appliances), NFC, barcode recognition, the handwriting recognition, and/or the like.

In operation 2720, the electronic device may obtain the attribute/relevant information on the selected object.

In an embodiment of the present disclosure, the attribute/relevant information may include at least one among the type of object, model name, size, position, time, type of service, network address, control method, the type of control signal, network address, identification ID of the product, catalog information, information related to a virtual 3D model and an application, and/or the like.

In operation 2730, the electronic device may perform a pre-configured operation based on the attribute/relevant information on the object.

In an embodiment of the present disclosure, the electronic device may store the attribute/relevant information on the object in the map information.

In an embodiment of the present disclosure, the electronic device may download the application associated with the object from the external apparatus, or may display, on the map, attribute/relevant information on the object.

In an embodiment of the present disclosure, the electronic device, when the object area on the map is selected, may provide a user interface in conjunction with the object, or may be connected to the object wirelessly.

In an embodiment of the present disclosure, the electronic device may photograph an object with a camera (for example, a camera module 291), and identify the object based on the product name and the shape of the object. For example, the electronic device may search for a memory (e.g., memories 130 and 230), or an on-line based on the user selected object area (or the object image), in the images photographed at the node or the map generated based on the images.

In an embodiment of the present disclosure, the electronic device may detect the user's gesture, such as touching, dragging, or flicking an area (i.e., object area) including a minimum portion of the object in the image or map, through the display (for example, the displays 160 and 260), such as a touch screen.

In an embodiment of the present disclosure, the electronic device may select the object area according to a gesture of the user gazing the object area through eye-tracking techniques (for example, the pupil direction and the face pointing direction tracking by using a camera), or according to a voice input of the user.

In an embodiment of the present disclosure, the electronic device may determine the object, by performing at least one image processing, such as color discrimination, feature extraction/detection (e.g., edge detection, the boundary following), with respect to the object area.

In an embodiment of the present disclosure, the electronic device can perform an operation of associating the object area with the attribute/relevant information on the object.

In an embodiment of the present disclosure, the object area on the image or map may include an optical information media such as, a text, a barcode, a marker, a watermark. For example, the electronic device may identify attribute information (for example, a model name, a product number, and a serial number) on the object, through an image recognition module (for example, OCR, bar code, QR code, marker or water mark recognition module). For example, the electronic device may also obtain the attribute information on the object via the user input. The electronic device automatically stores attribute information on the object by associating with the object area.

In an embodiment of the present disclosure, the electronic device can automatically determine the positions of at least one object area within an image without selecting the image area through the user input. For example, the electronic device may determine the similarity between a reference image (for example, an image of a home appliance or a furniture) stored in the memory (e.g., the memories 130 and 230) or the external device and image areas in the image, by using the reference image or feature points or template information of the reference image, and when the similarity is high (e.g., 70% or more), the electronic device may determine that the corresponding image area is the object area corresponding to the object. The electronic device may determine the type of the relevant object (for example, the type of the display, the type of household appliances, the type of furniture, and/or the like), based on the type of the reference image, and associate the determine result with the relevant object or the object area, and then store the associated result in the electronic device or the external device (e.g., a server).

In an embodiment of the present disclosure, the electronic device may provide feedback on the object area selection by the user, or may display the extracted object area, by displaying, on the display, information (for example, at least one among text, images, symbols, changing color, position display) associated with the object area along with the map or image.

In an embodiment of the present disclosure, the electronic device may determine the attribute information (e.g., identification information) on the object or the object area and may perform an operation of connecting with the object via a wired or wireless in order to communicate with the real object. For example, the electronic device may select, in response to a user input, the object area or the image area including at least part of the object area on the map, and then may determine the ID of the object (for example, media access control (MAC) address, model name, and/or the like), and then may establish a connectivity, by detecting Wi-Fi-direct, BLE, or an NFC signal of the corresponding object, or recognizing the bar code, information on the QR code, or the product name by the camera.

In an embodiment of the present disclosure, after selecting an object area displayed in the image and on the map, the electronic device may check at least one product names of the product family which were previously discovered through Wi-Fi, BT, or were previously functionally connected, or which were registered in advance at the home server and the electronic device of the user, and/or the like, and may associate the found result with the object area in accordance with the user selection, and may automatically select to connect the most similar products among the products that have been registered in advance (for example, the function of the product, the user interface of the product), by using the attribute information (for example, the identification information) of the object.

In an embodiment of the present disclosure, the electronic device may display, on the display, a list of products previously registered or discovered, and map the image or the object area with the product information associated with the image or the object in response to a user selection for a particular object area on the image, and store the mapping information in conjunction with the 2D map or 3D map, to thereby allows the user may check and select necessary information using the map. For example, the electronic device may map the particular object area with the product information and then store the mapped result along with position information of the 3D map or 2D map, and when a map is checked in the future, corresponding information can be checked automatically or by the user selection.

In an embodiment of the present disclosure, the electronic device may download, from the external apparatus, product information or an application for controlling the detected object, and register or install the product information or the application in the electronic device and the home server. For example, the electronic device may download, from the external device, a model name, a product photo, 3D dimension information, API information on the controllable functions, configuration information on the control panel, and/or the like.

In an embodiment of the present disclosure, the electronic device may download a control UI of the object via the Internet or receive the control UI from the object, or create the control UI by the electronic device itself.

In an embodiment of the present disclosure, the electronic device may download, from the Internet, information on the actual control data structure for control of the object, protocol, and/or the like, or may receive the information by functionally connecting to the object.

In an embodiment of the present disclosure, the electronic device may identify 3D information (for example, height, length, depth information, side and back of the image) of the object to be synthesized on the map, by retrieving the product information (e.g., a local memory, a remote server, and product manufacturers).

In an embodiment of the present disclosure, the electronic device may automatically map the product images and the object area on the map. In an embodiment of the present disclosure, the electronic device may map, in response to a user input, a particular image area to the product images.

In an embodiment of the present disclosure, during discovery, an object can be automatically interlocked with map information by transferring the object's position to another device or a server. For example, since the object has a Wi-Fi module, the object may detect the radio signals transmitted by multiple APs, use the information on the wireless signal as Wi-Fi fingerprint, compare the fingerprint information with pre-formed fingerprint information on the map, and determine the position on the map of the object.

In an embodiment of the present disclosure, the electronic device may detect the direction to which the camera-oriented by detecting Wi-Fi fingerprint information of the camera, map information, the current direction and motion of the camera. Further, since the electronic device may determine the distance information by using the depth sensor, the electronic device may detect a relative distance and direction of the photographed object.

In an embodiment of the present disclosure, the electronic device may provide an interface at the position of the control panel on the image, by mapping the position of the control panel on the product image on the map to the virtual control panel based on the control panel information on the product.

In an embodiment of the present disclosure, when the specific area of the map image is selected, the electronic device may change the image area, or may change the image so as to display the status. For example, when the connection with the washing machine is established, the electronic device may change the image of the control panel of the washing machine included in the map image to the UI images for status display and control. For example, the electronic device may display the control UI, such as a button and a dial capable of controlling the corresponding part, and indicate the current state of the washing machine (e.g., operating conditions, temperatures, laundry reserved time, washing remaining time, and/or the like).

In an embodiment of the present disclosure, the electronic device may monitor the operating status of the object, and when the object is in a particular state, the electronic device may inform the information on the state to the user.

In an embodiment of the present disclosure, the electronic device may display the operating status of an object in the object image on a virtual 3D map.

In an embodiment of the present disclosure, the electronic device may record the operating sound of the object, and may check whether a failure occurs in the object based on the recorded sound.

In an embodiment of the present disclosure, a control UI on the image may support multiple modes (e.g., a simulation mode, a control mode).

For example, the simulation mode may be a mode which virtually controls and then displays the result in order to guide the usage of the object. For example, the control mode can be a mode for actually driving the corresponding object utilizing the control UI.

In an embodiment of the present disclosure, the electronic device may provide either a simulation mode or a control mode, in response to a user input, and when the connection with the object is failed (for example, power-off, without a network connection, and/or the like), the electronic device may automatically provide a simulation mode.

In an embodiment of the present disclosure, the electronic device may automatically identify an object by receiving BLE information, and may automatically identify the object through an image search using photos of the object, identification of the model name through OCR, and/or a search using the model name (or direct acquisition of information from the server).

In an embodiment of the present disclosure, the electronic device may identify the object based on the information input by the user. For example, after identifying the model name of the object, the electronic device may identify the information on the model size (dimension) through the Internet, and may identify the position information of the object by calculating the ratio of the size of the model and the size of the object acquired in the photo.

In an embodiment of the present disclosure, the electronic device may also identify an object through a search (for example, a catalog search).

In an embodiment of the present disclosure, the electronic device may generate a signal fingerprint by detecting the electromagnetic properties, such as Wi-Fi, BT, BLE, earth magnetic field, a barometer, a level gauge, and/or the like.

In an embodiment of the present disclosure, the electronic device may identify position information (e.g., the direction angle, height, depth, position, and/or the like) of the object, by using a stereoscopic camera and/or Wi-Fi fingerprints.

In an embodiment of the present disclosure, the electronic device, after identifying the object, may further receive information to combine an indoor 3D map, via the Internet. For example, the electronic device may receive plug-in format information or a file from a server that is associated with the indoor 3D mapping tool and may install the file on the electronic device.

In an embodiment of the present disclosure, when the objects are connected to the smart home, the electronic device may perform a connection with the object via a smart home server.

In an embodiment of the present disclosure, the electronic device may receive information of the corresponding object through NFC, QR code, and/or the like.

In an embodiment of the present disclosure, the electronic device may identify a MAC address of the corresponding object and device name via the wireless signal.

In an embodiment of the present disclosure, the electronic device may receive the information of the object through, such as BLE, and/or the like, and perform the connection.

In an embodiment of the present disclosure, the electronic device or the object may provide an API to control for a service which may control the object from the outside.

In an embodiment of the present disclosure, the electronic device or the object may provide control information to the server (for example, a Web server, a particular server, and/or the like).

In an embodiment of the present disclosure, objects may configure a local network, and a particular object may perform the role of a hub. For example, each of the objects may include at least one communication devices (e.g., BT, Wi-Fi, Li-Fi, ultrasound, a camera, a cell communication module), and the specific object may perform the role of a gateway or wireless hub.

In an embodiment of the present disclosure, information on the object (for example, electronic products, a heating controller, an air-conditioning controller, a gas controller) displayed on an image may include the object position information (for example, 2D or 3D position information) that is associated with the map information. Information of the object may also include direction information for the placement of the image of an object within the corresponding map.

In an embodiment of the present disclosure, the position of the object can be stored in the memory of the object.

In an embodiment of the present disclosure, the electronic device may compare the position information of the object measured using a positioning sensor (at least one among a Wi-Fi sensor, a Li-Fi sensor, GPS, a camera) with the position on the map, and then may match the compared result to one position on the map.

In one embodiment of the present disclosure, the electronic device may determine the position on the map of the object, by utilizing the direction and distance information of the object (and the current position information of the electronic device and pointing direction) obtained through direction sensors (e.g., a camera device, an IR sensor, Institute of Electrical and Electronics Engineers (IEEE) 802.ad, Kinect™) capable of detecting an object. For example, the electronic device may include a distance measuring sensor, a 3D pose sensor, a positioning sensor, and/or the like, may transmit a signal directing to the object, detect the relative direction and distance up to the object by detecting the object's response (e.g., a response radio signal, the power-on, a function operation, and/or the like), and may associate and arrange the position of the object on the map based on the detected information.

In an embodiment of the present disclosure, the attribute information and the identification information of the object may include at least one among a model name to identify the object, a control interface, a network ID, an address/resource, ID (for example, a serial number, MAC, embedded SIM (eSIM) information, and phone numbers).

In an embodiment of the present disclosure, the attribute information and the identification information of the object may further include search information on the on-line associated with the object. For example, when the object corresponds to the electronic products, attribute information or identification information of the object may include specification information (e.g., size, color, and direction, and/or the like) that is detected based on the model name or application information.

In an embodiment of the present disclosure, the attribute information or the type information of the object may include the product classification, such as a headset, PC, a refrigerator, and/or the like. For example, the electronic device, when establishing a connection with the object, may facilitate the user's selection by determining the type of the object and displaying the determined result by using icons, and/or the like.

In an embodiment of the present disclosure, the electronic device may store information associated with the object function. For example, information associated with the function of the object may include at least one among applications, functions/installation-related information, control module information, state information of the object, or service-related information that can be supported. For example, when the map and the smart home service are interlocked, a module capable of controlling the object can be installed in the smart home server, proxy, or the electronic device. For example, the module is installed in the smart home server that can be used by connecting the electronic device, the electronic device or the smart home server may perform a service discovery, and provide the service lookup function through the service discovery, and then control the object using the function.

In an embodiment of the present disclosure, information associated with a function of an object may be information that can be executed by being directly stored in the electronic device, or service related information that can be supported through another external computing resource.

Figure 28:
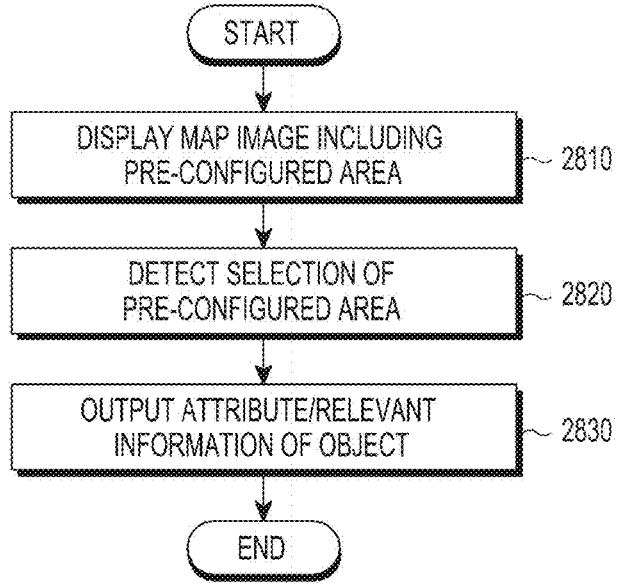
FIG. 28 is a flowchart illustrating a method for operating an electronic device according to various embodiments of the present disclosure.

FIG. 28 is a flowchart illustrating a method for operating an electronic device according to an embodiment of the present disclosure.

Referring to FIG. 28, a method for operating the electronic device may include operations 2810 to 2830. The method for operating the electronic device can be performed by the electronic device (for example, electronic devices 101, 201, 401), a processor (for example, processors 120, 210) of the electronic device or a controller (for example, the controller 420, the map processing module 421).

In operation 2810, the electronic device may display, on a display (for example, the displays 160 and 260), a map image (for example, a 3D image) including a pre-configured area.

The map image may be a part of the information on the map with respect to a space of interest (for example, an interior space inside the building or parking lots, an outdoor space, such as a botanical garden).

For example, the map may include the plurality of nodes and paths which connects the plurality of nodes. For example, each node (or node information which is information on each node) may include at least one image and additional information associated with the at least one image.

The pre-configured area may include an object area and/or graphic elements (or virtual object). The graphic elements (or virtual object) may include at least one among an image, an icon, a text, and an item.

In an embodiment of the present disclosure, the graphical elements may include a GUI for controlling the object.

In an embodiment of the present disclosure, the graphical elements may include an indicator indicating at least one among writing, saving, receiving, or transmission of the message.

In operation 2820, the electronic device may detect the selection of the pre-configured area.

For example, the selection may include at least one among the user's gesture (for example, a touch, hovering, space gestures, gazing a pre-configured area (gaze direction), an access to the display, and/or the like), the user's voice input, and a motion input (for example, waving, tilt, and/or the like) to the electronic device.

In operation 2830, the electronic device may output, in response to the selection, attributes/related information of an object displayed on the map image.

In an embodiment of the present disclosure, the attribute/relevant information may include at least one among the type of object, model name, size, position, time, type of service, network address, control information (for example, a control method, control signal/data types, a control signal/data, and/or the like), a network address, an identification ID of the product, catalog information, information related to a virtual 3D model and an application, and/or the like.

In an embodiment of the present disclosure, the attributes/related information may include tag, messages (e.g., video/video messages, audio messages, text messages), memo, images and/or the like.

In an embodiment of the present disclosure, the electronic device may display, in response to the selection, on the display, the messages stored in conjunction with the object.

In an embodiment of the present disclosure, the electronic device may transmit, in response to the selection, the message via the external device, or directly to the object. For example, the object may display, via the display of the object, the message received from the electronic device.

In an embodiment of the present disclosure, the electronic device may receive, in response to the selection, the message via the external device or directly from the object. The electronic device may display the received message on the display. For example, the electronic device may request the transmission of the message to the object or the external device, and as a response to the request, the electronic device may receive the message.

In an embodiment of the present disclosure, the electronic device may receive the message via the external device or directly from the object. The electronic device may display, on the display, a graphic element (or indicator) indicating the storage/reception of the message. In response to the selection of the graphic element (or indicator), the electronic device may display, on the display, the received message (i.e., the contents of the message).

In an embodiment of the present disclosure, the electronic device may display, on the display, a graphic element (or indicator) indicating a function associated with writing/transmission of the message. In response to the selection of the graphic element (or indicator), the electronic device may receive the contents of the message from the user or may identify the message selected by the user. The electronic device may store the message written or selected by the user in connection with the object, or may transmit the message to the object. The electronic device may display, on the display, the information related to the storing/transmitting/receiving of the messages.

In an embodiment of the present disclosure, the electronic device may receive, in response to the selection, the attribute/relevant information of the object from the object or the external device, and display the attribute/relevant information on the display.

In an embodiment of the present disclosure, the electronic device may display, in response to the selection, on the display, control information on the object.

In an embodiment of the present disclosure, the electronic device may display, on the display, a graphic element associated with a control for the object. The electronic device may control, in response to the selection for the graphic element, the object, and may display, on the display, the control result of the object (or a changed state of the object according to a control).

In an embodiment of the present disclosure, the electronic device may display, on the display, a graphic element associated with a control for the object. The electronic device may transmit, in response to the selection for the graphic element, a message including information regarding the object to a second external device. The electronic device may receive information related to the control of the object from the external device. The electronic device may display the received information or control the object according to the received information, and display, on the display, the control result of the object (or a changed state of the object according to a control).

FIGS. 29A, 29B, 29C, 30A, 30B, 30C, 31A, and 31B are diagrams illustrating an interaction service based on a map according to various embodiments of the present disclosure.

Figure 29A:
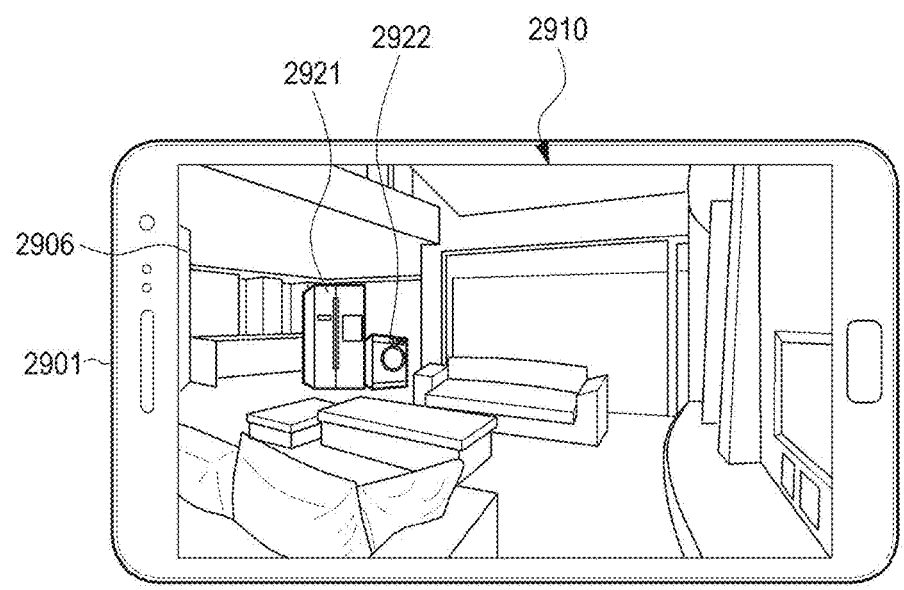
FIGS. 29A, 29B, 29C, 30A, 30B, 30C, 31A, and 31B are diagrams illustrating an interaction service based on a map according to various embodiments of the present disclosure.

Referring to FIG. 29A, an electronic device 2901 (for example, the electronic devices 101, 201 and 401) may display, on a display 2906 (for example, the displays 160 and 260), a map image 2910 including a first object area 2921 (for example, an image area corresponding to the first object (for example, a refrigerator)) and a second object area 2922 (for example, an image area corresponding to the second object (for example, a washing machine).

Figure 29B:
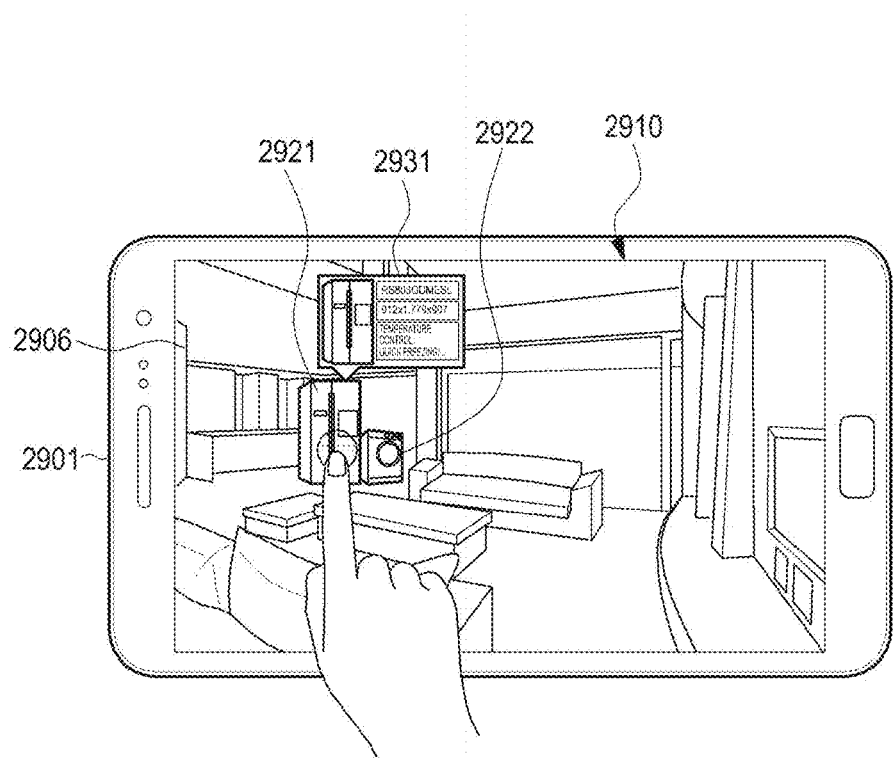

Referring to FIG. 29B, the electronic device 2901 may detect the user selection for the first object area 2921. For example, the selection of the user can be a touch input or a hovering input on the first object area 2921. In response to the selection, the electronic device 2901 may display, on the display 2906, attribute/relevant information 2931 on the first object.

Figure 29C:
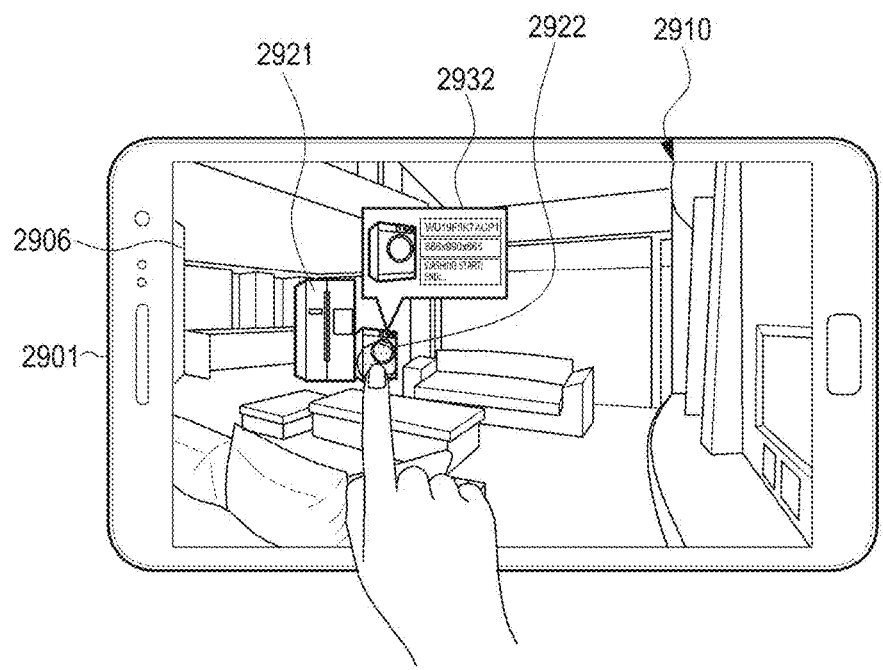

Referring to FIG. 29C, the electronic device 2901 may detect the user selection for the first object area 2922. For example, the selection of the user can be a touch input or a hovering input on the second object area 2922. In response to the selection, the electronic device 2901 may display, on the display 2906, attribute/relevant information 2932 on the second object.

Figure 30A:
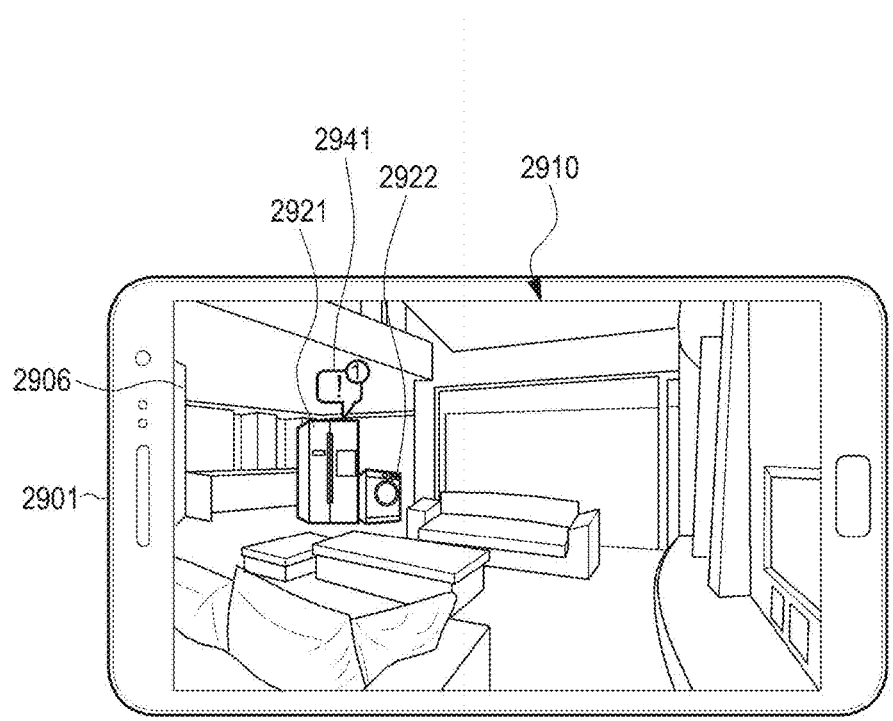

Referring to FIG. 30A, the electronic device 2901 may display, on the display 2906, a graphic element 2941 indicating the storage/reception of a message associated with the first object area 2921 (for example, a graphic element which represents reception of a message, the number of received unidentified message or at least a portion of the received message).

Figure 30B:
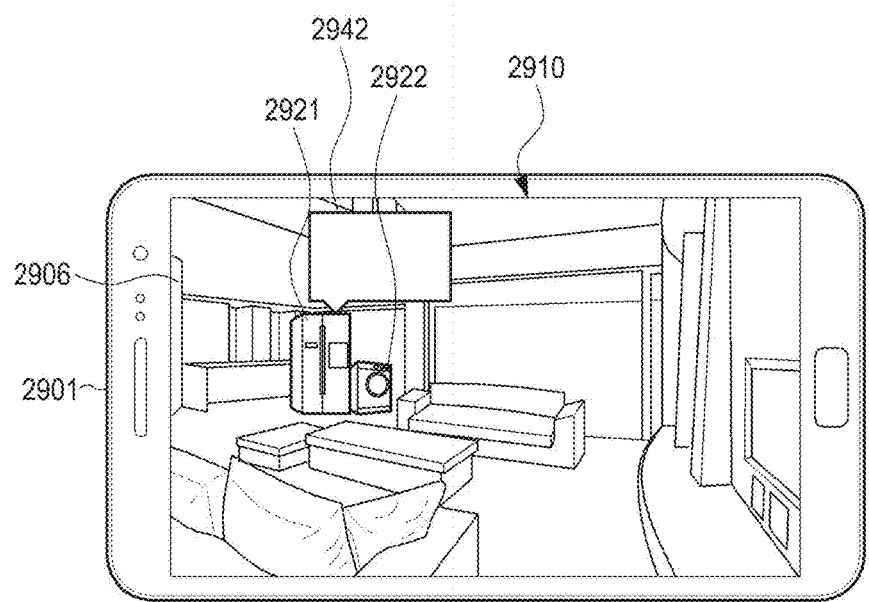

Referring to FIG. 30B, the electronic device 2901 may display, on the display 2906, a window 2942 for writing/inputting the message to be stored in conjunction with the first object area 2921, according to the user input. For example, the electronic device 2901 may transmit the message written by the user to the first object.

Figure 30C:
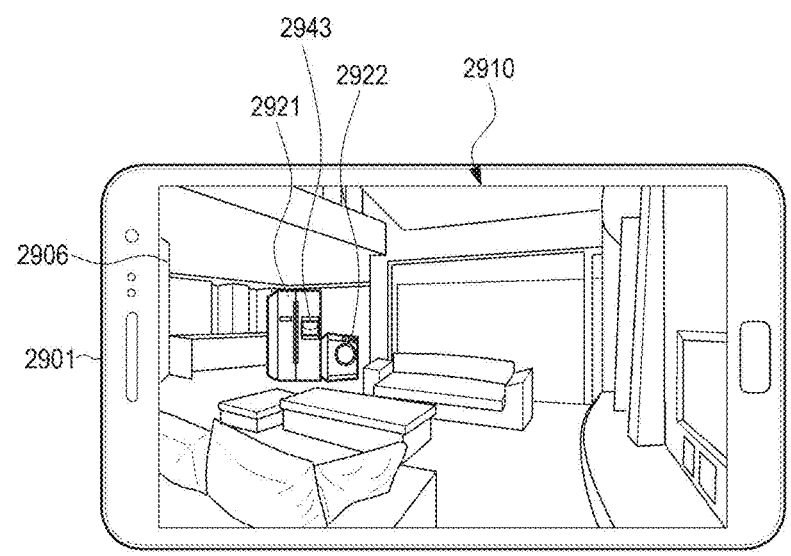

Referring to FIG. 30C, the first object may display, on a display of the first object, a graphical element 2943 indicating the storage/reception of messages or messages received from the electronic device 2901. For example, the electronic device 2901 may display the graphics element 2943 associated with the transmitted message on a part (for example, a display region) of the first object area 2921. Further, the graphical element associated with the transmitted message can be displayed on the physical display (not shown) of the first object.

Figure 31A:
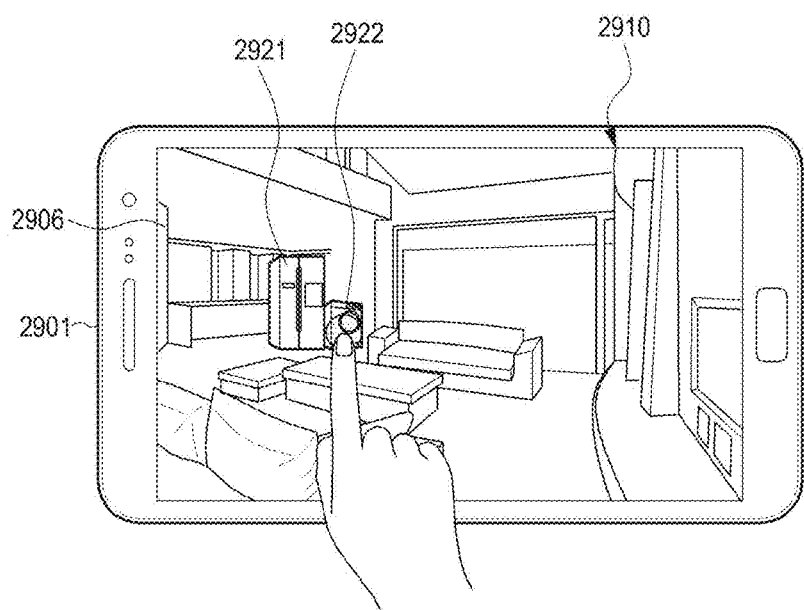

Referring to FIG. 31A, the electronic device 2901 may detect the user selection for the second object area 2922. For example, when the user input including at least part of the second object area 2922 is generated, the selection of the second object can be detected and a graphic element (for example, highlights, boundary line emphasis, an input position color change, a menu, an indicator, and/or the like) associated with the user input can be displayed on the display 2906.

Figure 31B:
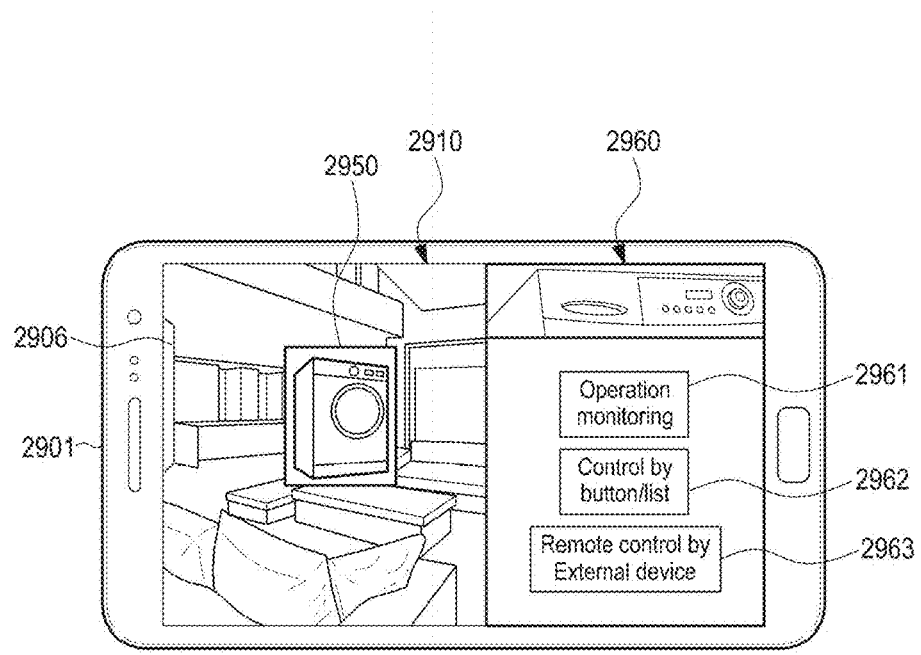

Referring to FIG. 31B, the electronic device 2901 may display, in response to the selection, information on the second object on the display 2906. For example, the electronic device 2901 may display, on the display 2906, 3D model information 2950 on the second object. For example, the electronic device 2901 may display, on the display 2906, control information 2960 on the second object.

For example, the control information 2960 may include at least one among a first menu item 2961 for monitoring/displaying operation state of the second object, a second menu item 2962 for controlling the second object through the GUI including the button/list, and a third menu item 2963 for remote controlling of the second object by the external device.

For example, when the third menu item 2963 is selected, the second object can be remotely controlled via the electronic device 2901 or directly by the external device. For example, the electronic device 2901 may transmit, to the external device, attribute/relevant information (for example, a model name, operating state information) of the second object or connection information (for example, a network address) of the second object.

Figure 32:
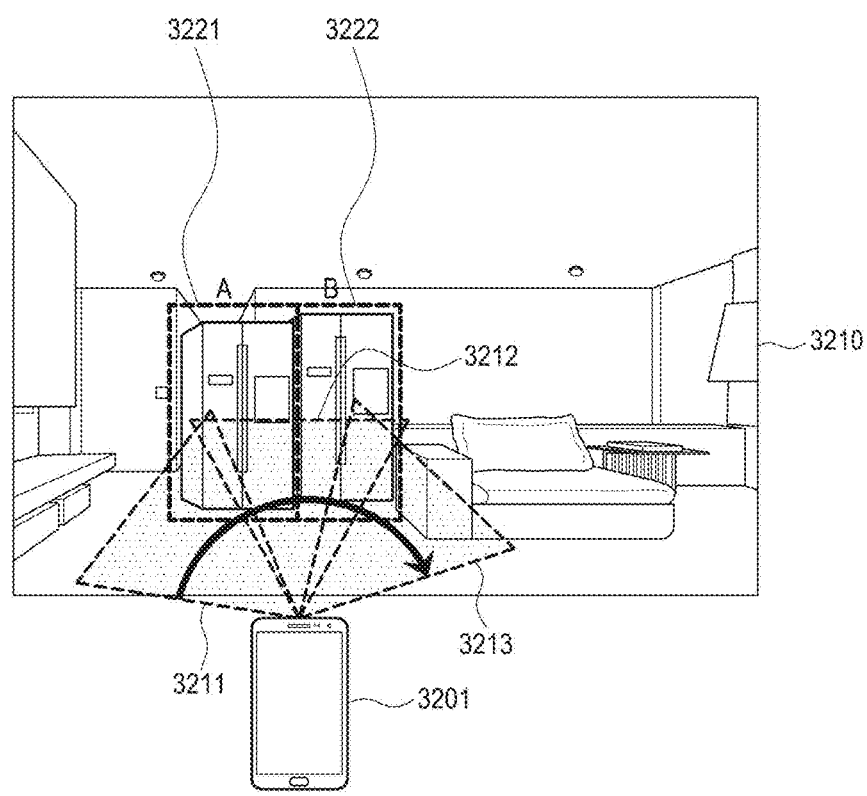
FIGS. 32, 33A, and 33B are diagrams illustrating a method of identifying an object using a directional signal according to various embodiments of the present disclosure.
Figure 33A:
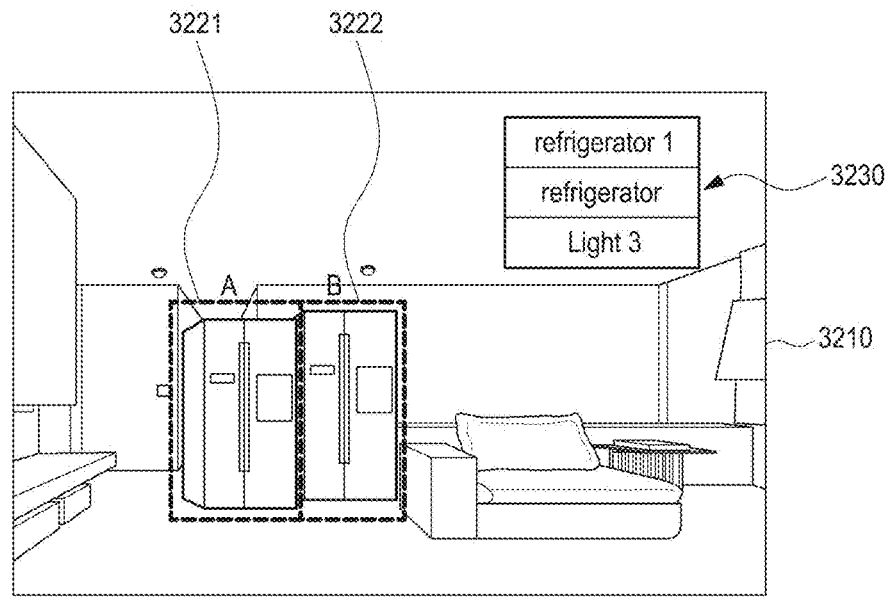
Figure 33B:
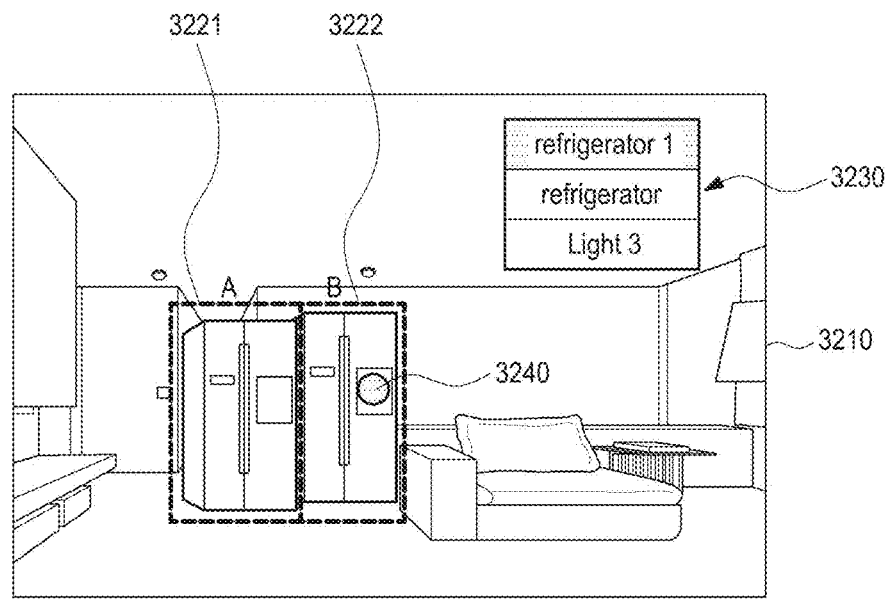

FIGS. 32, 33A, and 33B are diagrams illustrating a method of identifying an object using a directional signal according to various embodiments of the present disclosure.

Referring to FIG. 32, when a first object 3221 on A position and a second object 3222 on B position are present in a space of interest 3210, an electronic device 3201 (for example, electronic devices 101, 201 and 401) may identify the first object 3221 and the second object 3222, by transmitting directional signals 3211, 3212, and 3213 (e.g., IR, IEEE 802.11ad, multiple input multiple output (MIMO) beam, beam forming signal) which scan the space of interest 3210 through a communication device (e.g., a communication interface 170, a communication module 220).

In an embodiment of the present disclosure, when multiple objects 3221 and 3222 exist in the space of interest 3210, the electronic device 3201 may transmit a directional signal 3230 to a particular direction, and receive a response signal from the object existing in the corresponding direction, and then identify or control the object existing in the corresponding direction.

For example, the object that receives a directional signal 3230 from the electronic device 3201 may also transmit, to the electronic device 3201, a response signal including identification information (e.g., ID, product name, network address information, position information, Wi-Fi fingerprint information) on the object itself.

In an embodiment of the present disclosure, the electronic device 3201 may determine the position of the object, using the response signal, the pointing direction of the electronic device 3201 (or a directional signal 3230) and/or the map information.

In an embodiment of the present disclosure, the electronic device 3201 may determine the position of the object, by determining the object area from an image photographed by the camera aimed in a particular direction, or by aligning the photographed image and the map information.

In an embodiment of the present disclosure, the electronic device 3201 may operate at least one functions of the object in order to identify the object. For example, in response to a signal received from the electronic device 3201, the object may display particular information on the display of the object, or blink the display or a light source of the object, or change the color of the display or the light source of the object, or may perform the audio output, or the vibration output.

Referring to FIG. 33A, the electronic device 3201 may recognize that the first object 3221 (for example, a refrigerator), a second object 3222 (for example, a refrigerator 1) and a third object (for example, light 3) are present in the space of interest 3210. For example, the electronic device 3201 may display, on the map image, identification information 3230 of the objects existing in the space of interest 3210.

Referring to FIG. 33B, for example, the electronic device 3201 may transmit a control signal for the second object 3222. For example, the second object 3222 may perform an operation of blinking a light source 3240, in response to a control signal received from the electronic device 3201. For example, the electronic device 3201 may transmit a control signal for the object selected by the user, among the identification information 3230 of the objects existing in the space of interest 3210, and the object which has received the control signal may perform an operation according to the control signal. Therefore, the electronic device 3201 may match the second object area corresponding to the second object 3222 with the map, by determining the second object 3222 with an area in which the light source 3240 is blinking, on the image of the interest area 3210 received via the camera of the electronic device 3201.

According to an embodiment of the present disclosure, multiple objects may respond to a directional signal of the electronic device 3201. In such a case, the electronic device 3201 may continuously/sequentially change the direction of the directional signal, identify an object responding the changed directional signal, and then determine the position of each object or the relative position of the objects. For example, when two electronic products (for example, refrigerators and washing machines) are positioned adjacent to each other, if both the electronic products are included in the propagation area of the directional signal transmitted by the electronic devices 3201, it can be difficult to determine the relative position of the two electronic products. The electronic device 3201 may perform an operation (that is, scanning operation) of changing the direction of the directional signal, determine at least one among a reaction order or reaction maintaining time of the electronic products due to the scanning operation, and then determine the relative position between two adjacent electronic products.

For example, as illustrated with reference to FIG. 32, when the first object 3221 and the second object 3222 are adjacent to each other, the electronic device 3201 scans in a clockwise direction (in the order of 3211, 3212, and 3213) while generating a directional signal, and then the reaction can occur in the order of the first object 3221 and the second object 3222. For example, when the direction of the directional signal of the electronic device 3201 is indicated by reference numeral 3211, the electronic device 3201 may receive the response signal from the first object 3221.

When both of the first object 3221 and the second object 3222 react (for example, pointing direction indicated by reference numeral 3212) with respect to the directional signal of a particular direction of 3221, if continuously scanned in a clockwise from the particular direction (for example, a pointing direction indicated by reference numeral 3213), the first object 3221 becomes non-reactive at first, and then the pointing direction of the directional signal continuously moves in the clockwise and cannot be pointed up to the second object, the second object 3222 also does not react. Therefore, the electronic device 3201 may determine the relative position-related information of the two objects due to the order of the objects that do not react, and maps the objects to the regions of the objects on the map. For example, when the objects are disposed vertically in a stack structure, the relative positions of the objects can be identified by scanning the directional signal in the vertical direction. The electronic device 3201 may also store the position-related information of the object mapped with the position on the map.

In an embodiment of the present disclosure, when the plurality of devices 3221 and 3222 exist in the space of interest 3210, the electronic device 3201 may display identification information 3230 (for example, a list item, an icon, an image) of the plurality of devices 3221 and 3222 that are detected in advance through the discovery process. When the identification information is selected, the electronic device 3201 drives some function associated with the corresponding object and the position of the object can be identified according to the drive of the function. For example, the electronic device 3201 may display a list of objects that have been discovered while checking the preview image with directing the camera. The electronic device 3201 may select one of the objects, drive a particular function (for example, light blinking, power on/off, display information on the display of the object) associated with the selected object, detect the operation state of the object through the camera, and automatically map the identification information of the object of which the operation has been detected with the object area of the map image.

In an embodiment of the present disclosure, the user may identify the operating state (for example, at least one among light blinking, power on/off, the object state output through the display of the object, sound output, vibration output) of the particular function of the object, and the identification information of the object of which the operation is identified and the object area of the map image can be related by the user's motion (for example, a user gesture, a menu selection, and voice recognition, and/or the like).

According to various embodiments of the present disclosure, the electronic device 3201 may perform a discovery operation by the Wi-Fi or BT, and then may identity the identification information of the object capable of wireless connection.

In an embodiment of the present disclosure, the function of each object can be classified according to the security level of the at least two stages. For example, a function which is equivalent to a specific security level may require an operation of performing an authentication process after the discovery. The security is to restrict a control authority for important functions, such as power on/off of the objects (e.g., home appliances, electronic products), billing-related functions, the audio output, a channel change, store or delete, temperature control function, and/or the like, which can give an unpleasant feeling to the user or have an effect on product life. For example, minor functions, such as several seconds of blinking of the status display light source capable of informing the position of the electronic products can also be accessed without a separate authentication process.

Figure 34:
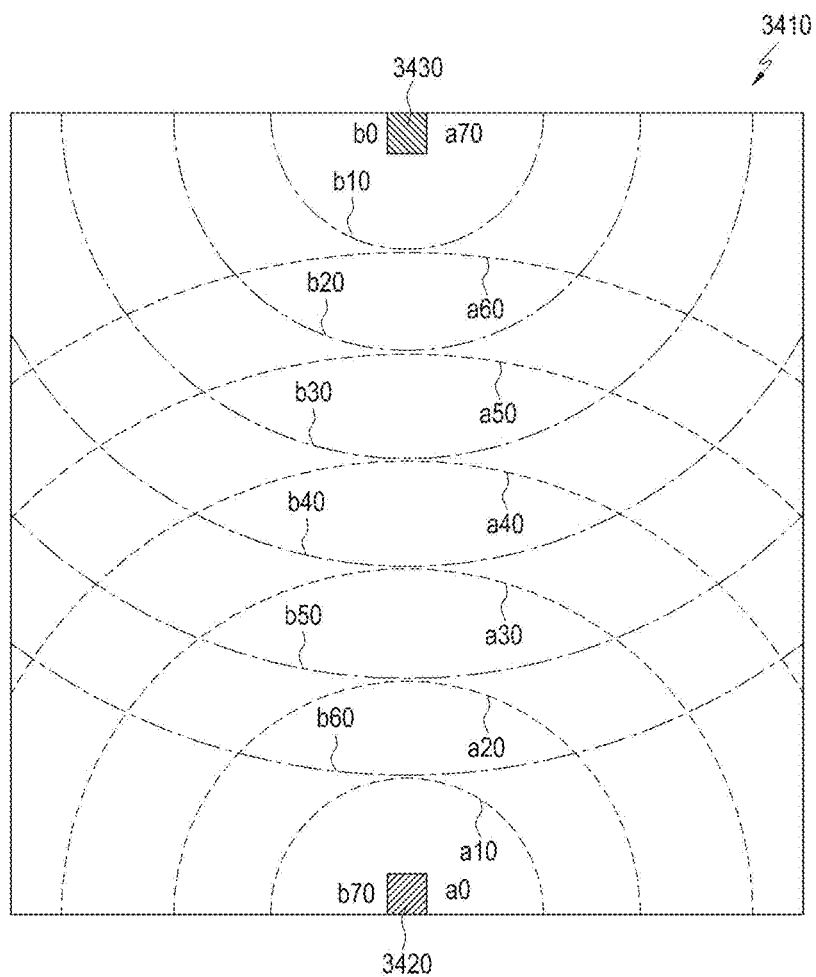
FIG. 34 is a diagram illustrating a signal fingerprint database (DB) of a space of interest according to various embodiments of the present disclosure.

FIG. 34 is a diagram illustrating a signal fingerprint DB of a space of interest according to an embodiment of the present disclosure.

Referring to FIG. 34, when first and second RF signal transmitters 3420 and 3430 are disposed in a space of interest 3410, RF signal distribution in the space of interest 3410 is illustrated. When the electronic device receives an RF signal, reception intensity of a first RF signal output from the first RF signal transmitter 3420 is decreased as the electronic device 101 becomes farther away from the first RF signal transmitter 3420 (a0→a10→a20→a30→a40→a50→a60→a70). Similarly, reception intensity of a second RF signal output from the second RF signal transmitter 3430 is deceased as the electronic device 101 becomes farther away from the second RF signal transmitter 3430 (b0→b10→b20→b30→b40→b50→b60→b70).

For example, signal fingerprint DB (e.g., signal fingerprint DB 411) may include information regarding RF signal distribution in the space of interest 3410. For example, electronic devices (for example, the electronic devices 101, 201, and 401) may determine the position of the object or the external device in the space of interest 3410, through operation of comparing and/or matching Wi-Fi fingerprint information (for example, the type and intensity of RF signal received by the object or the external device) from an object or an external device (fingerprint), with the signal fingerprints DB. In FIG. 34, since the position can be displayed via two RF signal transmitters, the position at which signal strengths of the two RF signal transmitters are matched can occur by two places. On the other hand, a more accurate signal fingerprint DB can be constructed by using a triangulation technique using signal strengths of the three or more RF signal transmitters. Alternatively, when collecting signal intensity information only of two or less RF signal transmitters, the possible position can be determined by determining the suitability of the map information and the position information.

Figure 35:
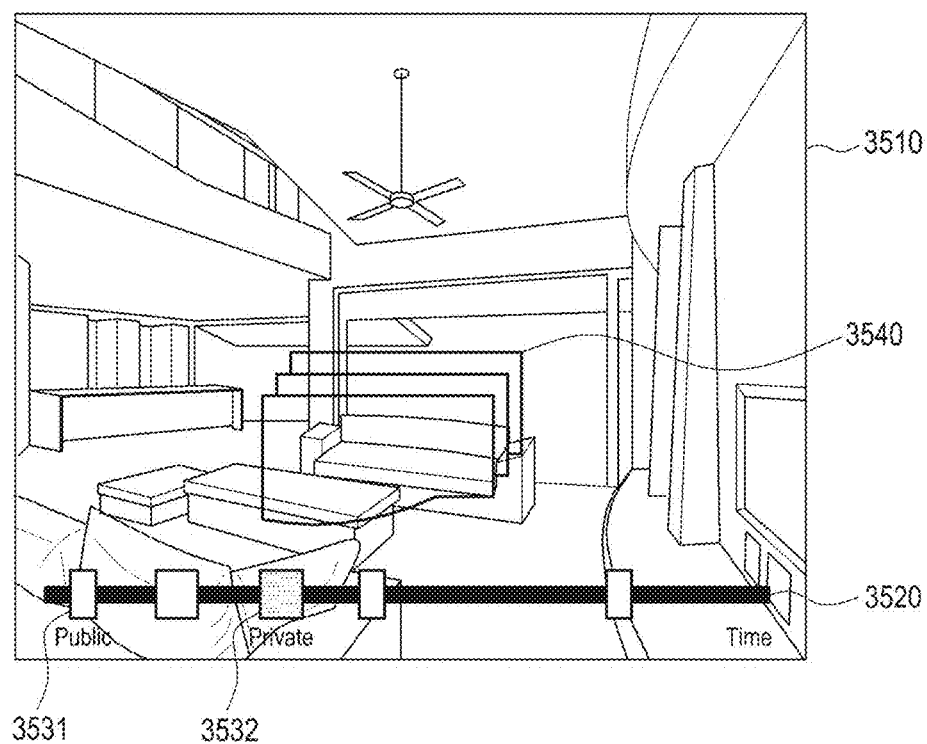
FIGS. 35 and 36 are diagrams illustrating a method for providing history/event information according to various embodiments of the present disclosure.
Figure 36:
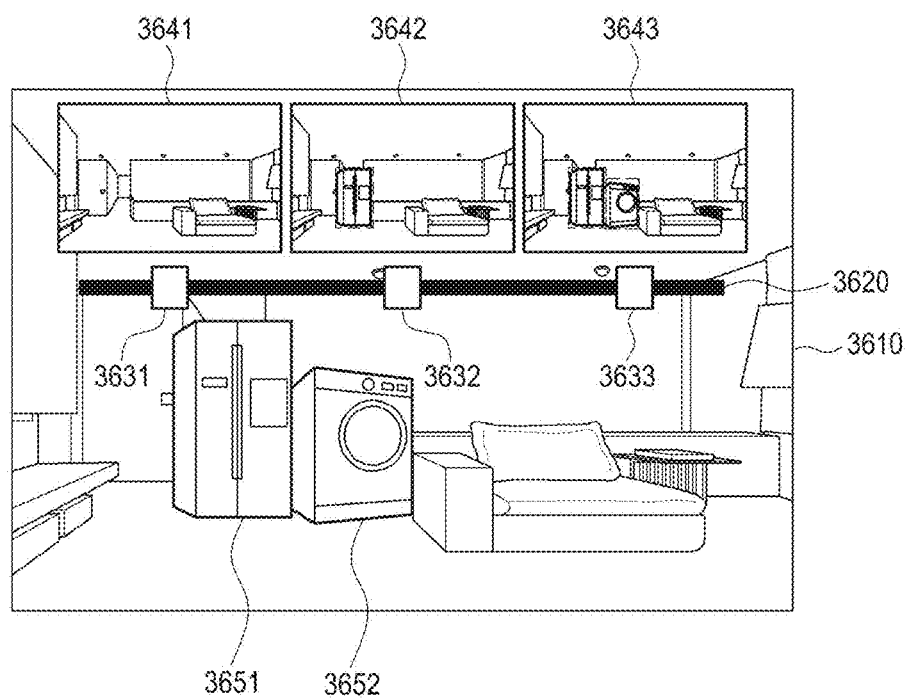

FIGS. 35 and 36 are diagrams illustrating a method for providing history/event information according to various embodiments of the present disclosure.

Referring to FIG. 35, an electronic device (e.g., the electronic devices 101, 201, and 401) may display, via a display (e.g., displays 160 and 260), on a map image 3510, along a time axis 3520 (or a scrolling/slide bar), a plurality of graphical elements 3531 and 3532 (or a thumbnail image or a button) corresponding to the plurality of history/event information 3540.

In an embodiment of the present disclosure, the plurality of graphic elements 3531 and 3532 may include a first graphic element 3531 indicating public information and a second graphic element 3532 indicating the personal information. For example, when the first graphic element 3531 is selected, the electronic device may display history/event information corresponding to the first graphic element 3531. For example, when the second graphic element 3532 is selected, the electronic device may display graphical elements for entering confidential information (e.g., a password input, face recognition, fingerprint recognition, iris recognition, or input window for inputting a pattern lock, and/or the like), and when the confidential information that matches the secret information stored beforehand is inputted, the electronic device may display the history/event information corresponding to the second graphic element 3532. For example, when the second graphic element 3532 is selected, the electronic device may further perform the operation of determining whether the second graphic element 3532 related content is associated with the identified user, through user identifications (e.g., user authentication, user's choice).

Referring to FIG. 36, the electronic device may display, via a display, on a map image 3610, along a time axis 3620 (or a scroll/slide bar), a plurality of graphic elements 3631, 3632, and 3633 (or an indicator or a button) corresponding to a plurality of the previous map images 3641, 3642, and 3643.

For example, when the first graphic element 3631 is selected, the electronic device may display a first image 3641 that does not include the first and second object areas 3651 and 3652 (or the object images). When the second graphic element 3632 is selected, the electronic device may display a second image 3642 including the first object area 3651. For example, when the third graphic element 3633 is selected, the electronic device may display a third image 3643 including the first and second object areas 3651 and 3652.

In an embodiment of the present disclosure, the electronic device may store an image and video photographed with respect to the same place or object along with event information (or event condition). When the event meets a pre-configured condition occurs, the electronic device may provide an image and video corresponding to the event (e.g., a time machine function).

In an embodiment of the present disclosure, the electronic device may store images or videos taken with respect to the same place or object based on the time information. The electronic device may overlay 3540 the previous map image on the current map image which displays a specific place or object, or may arrange and display previous map images in conjunction with the slide bar 3620. The electronic device may provide a GUI capable of searching for a previous map image and a map-related video (e.g., a video mapped to the map) by the user.

In an embodiment of the present disclosure, the electronic device may notify information on the map image (or the map image) to the user, according to a pre-configured event condition (e.g., a particular date or time, such as after a certain time lapsed, arrival of a particular person).

In an embodiment of the present disclosure, when the space of interest (e.g., a museum) or an object (e.g., exhibitions) has been changed, the electronic device may store the map image, overlay and display 3540 at least some of the past map image on the current map image, or provide a GUI that can check the past map image or video. For example, the overlay display 3540 may display multiple map images (for example, mapping a thumbnail image on the map), and when one of multiple map images is selected, a video that is associated with the map image can be reproduced.

In an embodiment of the present disclosure, the electronic device may record/store, with an image/text, a scenery change outside the window due to seasonal change, time change (e.g., day and night), a weather change, and/or the like.

In an embodiment of the present disclosure, the electronic device may record/store, with an image/text, an interior change, and event (for example, a birthday party, and height measurement) related information.

In an embodiment of the present disclosure, the electronic device may photograph a plurality of 2D images, panoramic images or videos, and record/store along with image metadata (e.g., location, time, direction, angle), and then generate nodes.

In an embodiment of the present disclosure, the electronic device may retrieve at least one adjacent nodes having metadata that is associated in a virtual 3D space, synthesize images and/or video scenes of the retrieved nodes by considering direction, angle, and/or resolution, and map the synthesized image (for example, a panoramic image or 3D modeling image) to the virtual 3D space.

In an embodiment of the present disclosure, the electronic device may detect the scene/image change based on the specific position and/or angle in the 3D map, and collect and update the image/video in which change has occurred.

In an embodiment of the present disclosure, the electronic device may store an image or video updated based on time and/or position.

In an embodiment of the present disclosure, the electronic device may map image or video information to a 3D map based on a position and/or a direction.

In an embodiment of the present disclosure, the electronic device may display the mapped multiple images or video information in a format of an overlay or as a thumbnail, based on a position and/or direction, and may display the image or video in accordance with the user selection.

In an embodiment of the present disclosure, the electronic device may display a time slider along a time axis, display a map image according to time set by the user, or may perform a specific operation action according to set time (for example, a time capsule function). For example, a user may set the favorite time, such as past, present, and future.

In an embodiment of the present disclosure, the electronic device can be configured such that an event occurs on a certain time the user wants after the current time.

In an embodiment of the present disclosure, the electronic device can be configured to perform the corresponding operation, when an event occurs due to the arrival of the set time (for example, alarm setting, set event to the calendar, and/or the like).

In an embodiment of the present disclosure, the electronic device may be connected to a plurality of external devices. The electronic device may store the state/context information of the plurality of external devices during a particular time point or a particular time. The electronic device may control the plurality of external devices so as to reproduce the state/context during the particular time point or the particular time, in response to a user input or an event occurrence, based on the state/context information stored during the particular time point or the particular time.

Figure 37:
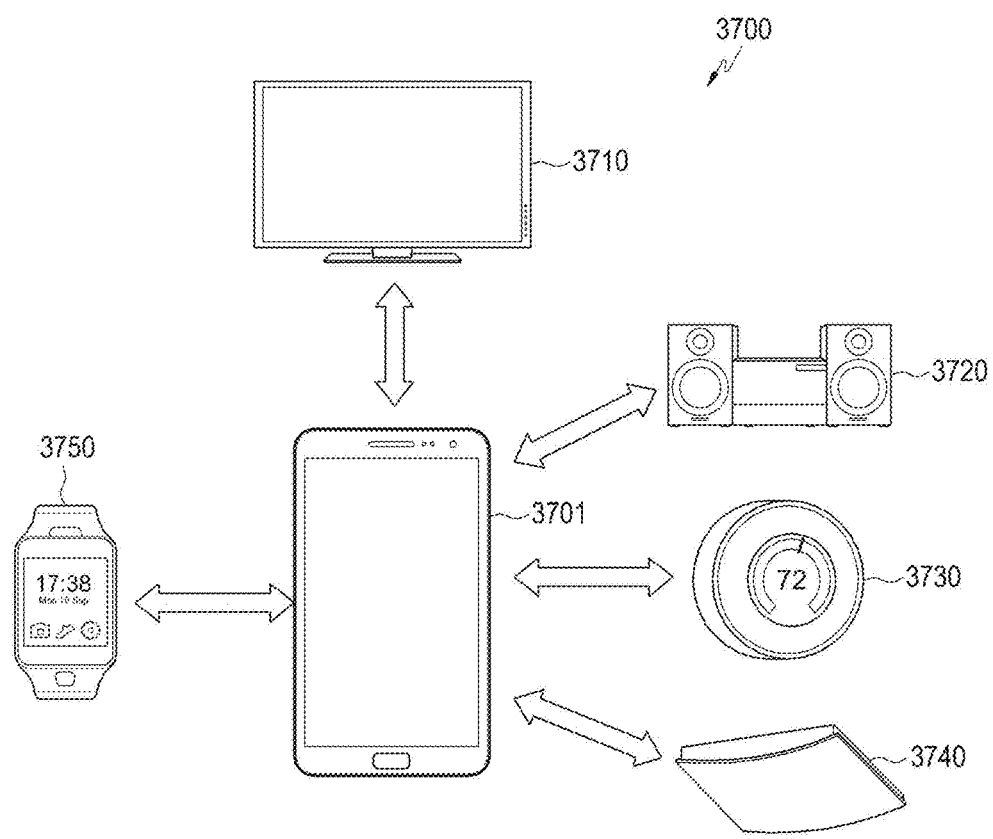
FIG. 37 illustrates a network environment according to various embodiments of the present disclosure.

FIG. 37 illustrates a network environment according to various embodiments of the present disclosure.

Referring to FIG. 37, a network environment 3700 may include an electronic device 3701 (e.g., the electronic devices 101, 201, and 401, a first external device 3710 (for example, video equipment, TV) connectable to the electronic device 3701, the second external device 3720 (for example, an audio system), a third external device 3730 (for example, a temperature controller), a fourth external device 3740 (for example, an indoor lighting device), and a fifth external device 3750 (for example, a wearable device, such as a watch).

The electronic device 3701 may establish a communication connection with at least some of the plurality of external devices 3710 to 3750. When the pre-configured condition is satisfied or the user input is received, the electronic device 3701 may record/store the state/context information of the plurality of external devices 3710 to 3750 in a memory (e.g., memories 130 and 230) of the electronic device 3701, at the current time point or during pre-determined time from the current time point. For example, the electronic device 3701 may receive, from the first external device 3710, state/context information (for example, on/off state information, information on the image/video file being reproduced (or whether to reproduce), TV channel information, volume/brightness information, and/or the like) on the first external device 3710, or may determine the information depending on whether to connect or not.

For example, the electronic device 3701 may receive, from the second external device 3720, state/context information (for example, on/off state information, information on the image/video file being reproduced (or whether to reproduce), radio channel information, volume/brightness information, and/or the like) on the second external device 3720, or may determine the information depending on whether to connect or not. For example, the electronic device 3701 may receive, from the third external device 3730, state/context information (for example, on/off state information, information on the current temperature, information on a temperature adjustment mode, and/or the like) on the third external device 3730, or may determine the information depending on whether to connect or not. For example, the electronic device 3701 may receive, from the fourth external device 3740, state/context information (for example, on/off state information, information on the current lighting brightness, information on a lighting adjustment mode, and/or the like) on the fourth external device 3740, or may determine the information depending on whether to connect or not. For example, the electronic device 3701 may receive, from the fifth external device 3750, state/context information (for example, on/off state information, information on the operation mode/state, information on the media file being reproduced, and/or the like) on the fifth external device 3750, or may determine the information depending on whether to connect or not.

In an embodiment of the present disclosure, the electronic device 3701 may also store the state/context information of the plurality of external devices 3710 to 3750 in an external device, such as a server. In one embodiment of the present disclosure, the electronic device 3701 may also store the state/context information on the plurality of external devices 3710 to 3750 in at least one of the plurality of external devices 3710 to 3750.

The electronic device may control the plurality of external devices 3710 to 3750 so as to reproduce the state or context during the specific time point or the specific time, in response to a user input or an event occurrence, and based on the state/context information on the plurality of external devices 3710 to 3750 stored during the specific time point or the specific time.

Figure 38:
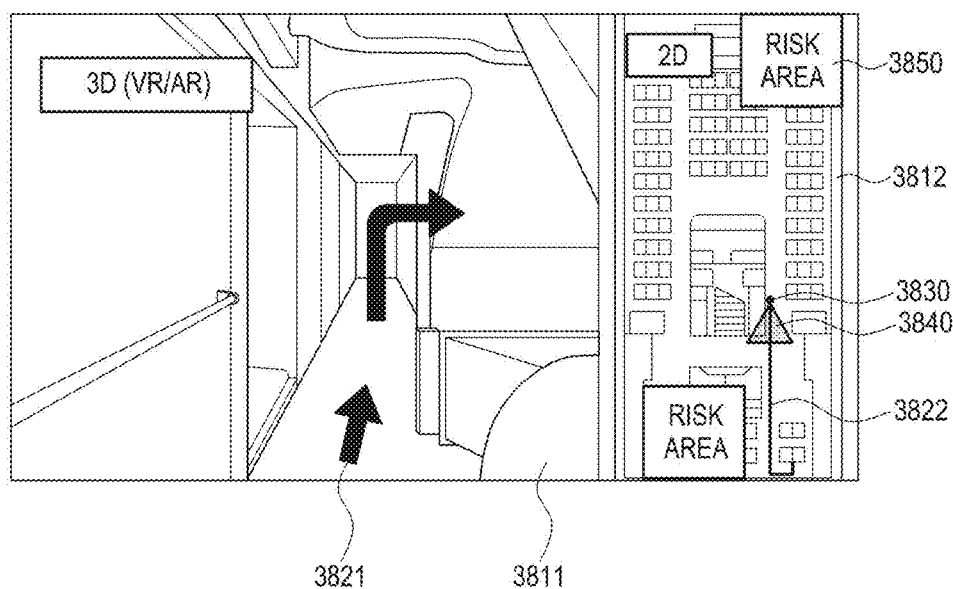
FIGS. 38 and 39 are diagrams illustrating a guidance method of an emergency route according to various embodiments of the present disclosure.
Figure 39:
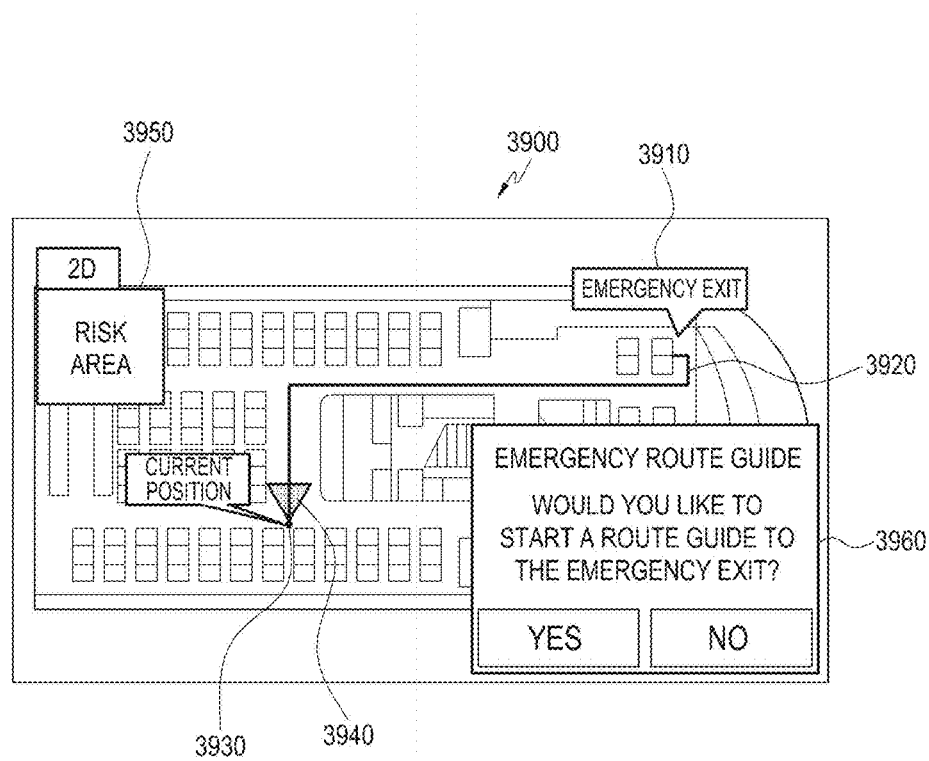

FIGS. 38 and 39 are diagrams illustrating a guidance method of an emergency route according to various embodiments of the present disclosure.

Referring to FIG. 38, when the event associated with the emergency situation occurs, an electronic device (e.g., the electronic devices 101, 201, and 401) may display a 3D map image 3811 that displays a first graphical element 3821 indicating the emergency route, and/or a 2D map image 3812 that displays a second graphical element 3822 indicating the emergency route.

In an embodiment of the present disclosure, the electronic device may display, on the 2D map image 3812, a third graphical element 3830 indicating the position of the current node, a fourth graphic element 3840 indicating a photographing direction (or, a user's gazing direction, or a pointing direction of the electronic device) of the 3D map image, and a fifth graphical element 3850 indicating a risk area.

Referring to FIG. 39, when the event associated with the emergency situation occurs, the electronic device may display a 2D map image 3900 on which a first graphic element 3910 indicating an emergency exit, a second graphic element 3920 indicating an emergency route, a third graphics element 3930 indicating a position of a current node, a fourth graphic element 3940 indicating a photographing direction (or a user's gazing direction, or a pointing direction of the electronic device) of a 3D map image, and a fifth graphical element 3950 indicating a risk area are displayed.

In an embodiment of the present disclosure, as illustrated in FIG. 39, the electronic device may display a sixth graphical element 3960 (for example, an emergency route guide) for automatically guiding an emergency route based on the current location of the user or the electronic devices (and/or a user's gaze direction or a pointing direction of the electronic device) (for example, the navigation function). For example, when the user selects a "YES" button of the sixth graphical elements 3960, the electronic device may automatically display the image of the node corresponding to the current position based on the current position of the user or the electronic device.

In an embodiment of the present disclosure, the electronic device may provide an emergency guide providing service/ application.

In an embodiment of the present disclosure, the electronic device may provide an emergency support function when the network is disconnected.

In an embodiment of the present disclosure, the electronic device may provide, through at least one of a display or a speaker, a path and an evacuation guide configured to help a user escape from the emergency (e.g., fire, disaster, earthquake, accident, and/or the like), in the space of interest (for example, a shopping center, a department store, a ferry, and/or the like), or configured to guide a user to a safety zone.

In an embodiment of the present disclosure, the electronic device may guide the nearest or an optimum exit.

In an embodiment of the present disclosure, the electronic device may provide a guide based on output information of a sensor or the event satisfying a pre-configured condition.

In an embodiment of the present disclosure, the electronic device may search for information on a safety guide at an emergency in real-time, download guide information from a server based on a network, or search for guide information from data stored in the electronic device.

In an embodiment of the present disclosure, the electronic device may provide starting information in a virtual tour format or provide audio information.

In an embodiment of the present disclosure, the electronic device may detect information on the circumstances (for example, a gas, a dust, a yellow dust, formaldehyde, ambient temperature, pressure, liquid/gas in the atmosphere, user biometric information (heart rate monitor (HRM), ECG sensor, electromagnetic radiation (EMR), EEG).

In an embodiment of the present disclosure, the electronic device may provide various services using a 3D/2D spatial map.

For example, the electronic device may provide information on the superimposed or stacked goods that cannot be provided by the 2D map.

For example, the electronic device may provide a user based view and service (for example, UI for children, map images of various angles, and/or the like) in connection with the user's profile (such as height, available goods, and/or the like).

For example, the electronic device may automatically check power, water supply, gas consumption, and/or the like, in the smart home, and may check or notify whether a failure occurs.

For example, the electronic device may check a condition (for example, an aging state) or a contamination state of the home appliances or the particular object, and notify the exchange cycle of the product/part.

For example, the electronic device may control home appliances positioned in a particular location in indoor or outdoor, and provide more intuitive usage environment.

For example, the electronic device may recognize the size and volume of the object deployed in indoors, and may provide simulation for moving the interiors or furniture (e.g., a lighting, electronic product state, and/or the like).

For example, the electronic device may recognize an indoor air condition, the situation, such as gas leak, and/or the like, and may notify the situation to the user, or may provide a coping guide.

For example, the electronic device may notify an evacuation channel or a current status to the user when an emergency or a disaster occurs.

For example, the electronic device may support a switching service/scenario between an outdoor map and an indoor map.

For example, the electronic device, after guiding the interest building by the navigator of the vehicle, may guide the specific location and position inside the building, or may guide the indoor/outdoor map of the floors inside the building selected in the 3D map.

For example, the electronic device may support the search for and purchase the current exhibition items in an offline shopping mall.

For example, the electronic device makes it possible to share the user's own experience and others experiences by coupling/synthesizing the experiences together (for example, sharing of routes different from each other, the goods queries direction, and/or the like) with respect to traveling site, and/or the like.

For example, through the electronic device, the user may create a navigation video which configures what was experienced with a friend in a three-dimensional.

For example, the electronic device may provide manual functions and operation simulation functions related to the use of various electronic products.

For example, the electronic device may provide VR, a sound effect simulation, and/or the like, using another 3D map in a home theater environment.

For example, through the electronic device, the user may develop a service scenario in conjunction with a wearable device and smartphone.

For example, through the electronic device, the user may make a seat query and a reservation of a restaurant, a theater, transportation means, and/or the like.

In one embodiment of the present disclosure, the electronic device may photograph a plurality of 2D images, panoramic images and/or videos, and record along with image metadata (e.g., location, time, direction, angle), and then generate nodes.

In an embodiment of the present disclosure, the electronic device may retrieve at least one adjacent nodes having metadata that is associated in a virtual 3D space, synthesize images or video scenes of the retrieved nodes by considering direction, angle, and/or resolution, and map the synthesized image (for example, a panoramic image or 3D modeling image) to the virtual 3D space.

In an embodiment of the present disclosure, the electronic device may generate a transition image (2D or 3D) to be found in the path between a plurality of adjacent nodes (e.g., nodes that exist in the same or similar time space along time and direction).

In an embodiment of the present disclosure, the electronic device may give a tag on the object, by selecting the object included in the portion of the image or video that configures the 3D map (for example, an image search by the user, OCR, home appliances image search, NFC, bar code recognition, handwriting recognition, and/or the like).

In an embodiment of the present disclosure, the electronic device may determine the attribute information of the tagged object (e.g., at least one among an object type, model name, size, location, time, type of service, a network address, a control method, a type of a control signal, a network address, product identification ID, catalog information, synthesis of a virtual 3D model and related information), and may perform the operation of storing the attribute information in conjunction with the 3D map information.

In an embodiment of the present disclosure, the electronic device may detect a scene change based on a specific position and angle in a 3D map, and update the image or video when a change has occurred.

In an embodiment of the present disclosure, the electronic device may store an image and video which have been updated based on time and position.

In an embodiment of the present disclosure, the electronic device may map the stored image or video information based on position and direction of a 3D map.

In an embodiment of the present disclosure, the electronic device may display the mapped plurality of images, or video information in a form of an overlay or a thumbnail, based on the relevant position and direction, and may display in response to a user selection.

According to various embodiments of the present disclosure, a method for operating an electronic device may include: determining at least one of distance or direction between a first node and a second node among the plurality of nodes including at least one image and 3D information associated with at least a portion of the at least one image, and generating a spatial map that connects the first node and the second node based on the at least one of the distance and the direction.

According to various embodiments of the present disclosure, the method may further include: arranging at least one among the at least one image in a space of the first node or the second node corresponding to a photographing position or a photographing direction.

According to various embodiments of the present disclosure, the 3D information may include 3D information determined by comparing at least some area of the first image and at least some area of the second image with respect to the first image and the second image among the at least one image.

According to various embodiments of the present disclosure, in the electronic device, it may further include an operation of obtaining a plurality of images via a camera functionally connected to the electronic device.

According to various embodiments of the present disclosure, the acquisition operation may include identifying a photographing position of the camera or a photographing direction of the camera with respect to the plurality of images, and display a photographing guide on a screen operatively connected to the electronic device, based on at least one of the photographing position or the photographing direction.

According to various embodiments of the present disclosure, the method may further include acquiring one of the plurality of images in response to where the photographing position or the photographing direction belongs to a critical area corresponding to the photographing guide.

According to various embodiments of the present disclosure, the photographing guide may include a photographing area guide configured in relation to one focus (or a center point) information, based on the photographing position or the photographing direction.

According to various embodiments of the present disclosure, the method for operating the electronic device may include, acquiring another image, when a node corresponding to another image among the plurality of nodes does not exist, generating a node corresponding to another image, and disposing the another image in the space of the generated node.

According to various embodiments of the present disclosure, the method for operating the electronic device may further include: switching, in response to the user input with respect to the electronic device or the position or direction of the electronic device, at least some among the plurality of images corresponding to the first node into at least some among the plurality of images corresponding to the second node, and then displaying the switched images.

According to various embodiments of the present disclosure, the method for operating the electronic device may further include displaying visual information corresponding to at least one of the first node or the second node, in response to the user input with respect to the electronic device or the position or direction of the electronic device.

According to various embodiments of the present disclosure, the first node or the second node may include two or more images among the plurality of images allocated to a particular point of a space of the first node or the second node, and the first image among the two or more images may be disposed on the point as a representative.

According to various embodiments of the present disclosure, the method for operating the electronic device may further include: setting an event condition associated with the second image among the two or more images to the at least one node, and disposing, in response to an event satisfying the condition, the second image on the point as a representative.

According to various embodiments of the present disclosure, the operation of generating the spatial map may include, when the first node and the second node belong to different spatial map, respectively, combining the first spatial map in which the first node belongs and the second spatial map in which the second node belongs.

According to various embodiments of the present disclosure, the method for operating the electronic device may further include: determining the ground or an obstacle of the first node and the second node, based on the three-dimensional information, and generating a planar map that connects the first node and the second node, based on the ground or the obstacle.

According to various embodiments of the present disclosure, the spatial map may include emergency route information, based on the determination of whether a path that connects the first node and the second node is an emergency route.

According to various embodiments of the present disclosure, the method for operating the electronic device may further include: receiving an event related to the emergency, and in response to the event, displaying the emergency route information.

According to various embodiments of the present disclosure, the operation of displaying may include displaying the emergency route information within a specific range from the electronic device, based on the position or direction of the electronic device.

According to various embodiments of the present disclosure, the operation of displaying may include: receiving information on a point where the emergency situation occurs on the spatial map, and displaying the emergency route that does not pass through the point.

According to various embodiments of the present disclosure, the method for operating the electronic device may further include: determining the object being included in at least a part of the images, and acquiring the attribute information of the object.

According to various embodiments of the present disclosure, the operation of the acquisition may include: requesting the attribute information from an external device associated with the object, and receiving, in response to the request, the attribute information from the external device.

According to various embodiments of the present disclosure, the attribute information may include control information for controlling the function of the object.

According to various embodiments of the present disclosure, the method for operating the electronic device may further include: transmitting a control signal for the object by using the control information.

According to various embodiments of the present disclosure, the attribute information may include a three dimensional model of the object.

According to various embodiments of the present disclosure, the method for operating the electronic device may further include disposing or moving the three dimensional model on the spatial map, based on the three dimensional information.

According to various embodiments of the present disclosure, an electronic device may include: a camera that obtains at least one image, and a controller that is functionally connected to the camera, wherein the controller is configured to determine at least one of a distance or direction between a first node and a second node among a plurality of nodes including at least one image and three-dimensional information associated with at least some of the at least one image, and generate a spatial map that connects the first node and the second node based on at least one of the distance or direction.

An electronic device according to various embodiments of the present disclosure may be configured to arrange at least one among the at least one image in a space of the first node or the second node corresponding to at least one of the photographing position or the photographing direction.

An electronic device according to various embodiments of the present disclosure, the 3D information may include 3D information determined by comparing at least some area of the first image and at least some area of the second image with respect to the first image and the second image among the at least one image.

An electronic device according to various embodiments of the present disclosure, the controller is configured to identify a photographing position of the camera or a photographing direction of the camera with respect to the at least one image, and display a photographing guide on a screen operatively connected to the electronic device, based on at least one of the photographing position or the photographing direction.

An electronic device according to various embodiments of the present disclosure, the controller is configured to acquire one of the at least one image, in response to the photographing position or the photographing direction corresponding to a critical area of the photographing guide.

An electronic device according to various embodiments of the present disclosure, the photographing guide may include a photographing area guide configured in relation to one focus (or a center point) information, based on the photographing position or the photographing direction.

An electronic device according to various embodiments of the present disclosure, the controller is configured to acquire another image via the camera, and when a node corresponding to another image among the plurality of nodes does not exist, to generate a node corresponding to another image and to dispose the another image in the space of the generated node.

An electronic device according to various embodiments of the present disclosure, the controller is configured to: switch, in response to the user input with respect to the electronic device or the position or direction of the electronic device, at least some among the plurality of images corresponding to the first node into at least some among the plurality of images corresponding to the second node, and then display the switched images on a screen functionally connected to the electronic device.

An electronic device according to various embodiments of the present disclosure, the controller is configured to display, on the display functionally connected to the electronic device, visual information corresponding to at least one of the first node or the second node, in response to the user input with respect to the electronic device or the position or direction of the electronic device.

An electronic device according to various embodiments of the present disclosure, the first node or the second node may include two or more images among the plurality images allocated to a particular point of a space of the first node or the second node, and the first image among the two or more images may be disposed on the point as a representative.

An electronic device according to various embodiments of the present disclosure, the controller is configured to set an event condition associated with the second image among the two or more images to the at least one node, and dispose, in response to an event satisfying the condition, the second image on the point as a representative.

An electronic device according to various embodiments of the present disclosure, the controller is configured to, when the first node and the second node belong to different spatial maps, respectively, combine the first spatial map in which the first node belongs and the second spatial map in which the second node belongs.

An electronic device according to various embodiments of the present disclosure, the controller is configured to determine the ground or an obstacle of the first node and the second node, based on the three-dimensional information, and generate a planar map that connects the first node and the second node, based on the ground or the obstacle.

According to various embodiments of the present disclosure, the spatial map may include emergency route information, based on the determination of whether a path that connects the first node and the second node is an emergency route.

An electronic device according to various embodiments of the present disclosure, the controller is configured to receive an event regarding an emergency situation, and to display, in response to the event, the emergency route information on the screen functionally connected to the electronic device.

An electronic device according to various embodiments of the present disclosure, the controller is configured to display, on the screen, the emergency route information within a specific range from the electronic device, based on the position or direction of the electronic device.

An electronic device according to various embodiments of the present disclosure, the controller is configured to receive information on a point where the emergency situation occurs on the spatial map, and to display the emergency route that does not pass through the point.

An electronic device according to various embodiments of the present disclosure, the controller is configured to determine the object included in at least a portion of the images, and to acquire attribute information of the object.

An electronic device according to various embodiments of the present disclosure, the controller is configured to: request the attribute information from an external device associated with the object, and to receive, in response to the request, the attribute information from the external device.

An electronic device according to various embodiments of the present disclosure, the attribute information includes control information for controlling the function of the object.

An electronic device according to various embodiments of the present disclosure, the controller is configured to transmit a control signal for the object, using the control information.

An electronic device according to various embodiments of the present disclosure, the attribute information may include a three dimensional model of the object.

An electronic device according to various embodiments of the present disclosure, the controller is configured to dispose or move the three dimensional model according to the user input on the spatial map, based on the three dimensional information.

A computer readable recording media according to various embodiments of the present disclosure may include instructions of: determining at least one of distance or direction between a first node and a second node among the plurality of nodes including at least one image and 3D information associated with at least a portion of the at least one image, and generating a spatial map that connects the first node and the second node based on at least one of the distance and the direction.

According to various embodiments of the present disclosure, a method for providing information associated with the space of interest by the electronic device may include: displaying a map including at least one node associated with at least one image photographed from the position of the space of interest and the information on the at least one image, changing, in response to the first input, the first image that is associated with the first node among the at least one node, or first information on the first image, and displaying the changed first image or the changed first information on the map.

According to various embodiments of the present disclosure, a method for providing information associated with the space of interest by an electronic device may include: displaying a map image including a pre-configured area on the display, detecting a selection of the pre-configured area, and outputting, in response to the selection, the attribute/relevant information of the object displayed on the map image.

According to various embodiments of the present disclosure, a method for providing information associated with the space of interest by an electronic device may include: displaying a map including at least one node is associated with at least one image corresponding to the position of the space of interest, changing, when the pre-configured condition is satisfied, the first node information associated with the first node among the at least one node, and displaying at least a portion of the changed first node information.

According to various embodiments of the present disclosure, the node information associated with each node may include at least one image corresponding to the corresponding position of the space of interest and information associated with the at least one image.

According to various embodiments of the present disclosure, the displaying of the map may include displaying a plurality of nodes and paths connected to the plurality of nodes.

According to various embodiments of the present disclosure, the displaying of the map may include displaying a first image associated with the first node, the plurality of nodes, and a path that connects the plurality of nodes altogether.

According to various embodiments of the present disclosure, the displaying of the map may include displaying a first image associated with the first node, and displaying, on the first image, the plurality of nodes and a path that connects the plurality of nodes.

According to various embodiments of the present disclosure, the displaying of the map may include displaying the plurality of nodes, a path that connects the plurality of nodes, and a photographing direction of each of the image associated with each node altogether.

According to various embodiments of the present disclosure, the displaying of the map may include displaying the plurality of nodes and a path that connects the plurality of nodes, wherein the path can be formed based on at least one of a distance or displacement direction between adjacent nodes.

According to various embodiments of the present disclosure, the node information associated with each node may include at least one image corresponding to the position of the space of interest and information associated with the at least one image, and wherein information associated with the at least one image may include 3D information associated with at least a portion of the at least one image.

According to various embodiments of the present disclosure, the node information associated with each node may include at least one image corresponding to the position of the space of interest and information associated with the at least one image, and wherein information associated with the at least one image may include depth information of the object displayed on the at least one image.

A method according to various embodiments of the present disclosure may further include: displaying a preview image photographed by the camera of the electronic device, and displaying an indicator for photographing guide on the preview image.

A method according to various embodiments of the present disclosure may further include: displaying a preview image photographed by the camera of the electronic device, and displaying an indicator for photographing guide on the preview image, wherein the position of the indicator can be determined based on the position or direction of the camera.

A method according to various embodiments of the present disclosure may further include: displaying a preview image photographed by the camera of the electronic device, and displaying an indicator for photographing guide on the preview image, wherein the position of the indicator can be determined based on the photographing positions or photographing directions of the images associated with the plurality of nodes.

A method according to various embodiments of the present disclosure may further include: displaying a preview image photographed by the camera of the electronic device, displaying an indicator for photographing guide on the preview image, and associating an image photographed according to the guide of the indicator with the first node, one node among the plurality of nodes, or a new node.

According to various embodiments of the present disclosure, the changing of the first node information may further include: displaying a preview image photographed by the camera of the electronic device, displaying an indicator for a photographing guide on the preview image, and associating an image photographed according to the guide of the indicator with the first node.

According to various embodiments of the present disclosure, the changing of the first node information may further include: displaying a preview image photographed by the camera of the electronic device, displaying, on the preview image, a first indicator indicating a position or direction in which an image is to be photographed and a second indicator indicating a current position or direction, and associating an image photographed according to the guide of the first and second indicators with the first node.

A method according to various embodiments of the present disclosure, the changing of the first node information may include: displaying a preview image photographed by the camera of the electronic device, displaying an indicator for photographing guide on the preview image, and changing at least a portion of the first image associated with the first node, based on the image photographed according to the guide of the indicator.

A method according to various embodiments of the present disclosure, the changing of the first node information may include: displaying a preview image photographed by the camera of the electronic device, displaying an indicator for photographing guide on the preview image, and changing at least some of the first node information, based on the image photographed according to the guide of the indicator.

According to various embodiments of the present disclosure, the displaying of the map includes displaying a first image associated with the first node, and in response to a change of the input or the position of the electronic device, the second image associated with the second node among the plurality of nodes can be displayed by replacing the first image.

According to various embodiments of the present disclosure, the displaying of the map includes displaying a first image associated with the first node, and in response to an input or a direction change of the electronic device, another image associated with the first node can be displayed by replacing the first image.

According to various embodiments of the present disclosure, in response to an input or a direction change of the electronic device, a graphical element associated with the first node can be displayed.

According to various embodiments of the present disclosure, the first node information may include a plurality of images including a first image, and the first image among the plurality of images can be displayed in response to a selection of the first node.

According to various embodiments of the present disclosure, the displaying of the map may include displaying a first image associated with the first node, and changing the first node information may include: detecting the occurrence of an event, and replacing, in response to the occurrence of the event, the first image with another image associated with the first node.

According to various embodiments of the present disclosure, the displaying of the map may include displaying a first image associated with the first node, and changing the first node information may include: detecting the occurrence of an event, and acquiring from the external device, in response to the occurrence of the event, a graphic element associated with the first node, and the graphic element can be displayed.

According to various embodiments of the present disclosure, the displaying of the map may include displaying a first path that connects a portion of the plurality of nodes, and changing the first node information may include: detecting the occurrence of an event, and replacing, in response to the occurrence of the event, the first path with a second path that connects other parts among the plurality of nodes.

According to various embodiments of the present disclosure, the displaying of the map may include displaying a first path that connects a portion of the plurality of nodes, and the changing of the first node information may include: detecting the occurrence of an event, and replacing, in response to the occurrence of the event, the first path with a second path that connects other parts among the plurality of nodes, a graphic element guiding the second path can be displayed on a first image associated with the first node.

According to various embodiments of the present disclosure, the displaying of the map may include displaying a first path that connects a portion of the plurality of nodes, and the changing of the first node information may include: detecting the occurrence of an event, and replacing, in response to the occurrence of the event, the first path with a second path that connects other parts among the plurality of nodes, wherein the second path can be configured so as not to pass through the node associated with the event among the plurality of nodes.

According to various embodiments of the present disclosure, the changing of the first node information may include: acquiring, from the external device, information on the object displayed on the first image associated with the first node, and information on the object can be displayed.

According to various embodiments of the present disclosure, the changing of the first node information may include: acquiring information on the external device, from the external device corresponding the object displayed on the first image associated with the first node, and information on the external device can be displayed.

According to various embodiments of the present disclosure, the changing of the first node information may include: transmitting, to the external device, information on the first image associated with the first node, and acquiring, from the external device, information on the object displayed on the first image, and information on the object can be displayed.

According to various embodiments of the present disclosure, the changing of the first node information may include: acquiring control information on the object displayed on the first image associated with the first node, displaying control information on the object, and controlling the object, in response to an input associated with the displayed control information.

According to various embodiments of the present disclosure, the displaying of at least a portion of the changed first node information may include: disposing and displaying a plurality of images associated with the first node or indicators corresponding to the plurality of images in time sequence.

According to various embodiments of the present disclosure, the displaying of at least a portion of the changed first node information may include: disposing and displaying, in response to the occurrence of the event, a plurality of images associated with the first node or indicators corresponding to the plurality of images in time sequence.

According to various embodiments of the present disclosure, the changing of the first node information may include storing a message on the object displayed on the first image associated with the first node, and the message or an indicator of the message can be displayed.

According to various embodiments of the present disclosure, the changing of the first node information may include storing a message on the object displayed on the first image associated with the first node, and information associated with reception or storage of the message can be displayed.

According to various embodiments of the present disclosure, the displaying of the at least some of the changed first node information may include: storing a tag with respect to an object displayed on a first image associated with the first node, and displaying the tag or an indicator of the tag.

According to various embodiments of the present disclosure, the displaying of the at least a portion of the changed first node information may include: transmitting, to an external device, a message or a tag with respect to an object displayed on a first image associated with the first node, and displaying information associated with the transmission or reception of the message or the tag.

According to various embodiments of the present disclosure, the displaying of at least a portion of the changed first node information may include: detecting the occurrence of an event, and controlling, in response to the occurrence of the event, at least one device displayed on the first image associated with the first node, and displaying the control result of the at least one device.

According to various embodiments of the present disclosure, the displaying of at least a portion of the changed first node information may include: receiving a message, and transmitting, in response to the reception of the message, information associated with the message to at least one device displayed on a first image associated with the first node.

According to various embodiments of the present disclosure, the displaying of at least a portion of the changed first node information may include: receiving a message, transmitting, in response to the reception of the message, information associated with the message to at least one device displayed on a first image associated with the first node, and displaying information associated with the reception or transmission of the message.

According to various embodiments of the present disclosure, the displaying of at least a portion of the changed first node information may include: receiving a message including information on a state of a device displayed on a first image associated with the first node, and displaying, in response to the reception of the message, information on the message.

According to various embodiments of the present disclosure, the displaying of at least a portion of the changed first node information may include: displaying a state of a first external device displayed on a first image associated with the first node, and transmitting, in response to an input, a message including information on the first external device to a second external device.

According to various embodiments of the present disclosure, the displaying of at least a portion of the changed first node information may include: displaying a state of a first external device displayed on a first image associated with the first node, transmitting, in response to an input, a message including information on the first external device to a second external device, and receiving, from the second external device, information associated with a control of the first external device.

According to various embodiments of the present disclosure, the displaying of at least a portion of the changed first node information may include: displaying a state of a first external device displayed on a first image associated with the first node, transmitting, in response to an input, a message including information on the first external device to a second external device, connecting with the second external device, and controlling the first external device according to a control of the second external device.

According to various embodiments of the present disclosure, an electronic device for providing information associated with a space of interest may include: a display, and a processor which is configured to display, on the display, at least a portion of a map including at least one node associated with at least one image photographed at a corresponding position of the space of interest and information (or additional information) on the at least one image, change, in response to a first input, at least a portion of a first image associated with a first node among the at least one node or first information (or first additional information) on the first image, and display, on the map through the display, at least a portion of the changed first image or at least a portion of the changed first information.

According to various embodiments of the present disclosure, an electronic device for providing information associated with a space of interest may include: a display, and a processor that is configured to display a map image including a pre-configured area on the display, detect a selection of the pre-configured area, and output, in response to the selection, attribute/relevant information of an object displayed on the map image.

According to various embodiments of the present disclosure, an electronic device for providing map information associated with a space of interest may include: a display, and a processor that is configured to: display at least a portion of a map including at least one node associated with at least one image photographed at a corresponding position of the space of interest and information on the at least one image, change, in response to a first input, a first image associated with a first node among the at least one node or first information on the first image, and display at least a portion of the changed first image or at least a portion of the changed first information on the map.

According to various embodiments of the present disclosure, the processor is configured to: display, on the display, a map including at least one node associated with at least one image corresponding to the corresponding position of the space of interest, when a pre-configured condition is satisfied, change the first node information associated with a first node among at least one node, and display at least a portion of the changed first node information on the display.

According to various embodiments of the present disclosure, the node information associated with each node may include at least one image corresponding to the position of the space of interest and information associated with the at least one image.

According to various embodiments of the present disclosure, the processor may be configured to display, on the display, a plurality of nodes and a path that connects the plurality of nodes.

According to various embodiments of the present disclosure, the processor may be configured to display, on the display, a first image associated with the first node, the plurality of nodes, and the path that connects the plurality of nodes altogether.

According to various embodiments of the present disclosure, the processor may be configured to display, on the display, the first image associated with the first node, and may be configured to display, on the first image, the plurality of nodes and the path that connects the plurality of nodes.

According to various embodiments of the present disclosure, the processor may be configured to display, on the display, the plurality of nodes and the path that connects the plurality of nodes, and the photographing direction of each of the images that are associated with each node altogether.

According to various embodiments of the present disclosure, the processor may be configured to display, on the display, the plurality of nodes and the path that connects the plurality of nodes, and the path can be formed based on at least one of a distance or displacement direction between adjacent nodes.

According to various embodiments of the present disclosure, the node information associated with each node may include at least one image corresponding to the position of the space of interest and information associated with the at least one image, and wherein information associated with the at least one image may include 3D information associated with at least a portion of the at least one image.

According to various embodiments of the present disclosure, the node information associated with each node may include at least one image corresponding to the position of the space of interest and information associated with the at least one image, and wherein information associated with the at least one image may include depth information of the object displayed on the at least one image.

According to various embodiments of the present disclosure, the processor may be configured to: display, on the display, a preview image photographed through the camera of the electronic device, and display, on the display, an indicator for a photographing guide on the preview image.

According to various embodiments of the present disclosure, the processor may be configured to: display, on the display, a preview image photographed through the camera of the electronic device, and display, on the display, an indicator for a photographing guide on the preview image, and wherein the position of the indicator may be determined based on a position or direction of the camera.

According to various embodiments of the present disclosure, the processor may be configured to: display, on the display, a preview image photographed through the camera of the electronic device, and display, on the display, an indicator for a photographing guide on the preview image, and wherein the position of the indicator may be determined based on photographing positions or photographing directions of images associated with the plurality of nodes.

According to various embodiments of the present disclosure, the processor may be configured to: display, on the display, a preview image photographed through the camera of the electronic device, display, on the display, an indicator for a photographing guide on the preview image, and associated an image photographed according to a guide of the indicator, with the first node, one node of the plurality of nodes, or a new node.

According to various embodiments of the present disclosure, the processor may be configured to: display, on the display, a preview image photographed through the camera of the electronic device, display, on the display, an indicator for a photographing guide on the preview image, and associate an image photographed according to a guide of the indicator with the first node.

According to various embodiments of the present disclosure, the processor may be configured to: display, on the display, a preview image photographed using the camera of the electronic device, display, on the display, a first indicator indicating a position and direction in which an image is to be photographed and a second indicator indicating a current position or direction, and associate an image photographed according to the guide of the first and second indicators with the first node.

According to various embodiments of the present disclosure, the processor may be configured to: display, on the display, a preview image photographed through the camera of the electronic device, display, on the display, an indicator for a photographing guide on the preview image, and change at least a portion of a first image associated with the first node, based on the image photographed according to a guide of the indicator.

According to various embodiments of the present disclosure, the processor may be configured to: display, on the display, a preview image photographed through the camera of the electronic device, display, on the display, an indicator for a photographing guide on the preview image, and change at least a portion of the first node information, based on the image photographed according to a guide of the indicator.

According to various embodiments of the present disclosure, the processor may be configured to display, on the display, a first image associated with the first node, and in response to an input or a position change of the electronic device, a second image associated with a second node among the plurality of nodes can be displayed by replacing the first image.

According to various embodiments of the present disclosure, the processor may be configured to display, on the display, a first image associated with the first node, and in response to an input or a position change of the electronic device, another image associated with the first node can be displayed by replacing the first image.

According to various embodiments of the present disclosure, in response to an input or a direction change of the electronic device, a graphical element associated with the first node can be displayed.

According to various embodiments of the present disclosure, the first node information may include a plurality of images including a first image, and the first image among the plurality of images can be displayed in response to a selection of the first node.

According to various embodiments of the present disclosure, the processor may be configured to: display, on the display, a first image associated with the first node, detect an occurrence of an event and replace, in response to the occurrence of the event, the first image with another image associated with the first node.

According to various embodiments of the present disclosure, the processor may be configured to: display, on the display, a first image associated with the first node, detect an occurrence of an event, acquire, in response to the occurrence of the event, a graphic element associated with the first node from an external device, and display the graphic element on the display.

According to various embodiments of the present disclosure, the processor may be configured to: display, on the display, a first path that connects (connected to) a part among the plurality of nodes, detect an occurrence of an event, and replace, in response to the occurrence of the event, the first path with a second path that connects (connected to) another part among the plurality of nodes.

According to various embodiments of the present disclosure, the processor may be configured to: display, on the display, a first path that connects (connected to) a part among the plurality of nodes, detect an occurrence of an event, and replace, in response to the occurrence of the event, the first path with a second path that connects (connected to) another part among the plurality of nodes, wherein a graphic element which guides the second path can be displayed on the first image associated with the first node.

According to various embodiments of the present disclosure, the processor may be configured to: display, on the display, a first path that connects (connected to) a part among the plurality of nodes, detect an occurrence of an event, and replace, in response to the occurrence of the event, the first path with a second path that connects (connected to) another part among the plurality of nodes, wherein the second path can be configured so as not to pass through a node associated with the event among the plurality of nodes.

According to various embodiments of the present disclosure, the processor may be configured to: acquire, from an external device, information on an object displayed on a first image associated with the first node, and display information on the object on the display.

According to various embodiments of the present disclosure, the processor may be configured to: acquire information on an external device, from the external device corresponding to an object displayed on a first image associated with the first node, and display information on the external device on the display.

According to various embodiments of the present disclosure, the processor may be configured to: transmit, to an external device, information on a first image associated with the first node, acquire, from the external device, information on an object displayed on the first image, and display information on the object on the display.

According to various embodiments of the present disclosure, the processor may be configured to: acquire control information on an object displayed on a first image associated with the first node, display the control information on the object, in response to an input associated with the displayed control information, control the object, and display, on the display, a result of the control of the object.

According to various embodiments of the present disclosure, the processor may be configured to dispose and display a plurality of images associated with the first node, or indicators corresponding to the plurality of images in time sequence.

According to various embodiments of the present disclosure, the processor may be configured to dispose and display, in response to an occurrence of an event, a plurality of images associated with the first node, or indicators corresponding to the plurality of images in time sequence.

According to various embodiments of the present disclosure, the processor may be configured to: store a message on an object displayed on a first image associated with the first node, and display the message or an indicator of the message on the display.

According to various embodiments of the present disclosure, the processor may be configured to: store a message on an object displayed on a first image associated with the first node, and display, on the display, information associated with reception or storage of the message.

According to various embodiments of the present disclosure, the processor may be configured to: store a tag on an object displayed on a first image associated with the first node, and display the tag or an indicator of the tag on the display.

According to various embodiments of the present disclosure, the processor may be configured to: transmit a message or a tag on an object displayed on a first image associated with the first node to an external device, and display, on the display, information associated with transmission or reception of the message or the tag.

According to various embodiments of the present disclosure, the processor may be configured to: detect an occurrence of an event, control, in response to the occurrence of the event, at least one device displayed on a first image associated with the first node, and display, on the display, a result of the control of the at least one device.

According to various embodiments of the present disclosure, the processor may be configured to: receive a message, and transmit, in response to reception of the message, information associated with the message, to at least one device displayed on a first image associated with the first node.

According to various embodiments of the present disclosure, the processor may be configured to: receive a message, transmit, in response to reception of the message, information associated with the message, to at least one device displayed on a first image associated with the first node, and display, on the display, information associated with reception or transmission of the message.

According to various embodiments of the present disclosure, the processor may be configured to: receive a message including information on a state of a device displayed on a first image associated with the first node, and display, in response to the reception of the message, information on the message on the display.

According to various embodiments of the present disclosure, the processor may be configured to: display a state of a first external device displayed on a first image associated with the first node, and transmit, in response to an input, a message including information regarding the first external device, to a second external device.

According to various embodiments of the present disclosure, the processor may be configured to: display a state of a first external device displayed on a first image associated with the first node, transmit, in response to an input, a message including information regarding the first external device, to a second external device, and receive, from the second external device, information associated with a control of the first external device.

According to various embodiments of the present disclosure, the processor may be configured to: display a state of a first external device displayed on a first image associated with the first node, transmit, in response to an input, a message including information regarding the first external device, to a second external device, connect with the second external device, and control the first external device according to a control of the second external device.

The term "module" as used herein may, for example, mean a unit including one of hardware, software, and firmware or a combination of two or more of them. The "module" may be interchangeably used with, for example, the term "unit", "logic", "logical block", "component", or "circuit". The "module" may be the smallest unit of an integrated component or a part thereof. The "module" may be the smallest unit that performs at least one functions or a part thereof. The "module" may be mechanically or electronically implemented. For example, the "module" according to the present disclosure may include at least one of an application-specific IC (ASIC) chip, a field-programmable gate arrays (FPGA), and a programmable-logic device for performing operations which has been known or are to be developed hereinafter.

According to various embodiments of the present disclosure, at least some of the devices (for example, modules or functions thereof) or the method (for example, operations) according to the present disclosure may be implemented by a command stored in a computer-readable storage medium in a programming module form. When the command is executed by at least one processors (for example, the processor 120), the at least one processors may execute a function corresponding to the command. The computer-readable storage medium may be, for example, the memory 130.

Certain aspects of the present disclosure can also be embodied as computer readable code on a non-transitory computer readable recording medium. A non-transitory computer readable recording medium is any data storage device that can store data which can be thereafter read by a computer system. Examples of the non-transitory computer readable recording medium include a Read-Only Memory (ROM), a Random-Access Memory (RAM), Compact Disc-ROMs (CD-ROMs), magnetic tapes, floppy disks, and optical data storage devices. The non-transitory computer readable recording medium can also be distributed over network coupled computer systems so that the computer readable code is stored and executed in a distributed fashion. In addition, functional programs, code, and code segments for accomplishing the present disclosure can be easily construed by programmers skilled in the art to which the present disclosure pertains.

At this point it should be noted that the various embodiments of the present disclosure as described above typically involve the processing of input data and the generation of output data to some extent. This input data processing and output data generation may be implemented in hardware or software in combination with hardware. For example, specific electronic components may be employed in a mobile device or similar or related circuitry for implementing the functions associated with the various embodiments of the present disclosure as described above. Alternatively, one or more processors operating in accordance with stored instructions may implement the functions associated with the various embodiments of the present disclosure as described above. If such is the case, it is within the scope of the present disclosure that such instructions may be stored on one or more non-transitory processor readable mediums. Examples of the processor readable mediums include a ROM, a RAM, CD-ROMs, magnetic tapes, floppy disks, and optical data storage devices. The processor readable mediums can also be distributed over network coupled computer systems so that the instructions are stored and executed in a distributed fashion. In addition, functional computer programs, instructions, and instruction segments for accomplishing the present disclosure can be easily construed by programmers skilled in the art to which the present disclosure pertains.

The programming module according to the present disclosure may include at least one of the aforementioned components or may further include other additional components, or some of the aforementioned components may be omitted. Operations executed by a module, a programming module, or other component elements according to various embodiments of the present disclosure may be executed sequentially, in parallel, repeatedly, or in a heuristic manner. Further, some operations may be executed according to another order or may be omitted, or other operations may be added.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device for providing map information associated with a space of interest, the electronic device comprising:
    a display; and
    a processor configured to:
        acquire a map including at least one node and at least one path connecting between the at least one node, the map being generated based on at least one image photographed at the at least one node, the at least one node being a position where the at least one image is photographed, and the at least one path being determined based on a photographing direction and depth information of the at least one image photographed at the at least one node, wherein the at least one node comprises a first node which is a first position where a first image is photographed, the at least one path comprises a first path connecting the first node and one of the at least one node, and the first path is determined based on a first photographing direction and depth information of the first image photographed at the first node,
        display, on the display, the map,
        change a first image of the map associated with the first node among the at least one node or first additional information on the first image, in response to an input or an event for changing information of the first node,
        display, on the map through the display, the changed first image or the changed first additional information associated with the first node, and
        display the first path associated with the changed first image or the changed first additional information,
        wherein adjacent nodes within a predetermined distance of the at least one node are combined into one node.

2. The device of claim 1, wherein the processor is further configured to:
    display, on the display, the first image including a pre-configured area;
    detect a selection of the pre-configured area; and
    output, in response to the selection, attribute information of an object displayed on the first image through the display.

3. The device of claim 1, wherein the processor is further configured to display, in response to the input or a direction change of the electronic device, a graphic element associated with the first node.

4. The device of claim 1, wherein the processor is further configured to:
    detect an occurrence of the event;
    acquire, in response to the occurrence of the event, a graphic element associated with the first node from an external device; and
    display the graphic element on the display.

5. The device of claim 1, wherein the processor is further configured to:
    detect the occurrence of the event; and
    replace, in response to the occurrence of the event, the first path with a second path that connects another node among the at least one node.

6. The device of claim 1, wherein the processor is further configured to:
    acquire, from an external device or an object, information on the object displayed on the first image; and
    display information on the object on the display.

7. The device of claim 1, wherein the processor is further configured to:

acquire control information on an object displayed on the first image;
display the control information on the object; and
control the object, in response to an input or an event associated with the displayed control information.

8. The device of claim 1, wherein the processor is further configured to:
store a message on an object displayed on the first image; and
display the message or an indicator of the message on the display.

9. The device of claim 1, wherein the processor is further configured to:
transmit, to an external device, a message or a tag on an object displayed on the first image; and
display information associated with the transmission or reception of the message or the tag on the display.

10. An electronic device for providing map information associated with a space of interest, the electronic device comprising:
a camera configured to acquire at least one image; and
a controller, functionally connected to the camera, configured to:
determine at least one position where the at least one image is photographed as at least one node,
determine the at least one path connecting between the at least one node based on a photographing direction and depth information of the at least one image photographed at the at least one node, and
generate a map including the at least one node and the at least one path, by combining the at least one image,
wherein the at least one node comprises a first node which is a first position where a first image is photographed and a second node which is a second position where a second image is photographed, the at least one path comprising a first path connecting the first node and the second node, and the first path is determined based on a first photographing direction and depth information of the first image and a second photographing direction and depth of the second image, and
wherein the contoller combines adjacent nodes within a predetermined distance of at least one node into one node.

11. The device of claim 10, wherein the at least one node comprises 3D information determined by comparing image data of at least a part of an area of the first image and image data of at least a part of an area of the second image.

12. The device of claim 10, wherein the controller is further configured to:
identify a photographing position of the camera or a photographing direction of the camera for the at least one image; and
display, based on at least one of the photographing position or the photographing direction, a photographing guide on a screen functionally connected to the electronic device.

13. The device of claim 10, wherein the controller is further configured to:
acquire another image through the camera;
generate, when there is no node corresponding to the another image among the plurality of nodes, a node corresponding to the another image; and
dispose the another image in a space of the generated node.

14. The device of claim 10, wherein the controller is further configured to:
switch, in response to a user input with respect to the electronic device, at least a part of the at least one image corresponding to the first node into at least a part of the at least one image corresponding to the second node, and
display the switched image on a screen functionally connected to the electronic device.

15. The device of claim 10, wherein the controller is further configured to display, in response to a user input with respect to the electronic device, visual information corresponding to at least one of the first node or the second node on a screen functionally connected to the electronic device.

16. The device of claim 10, wherein the controller is further configured to:
determine the ground or an obstacle of the first node and the second node, based on the 3D information; and
generate a planar map that connects the first node and the second node, based on the ground or the obstacle.

17. The device of claim 10, wherein the controller is further configured to:
receive an event regarding an emergency situation; and
display, in response to the event, information on an emergency route on a display of the electronic device.

18. The device of claim 10, wherein the controller is further configured to:
identify a point where an emergency situation occurs on the spatial map; and
display the emergency route that does not pass through the point on a display of the electronic device.

19. The device of claim 10, wherein the controller is further configured to:
request attribute information from an external device associated with an object displayed on the at least image; and
receive, in response to the request, the attribute information from the external device.

20. The device of claim 11, wherein the controller is further configured to dispose or move a 3D model according to a user input on the spatial map, based on the 3D information.

* * * * *